US011109375B2

(12) United States Patent
Si et al.

(10) Patent No.: US 11,109,375 B2
(45) Date of Patent: Aug. 31, 2021

(54) METHOD AND APPARATUS FOR CONFIGURATION OF COMMON SEARCH SPACE FOR DISCOVERY SIGNAL AND CHANNEL

(71) Applicant: Samsung Electronics Co., Ltd., Suwon-si (KR)

(72) Inventors: Hongbo Si, Plano, TX (US); Yingzhe Li, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 16/708,008

(22) Filed: Dec. 9, 2019

(65) Prior Publication Data
US 2020/0196306 A1    Jun. 18, 2020

Related U.S. Application Data

(60) Provisional application No. 62/780,700, filed on Dec. 17, 2018, provisional application No. 62/801,823, filed on Feb. 6, 2019, provisional application No. 62/814,964, filed on Mar. 7, 2019, provisional application No. 62/829,283, filed on Apr. 4, 2019, provisional application No. 62/834,624, filed on Apr.
(Continued)

(51) Int. Cl.
*H04W 72/04* (2009.01)
*H04W 16/14* (2009.01)
(52) U.S. Cl.
CPC ....... *H04W 72/0446* (2013.01); *H04W 16/14* (2013.01); *H04W 72/042* (2013.01)

(58) Field of Classification Search
CPC ............ H04W 16/14; H04W 72/0446; H04W 72/042
USPC ........................................................ 370/329
See application file for complete search history.

(56) References Cited

U.S. PATENT DOCUMENTS

2018/0192383 A1    7/2018  Nam et al.
2018/0302889 A1   10/2018  Guo et al.
(Continued)

OTHER PUBLICATIONS

Samsung, "Initial Access and Mobility Procedure for NR-U", 3GPP TSG RAN WG1 Meeting #94, Aug. 20-24, 2018, R1-1808769, 8 pages.
(Continued)

*Primary Examiner* — Peter G Solinsky

(57) ABSTRACT

A method of a UE in a wireless communication system supporting a shared spectrum channel access is provided. The UE comprises: receiving, from a BS over a first downlink channel, a SS/PBCH block; determining a transmission window in which the received SS/PBCH block is located; determining whether a CORESET for Type0-PDCCH CSS is present based on the received SS/PBCH block; determining a parameter for a QCL assumption of candidate SS/PBCH blocks within the transmission window; determining a group of QCLed candidate SS/PBCH blocks within the transmission window based on the determined parameter for the QCL assumption; determining a group of slots including the Type0-PDCCH CSS, wherein each slot of the group of slots corresponds to a candidate SS/PBCH block within the group of QCLed candidate SS/PBCH blocks; and receiving, over a second downlink channel, at least one Type0-PDCCH based on the determined groups of slots including the Type0-PDCCH CSS.

20 Claims, 25 Drawing Sheets

Related U.S. Application Data 16, 2019, provisional application No. 62/845,523, filed on May 9, 2019, provisional application No. 62/873,059, filed on Jul. 11, 2019, provisional application No. 62/888,139, filed on Aug. 16, 2019, provisional application No. 62/892,685, filed on Aug. 28, 2019, provisional application No. 62/909,454, filed on Oct. 2, 2019, provisional application No. 62/931,452, filed on Nov. 6, 2019.

(56) References Cited

U.S. PATENT DOCUMENTS

2020/0196383 A1*  6/2020  Tsai ................... H04L 1/1614
2021/0120626 A1*  4/2021  Zhou .................. H04L 5/0098

OTHER PUBLICATIONS

Ericsson, "Correction to application of powerControlOffsetSS for PDCCH ordered PRACH", 3GPP TSG RAN WG1 Meeting #95, Nov. 12-16, 2018, R1-1813123, 10 pages.

"3rd Generation Partnership Project; Technical Specification Group Radio Access Network; NR; Physical layer procedures for control (Release 15)", 3GPP TS 38.213 V15.3.0 (Sep. 2018), 101 pages.

International Search Report dated Mar. 31, 2020 in connection with International Patent Application No. PCT/KR2019/017882, 3 pages.

Written Opinion of the International Searching Authority dated Mar. 31, 2020 in connection with International Patent Application No. PCT/KR2019/017882, 4 pages.

"5G; NR; Physical channels and modulation (3GPP TS 38.211 version 15.3.0 Release 15)", ETSI TS 138 211 V15.3.0, Oct. 2018, 98 pages.

"5G; NR; Multiplexing and channel coding (3GPP TS 38.212 version 15.3.0 Release 15)", ETSI TS 138 212 V15.3.0, Oct. 2018, 102 pages.

"5G; NR; Physical layer procedures for control (3GPP TS 38.213 version 15.3.0 Release 15)", ETSI TS 138 213 V15.3.0, Oct. 2018 102 pages.

"5G; NR; Physical layer procedures for data (3GPP TS 38.214 version 15.3.0 Release 15)", ETSI TS 138 214 V15.3.0, Oct. 2018, 99 pages.

"5G; NR; Physical layer measurements (3GPP TS 38.215 version 15.3.0 Release 15)", ETSI TS 138 215 V15.3.0, Oct. 2018, 18 pages.

"5G; NR; Radio Resource Control (RRC); Protocol Specification (3GPP TS 38.331 version 15.3.0 Release 15)", ETSI TS 138 331 V15.3.0, Oct. 2018, 441 pages.

* cited by examiner

US 11,109,375 B2

METHOD AND APPARATUS FOR CONFIGURATION OF COMMON SEARCH SPACE FOR DISCOVERY SIGNAL AND CHANNEL

CROSS-REFERENCE TO RELATED APPLICATIONS AND CLAIM OF PRIORITY

The present application claims priority to:
U.S. Provisional Patent Application Ser. No. 62/780,700, filed on Dec. 17, 2018
U.S. Provisional Patent Application Ser. No. 62/801,823, filed on Feb. 6, 2019;
U.S. Provisional Patent Application Ser. No. 62/814,964, filed on Mar. 7, 2019;
U.S. Provisional Patent Application Ser. No. 62/829,283, filed on Apr. 4, 2019;
U.S. Provisional Patent Application Ser. No. 62/834,624, filed on Apr. 16, 2019
U.S. Provisional Patent Application Ser. No. 62/845,523, filed on May 9, 2019;
U.S. Provisional Patent Application Ser. No. 62/873,059, filed on Jul. 11, 2019;
U.S. Provisional Patent Application Ser. No. 62/888,139, filed on Aug. 16, 2019;
U.S. Provisional Patent Application Ser. No. 62/892,685, filed on Aug. 28, 2019;
U.S. Provisional Patent Application Ser. No. 62/909,454, filed on Oct. 2, 2019; and
U.S. Provisional Patent Application Ser. No. 62/931,452, filed on Nov. 6, 2019.
The content of the above-identified patent document is incorporated herein by reference.

TECHNICAL FIELD

The present application relates generally to wireless communication systems, more specifically, the present disclosure relates to a configuration of common search space for discovery signal and channel in an advanced wireless communication system.

BACKGROUND

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a pre-5G or 5G communication system to be provided for a configuration of common search space for discovery signal and channel in an advanced communication system.

In one embodiment, a user equipment (UE) in a wireless communication system supporting a shared spectrum channel access is provided. The UE comprises at least one transceiver configured to receive, from a base station (BS) over a first downlink channel, a synchronization signals and physical broadcast channel (SS/PBCH) block. The UE further comprises at least one processor operably connected to the at least one transceiver, the at least one processor configured to: determine a transmission window in which the received SS/PBCH block is located; determine whether a control resource set (CORESET) for Type0 physical downlink control channels (Type0-PDCCH) common search space (CSS) is present based on the received SS/PBCH block; determine a parameter for a quasi-co-location (QCL) assumption of candidate SS/PBCH blocks within the transmission window; determine a group of QCLed candidate SS/PBCH blocks within the transmission window based on the determined parameter for the QCL assumption; and determine a group of slots including the Type0-PDCCH CSS, wherein each slot of the group of slots corresponds to a candidate SS/PBCH block within the group of QCLed candidate SS/PBCH blocks. The at least one transceiver is further configured to receive, from the BS over a second downlink channel, at least one Type0-PDCCH based on the determined groups of slots including the Type0-PDCCH CSS.

In another embodiment, a base station (BS) in a wireless communication system supporting a shared spectrum channel access is provide. The BS comprises at least one processor configured to: determine a transmission window in which a synchronization signal/physical broadcasting channel (SS/PBCH) block is located; determine whether a control resource set (CORESET) for Type0 physical downlink control channels (Type0-PDCCH) common search space (CSS) is present based on the SS/PBCH block; determine a parameter for a quasi-co-location (QCL) assumption of candidate SS/PBCH blocks within the transmission window; determine a group of QCLed candidate SS/PBCH blocks within the transmission window based on the determined parameter for the QCL assumption; and determine a group of slots including the Type0-PDCCH CSS, wherein each slot of the group of slots corresponds to a candidate SS/PBCH block within the group of QCLed candidate SS/PBCH blocks. The BS further comprises at least one transceiver operably connected to the at least one processor, the at least one transceiver configured to: transmit, to a user equipment (UE) over a first downlink channel, the SS/PBCH block; and transmit, to the UE over a second downlink channel, at least one Type0-PDCCH based on the determined groups of slots including the Type0-PDCCH CSS.

In yet another embodiment, a method of a user equipment (UE) in a wireless communication system supporting a shared spectrum channel access is provided. The UE comprises: receiving, from a base station (BS) over a first downlink channel, a synchronization signals and physical broadcast channel (SS/PBCH) block; determining a transmission window in which the received SS/PBCH block is located; determining whether a control resource set (CORESET) for Type0 physical downlink control channels (Type0-PDCCH) common search space (CSS) is present based on the received SS/PBCH block; determining a parameter for a quasi-co-location (QCL) assumption of candidate SS/PBCH blocks within the transmission window; determining a group of QCLed candidate SS/PBCH blocks within the transmission window based on the determined parameter for the QCL assumption; determining a group of slots including the Type0-PDCCH CSS, wherein each slot of the group of slots corresponds to a candidate SS/PBCH block within the group of QCLed candidate SS/PBCH blocks; and receiving, from the BS over a second downlink channel, at least one Type0-PDCCH based on the determined groups of slots including the Type0-PDCCH CSS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.3.0, "NR; Physical channels and modulation;" 3GPP TS 38.212 v15.3.0, "NR; Multiplexing and Channel coding;" 3GPP TS 38.213 v15.3.0, "NR; Physical Layer Procedures for Control;" 3GPP TS 38.214 v15.3.0, "NR; Physical Layer Procedures for Data;" 3GPP TS 38.215 v15.3.0, "NR; Physical Layer Measurements;" and 3GPP TS 38.331 v15.3.0, "NR; Radio Resource Control (RRC) Protocol Specification."

Figure 1:
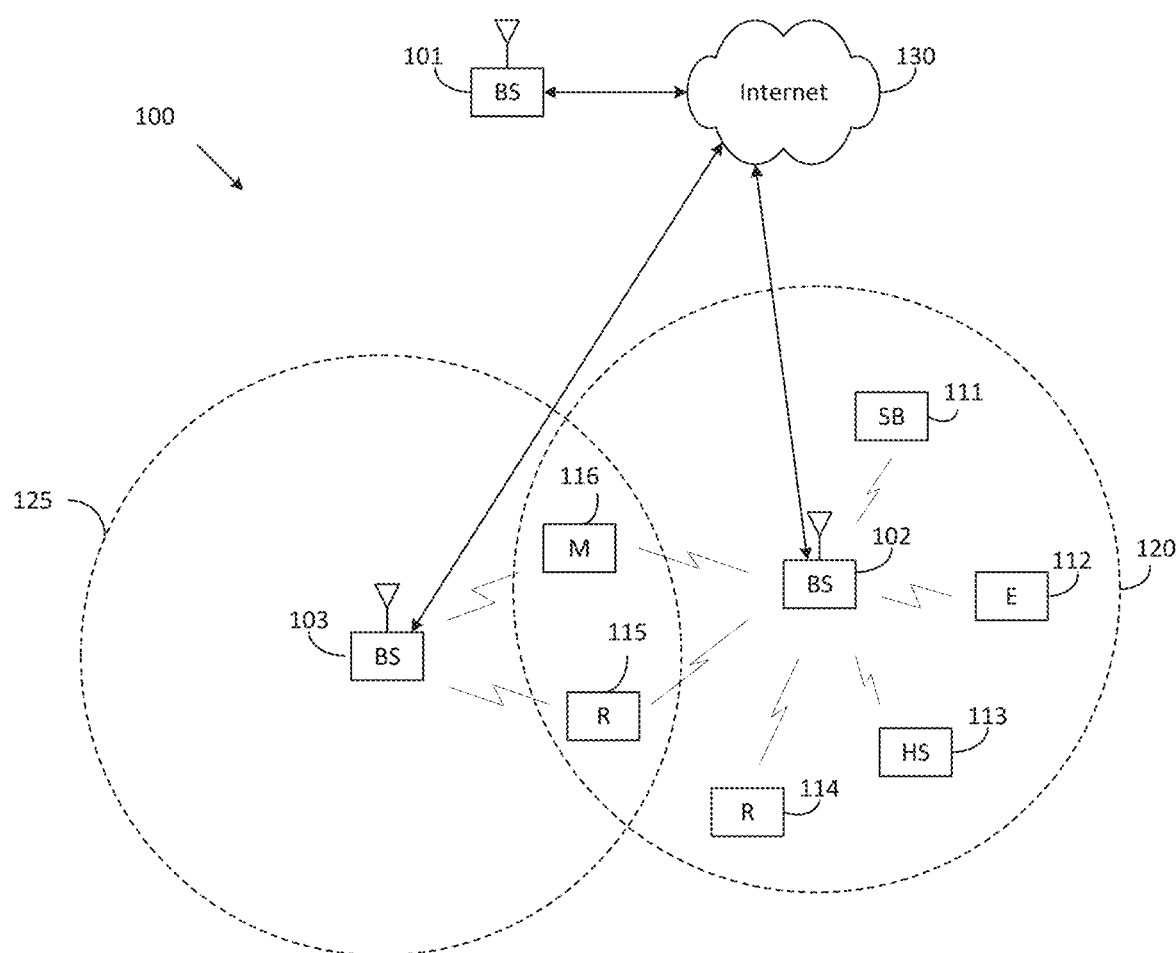
FIG. 1 illustrates an example wireless network according to embodiments of the present disclosure.
Figure 2:
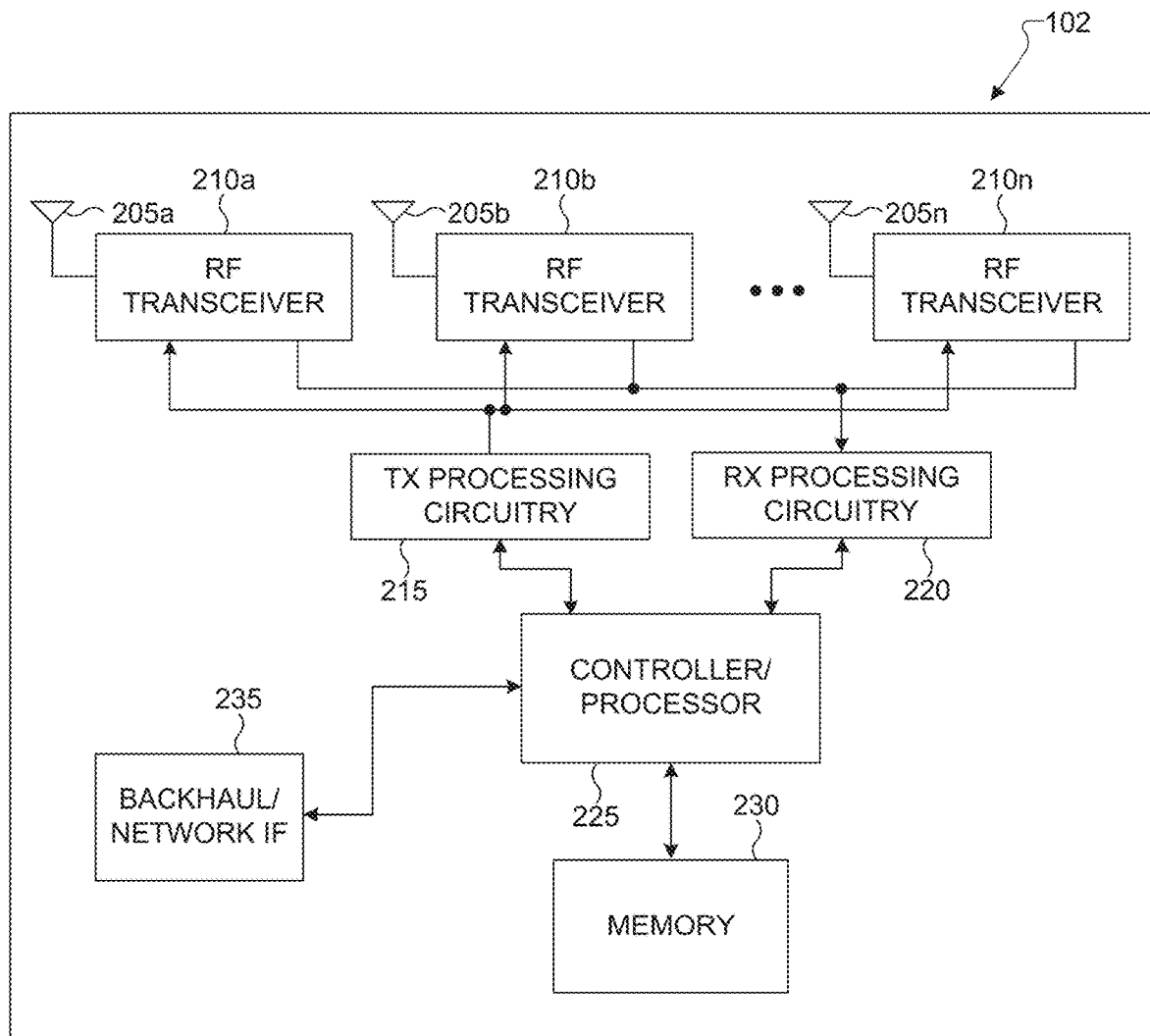
FIG. 2 illustrates an example gNB according to embodiments of the present disclosure.
Figure 3:
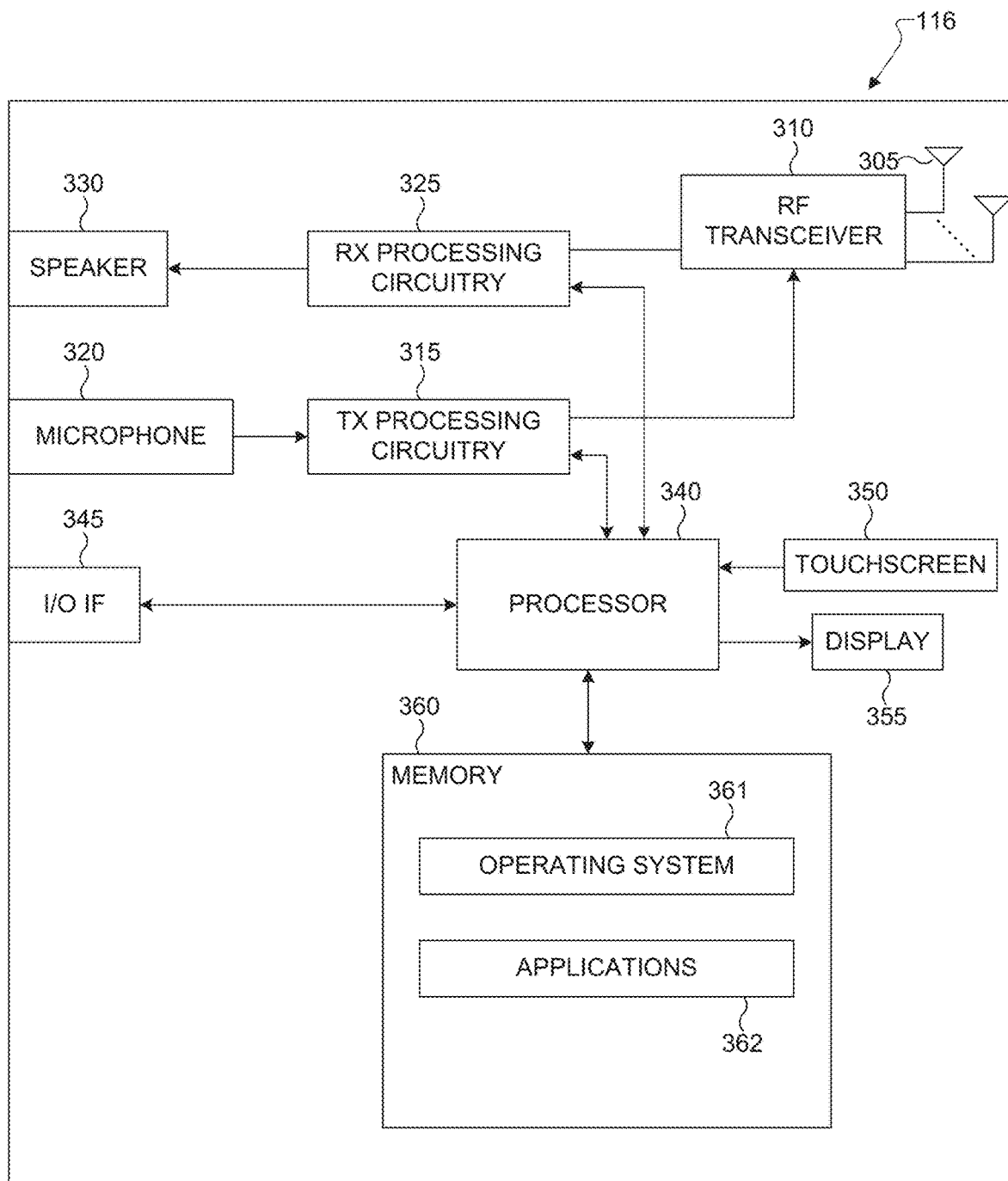
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient configuration of common search space for discovery signal and channel in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220 and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220 the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
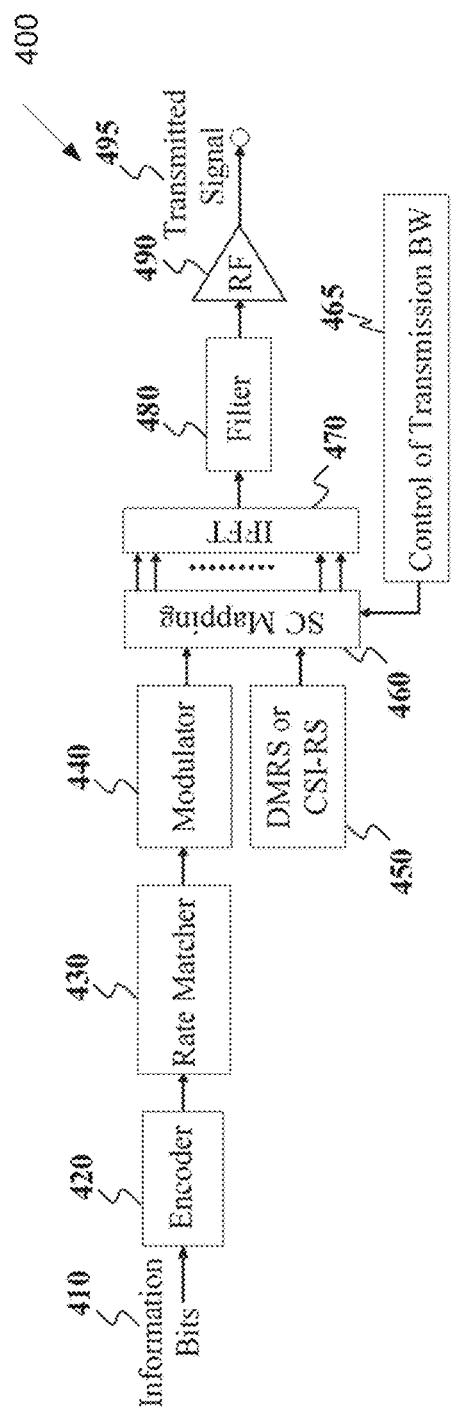
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by an radio frequency (RF) unit 495.

Figure 5:
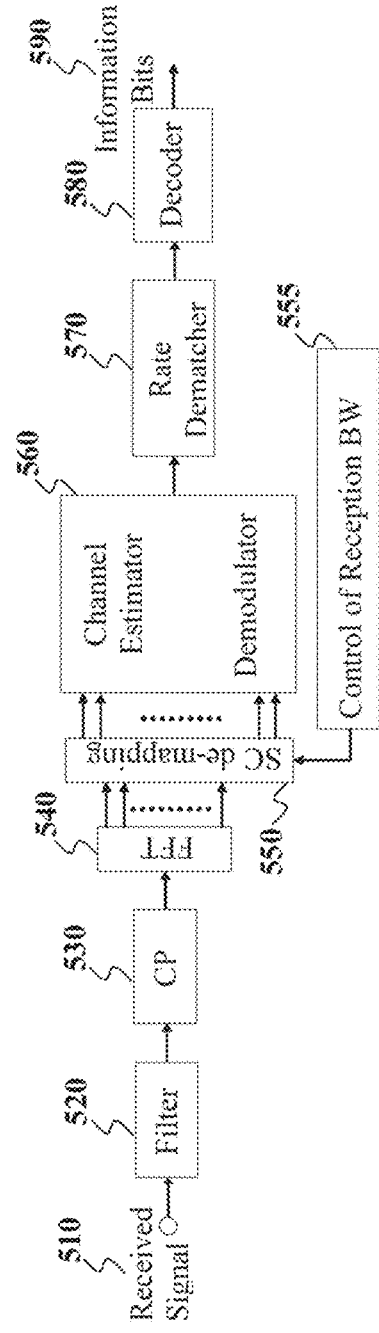
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
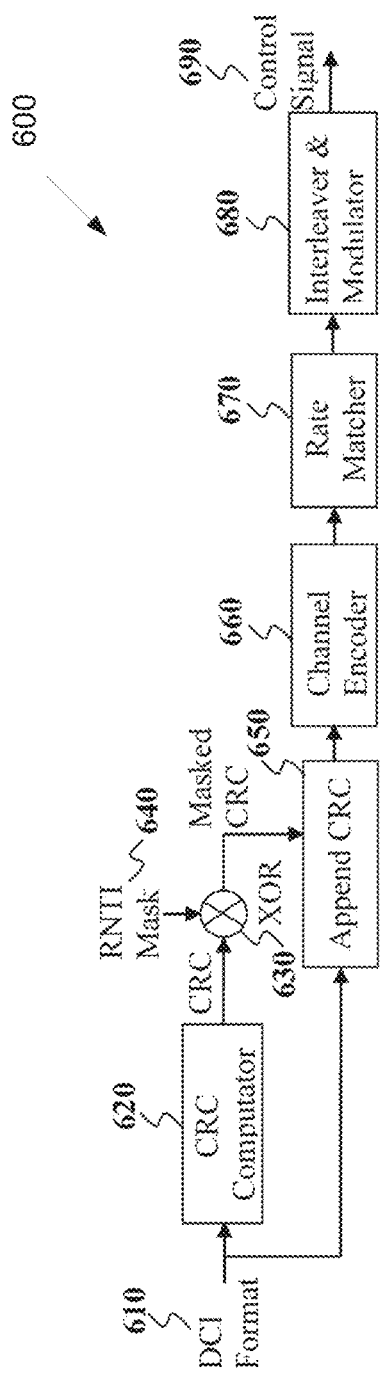
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR(0,0)=0, XOR(0,1)=1, XOR(1,0)=1, XOR(1,1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
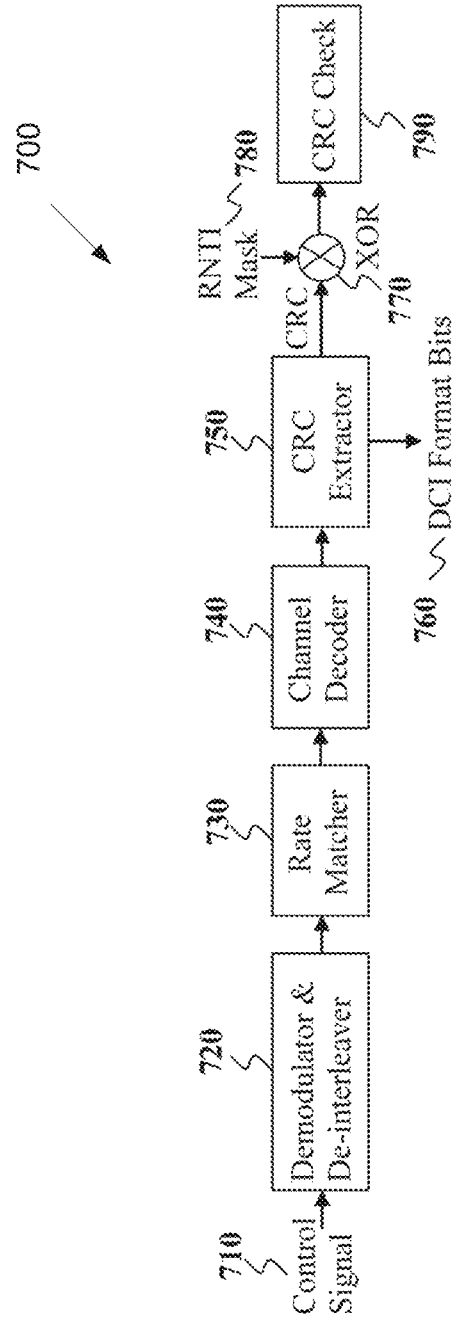
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (check-sum is zero), the DCI format information bits are considered to be valid. When the CRC check does not succeed, the DCI format information bits are considered to be invalid.

For an LTE initial access, primary and secondary synchronization signals (PSS and SSS, respectively) are used for coarse timing and frequency synchronization and cell identification (ID) acquisition. Since PSS/SSS is transmitted twice per 10 ms radio frame and time-domain enumeration is introduced in terms of system frame number (SFN), frame timing is detected from PSS/SSS to avoid the need for increasing the detection burden from physical broadcast channel (PBCH). In addition, cyclic prefix (CP) length and, if unknown, duplexing scheme can be detected from PSS/SSS. The PSS is constructed from a frequency-domain ZC sequence of length 63, with the middle element truncated to avoid using the d.c. subcarrier. Three roots are selected for PSS to represent the three physical layer identities within each group of cells.

The SSS sequences are based on the maximum length sequences (also known as M-sequences). Each SSS sequence is constructed by interleaving two length-31 BPSK modulated sequences in frequency domain, where the two source sequences before modulation are different cyclic shifts of the same M-sequence. The cyclic shift indices are constructed from the physical cell ID group.

Since PSS/SSS detection can be faulty (due to, for instance, non-idealities in the auto- and cross-correlation properties of PSS/SSS and lack of CRC protection), cell ID hypotheses detected from PSS/SSS may occasionally be confirmed via PBCH detection. PBCH is primarily used to signal the master block information (MIB) which consists of DL and UL system bandwidth information (3 bits), PHICH information (3 bits), and SFN (8 bits). Adding 10 reserved bits (for other uses such as MTC), the MIB payload amounts to 24 bits. After appended with a 16-bit CRC, a rate-⅓ tail-biting convolutional coding, 4× repetition, and QPSK modulation are applied to the 40-bit codeword. The resulting QPSK symbol stream is transmitted across 4 subframes spread over 4 radio frames. Other than detecting MIB, blind detection of the number of CRS ports is also needed for PBCH.

For NR licensed spectrum, each synchronization and PBCH signal block (SS/PBCH block) compromises of one symbol for PSS, two symbols for PBCH, one symbol for SSS and PBCH, where the four symbols are mapped consecutively and time division multiplexed. SS is a unified design, including the PSS and SSS sequence design, for all supported carrier frequency rages in NR. The transmission bandwidth of PSS and SSS (e.g., 12 RBs) is smaller than the transmission bandwidth of the whole SS/PBCH block (e.g., 20 RBs). For initial cell selection for NR cell, a UE assumes the default SS burst set periodicity as 20 ms, and for detecting a non-standalone NR cell, a network provides one SS burst set periodicity information per frequency carrier to a UE and information to derive measurement timing/duration if possible.

Other than the MIB, the remaining minimum system information (RMSI) is carried by physical downlink shared channel (PDSCH) with scheduling info carried by the corresponding physical downlink control channel (PDCCH). Similar structure applies to other system information (OSI) and paging message. The control resource set (CORESET) for receiving common control channels, such as RMSI, is configured in content of PBCH.

The federal communications commission (FCC) defined unlicensed carriers to provide cost-free public access spectrum. Use of unlicensed carriers by a UE is allowed only under the provisions that the UE does not generate noticeable interference to communications in licensed carriers and that communications in unlicensed carriers are not protected from interference. For example, unlicensed carriers include the industrial, scientific and medical carriers and the Unlicensed National Information Infrastructure carriers that can be used by IEEE 802.11 devices. It may be possible to deploy LTE radio access technology (RAT) on an unlicensed frequency spectrum, which is also known as LTE-unlicensed or LTE-U or licensed assisted access (LAA).

Figure 8:
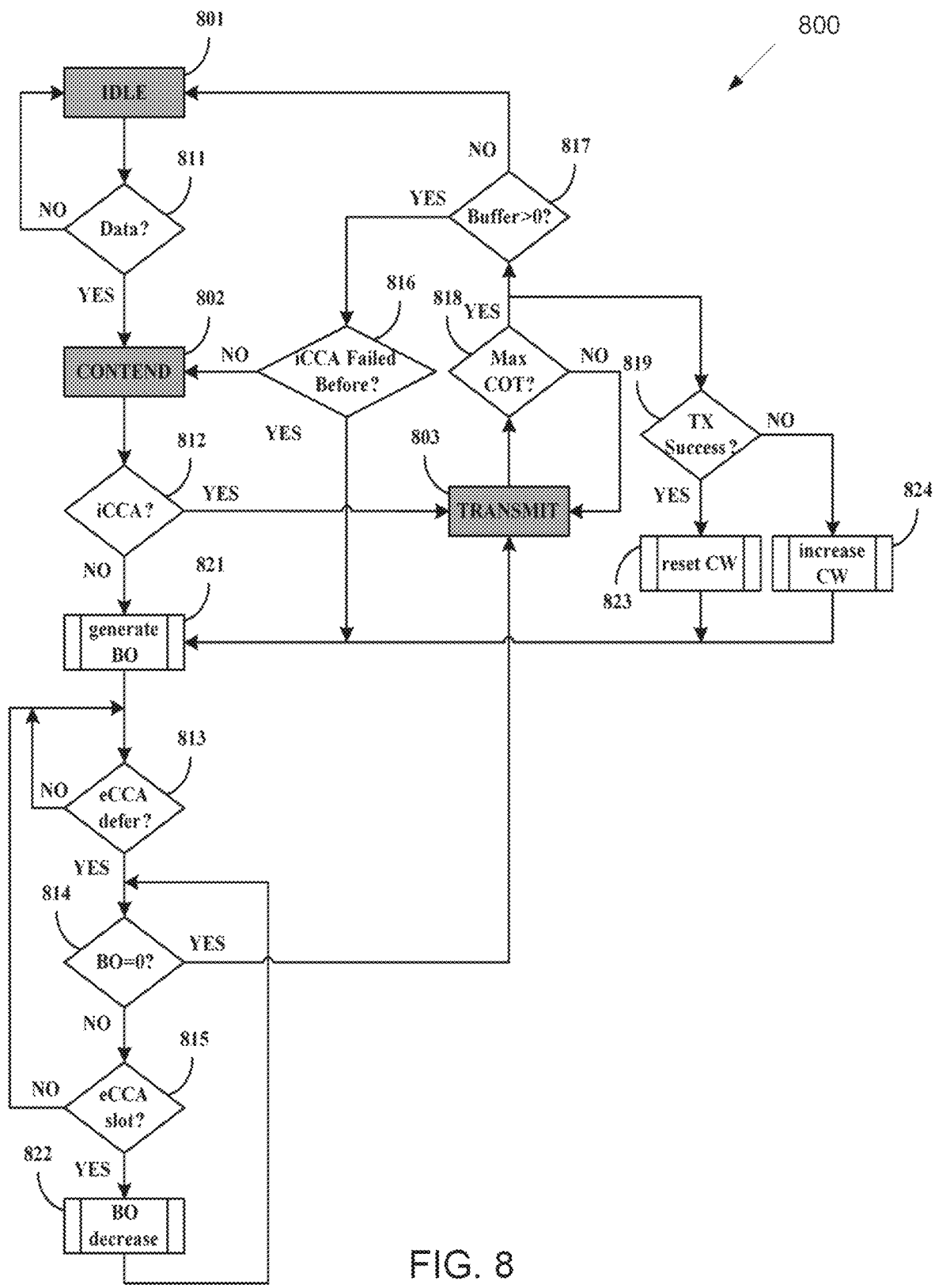
FIG. 8 illustrates an example flowchart for listen-before-talk based channel access procedure in LAA according to embodiments of the present disclosure.

FIG. 8 illustrates an example flowchart for listen-before-talk 800 based channel access procedure in LAA according to embodiments of the present disclosure. An embodiment of the listen-before-talk 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

In LTE system, an eNB may transmit a transmission including a physical downlink shared channel (PDSCH), or a physical downlink control channel (PDCCH), or an enhanced physical downlink control channel (EPDCCH) a carrier on which LAA Scell(s) transmission(s) are performed, after sensing the channel to be idle during the slot durations of a defer duration (812); and after the backoff counter (BO) is zero (814) in step 4). An example of this channel access procedure it illustrated in FIG. 8 (e.g.,it is also referred to as Cat4 LBT for this type of channel access procedure).

The backoff counter is adjusted by sensing the channel for additional slot duration(s) according to the steps below: (1) set the counter as a random number (821) uniformly distributed between 0 and contention window (CW) value, and go to step (4); (2) if the counter is greater than 0, and the eNB chooses to decrement the counter, decrease the counter by 1 (822); (3) sense the channel for an additional slot duration, and if the additional slot duration is idle, go to step (4); else, go to step (5); (4) if the counter is 0, stop; else, go to step (2); (5) sense the channel until either a busy slot is detected within an additional defer duration or all the slots of the additional defer duration are detected to be idle; and (6) if the channel is sensed to be idle during all the slot durations of the additional defer duration, go to step (4); else, go to step (5).

Moreover, the eNB maintains the contention window value and adjusts it before setting a backoff counter, for each of the supported channel access priority class. The adjustment of the contention window value is based on the HARQ-ACK/NACK values corresponding to PDSCH transmission(s) in a reference subframe, wherein the reference subframe is the starting of the most recent transmission on the carrier made by the eNB, for which at least some HARQ-ACK/NACK feedback is expected to be available.

Also, in LTE system, an eNB may transmit a transmission including discovery signal but not including PDSCH on a carrier on which LAA Scell(s) transmission(s) are performed immediately after sensing the channel to be idle for at least a sensing interval of 25 us and if the duration of the transmission is less than 1 ms. It's also referred to as Cat2 LBT for this type of channel access procedure.

The present disclosure focuses on the design of timing information delivered by the discovery signal and channel (DSCH) on NR unlicensed spectrum (note that in the present disclosure, unlicensed spectrum also includes shared spectrum). In the present disclosure, the DSCH contains SS/PBCH block(s), and at least one of a configurable CORESET(s) and PDSCH(s) of RMSI, OSI, or paging, or a channel state indicator reference signal (CSI-RS) if configured, which can be considered as enhancement to discovery signals in LTE for initial cell acquisition purpose as well. The terminology of DSCH can also be referred to other equivalent terminologies, such as discovery signal, discovery reference signal and channel, discovery block, discovery burst, discovery reference signal (DRS), and etc.

In one embodiment, there is an indication of whether the SS/PBCH block is configured in DSCH (e.g., using a separate bit in PBCH content, or jointly coded with other message in PBCH content, or using DMRS of PBCH to indicate), such that a UE can know whether a received SS/PBCH block is located within a DSCH transmission window. For one approach, the indication of whether the SS/PBCH block is configured in DSCH can be jointly coded with the timing offset of the SS/PBCH block within the transmission window.

For example, if there are N_offset number of timing offsets of the SS/PBCH block within the transmission window to be configured, [log2(N_offset+1)] number of bits can be used in PBCH content to jointly code the indication of whether the SS/PBCH block is configured in DSCH and the timing offset of the SS/PBCH block within the transmission window, wherein the codepoints are {0, 1, . . . N_offset−1, not in DSCH}, e.g., {0, 1, 2, not in DSCH} if N_offset=3.

In another embodiment, it is specified that all SS/PBCH blocks may be confined in a DSCH transmission window for NR-U, such that a UE may assume the received SS/PBCH block is located within a DSCH transmission window. For example, the periodicity of SS/PBCH blocks is always assumed as the same as the periodicity of DSCH by the UE. In one aspect, at least for initial cell search purpose, a UE may assume the received SS/PBCH block is located within a DSCH transmission window.

In yet another embodiment, a UE assumes all timing determination procedure and configuration for DSCH are the same, regardless of whether a received SS/PBCH block is within or outside a DSCH transmission window, such that there is no need for a UE to distinguish a received SS/PBCH block is within or outside a DSCH transmission window.

In NR specification, the configuration of Type0-PDCCH common search space (CSS), i.e., the CSS for RMSI, is indicated in the content of PBCH using 4 bits. For NR-U, there a need for enhancement and/or modification to the configuration of Type0-PDCCH CSS, such that the configured time-domain location of the Type0-PDCCH CSS is more appropriate for unlicensed band operation, especially for NR-U DSCH. The following embodiments details the design of configuration of Type0-PDCCH CSS.

In one embodiment, for NR-U DSCH, the configuration of Type0-PDCCH CSS can be indicated in the content of PBCH (e.g., MIB).

In another embodiment, for NR-U DSCH, the configuration of Type0-PDCCH CSS is fixed/predefined (e.g., no indication of the configuration is required), e.g., for a given CORESET #0 configuration.

In yet another embodiment, there is an indication in PBCH that whether a UE needs to monitor the Type0-PDCCH CSS. In one approach, there is an explicit indication (e.g., 1 bit in the payload of PBCH) of whether a UE needs to monitor the Type0-PDCCH CSS. In another approach, the indication is jointly coded with the RE-level frequency offset if floating sync is supported (e.g., using a code point from k_SSB). In yet another approach, the indication is jointly coded with the configuration of Type0-PDCCH CSS and/or CORESET #0 configuration (e.g., using an entry in the configuration table for the configuration of Type0-PDCCH CSS and/or CORESET #0 configuration).

In yet another embodiment, on the same frequency layer, the configuration of Type0-PDCCH CSS is the same. For one example, if there can be Type0-PDCCH CSS both within and outside a DSCH transmission window, the configuration of Type0-PDCCH CSS within a DSCH transmission window is the same as the configuration of Type0-PDCCH CSS outside a DSCH transmission window, and the same configuration is indicated in MIB of PBCH or fixed/predefined in spec. For another example, a UE assumes all Type0-PDCCH CSS are configured within a DSCH transmission window, and the same configuration of Type0-PDCCH CSS is indicated in MIB of PBCH or fixed/predefined in spec, which can be achieved by assuming the periodicity of monitoring Type0-PDCCH CSS is the same as the periodicity of DSCH transmission window at the UE side.

In yet another embodiment, on the same frequency layer, the configuration of Type0-PDCCH CSS within a DSCH transmission window can be different from the configuration of Type0-PDCCH CSS outside a DSCH transmission window. In one example, the indication of the configuration of Type0-PDCCH CSS within and outside the DSCH transmission window can be using two separate fields in the content of PBCH. In another example, the indication of the configuration of Type0-PDCCH CSS within and outside the DSCH transmission window can be using the same field in the content of PBCH, and the value of the field can be configured separately for the configuration of Type0-PDCCH CSS within and outside the DSCH transmission window such that the content of PBCH may or may not be the same within and outside the DSCH transmission window. In yet another example, the configuration of Type0-PDCCH CSS within the DSCH transmission window is fixed (e.g., no need for indication) and the configuration of Type0-PDCCH CSS outside the DSCH transmission window can be using a field in the content of PBCH (e.g., same as NR specification or selected from the configuration as in NR specification).

In yet another embodiment, if there is an indication for a configuration of Type0-PDCCH CSS within a DSCH transmission window (e.g., PBCH content), there can be one configuration (e.g., one codepoint in a table) indicating there is no Type0-PDCCH CSS required to monitor within the DSCH.

In yet another embodiment, for a received SS/PBCH block, if a UE determines the received SS/PBCH block is within a DSCH transmission window, the monitoring periodicity of Type0-PDCCH CSS can be the same as the periodicity of DSCH transmission window.

In yet another embodiment, for the configuration of Type0-PDCCH CSS within a DSCH transmission window, the group offset O in calculating the index of the starting slot for monitoring the Type0-PDCCH CSS can be defined as the offset between the starting location of slots containing the burst of SS/PBCH block and starting location of slots containing Type0-PDCCH CSS, such that the UE determines the index of the starting slot for monitoring Type0-PDCCH CSS as $n\_0=(n\_DSCH+O*2^\mu+ floor(i*M))$ mod $N\_slot^\mu$, where n_DSCH is the starting slot index within the frame of a DSCH transmission window, $2^\mu$ is ratio of the SCS of DSCH comparing to 15 kHz (e.g., $\mu=1$ if using 30 kHz SCS for DSCH, and $\mu=0$ if using 15 kHz SCS for DSCH), i is the index of candidate SS/PBCH block in a half frame (e.g., i=0, 1, . . . , 19 if using 30 kHz SCS for DSCH, and i=0, 1, . . . , 9 if using 15 kHz SCS for DSCH), and $N\_slot^\mu$ is the number of slots in a frame with respect to SCS with parameter $\mu$ (e.g., $N\_slot^\mu=20$ if using 30 kHz SCS for DSCH, and $N\_slot^\mu=10$ if using 30 kHz SCS for DSCH).

In yet another embodiment, for a received SS/PBCH block, if a UE determines the received SS/PBCH block is within a DSCH transmission window, and a time-domain offset for the transmission of the SS/PBCH block (e.g., denoted as O_SSB in the unit of slot) is known to the UE (e.g., by using signal/channel in the corresponding SS/PBCH block), the UE can determine the slot index for Type0-PDCCH CSS as n_0+O_SSB, wherein n_0 is the determined slot index from the configuration of Type0-PDCCH CSS within a DSCH transmission window.

In yet another embodiment, the number of slot for monitoring Type0-PDCCH CSS within a DSCH transmission window corresponding to an SS/PBCH block is 1 (note that the corresponding number in NR specification).

In yet another embodiment, for a received SS/PBCH block, a UE determines its associated slots containing Type0-PDCCH CSS set according to the same equations as defined in NR specification, and the index of received SS/PBCH block can be generalized to any candidate SS/PBCH block within the DSCH transmission window. For example, for a candidate SS/PBCH block with index i ($0 \le i \le 9$ for 15 kHz SCS and $0 \le i \le 19$ for 30 kHz SCS), wherein the UE determines its associated slots containing Type0-PDCCH CSS set as two consecutive slots starting from slot $n_0$, and an index of slot $n_0$ can be determined as $$n_0 = (O \cdot 2^\mu + \lfloor i \cdot M \rfloor) \bmod N_{slot}^{frame,\mu}$$

located in a frame with system frame number (SFN) $SFN_C$ satisfying $SFN_C \bmod 2 = 0$ if $$\lfloor (O \cdot 2^\mu + \lfloor i \cdot M \rfloor) / N_{slot}^{frame,\mu} \rfloor \bmod 2 = 0$$

or in a frame with SFN satisfying $SFN_C \bmod 2 = 1$ if $$\lfloor (O \cdot 2^\mu + \lfloor i \cdot M \rfloor) / N_{slot}^{frame,\mu} \rfloor \bmod 2 = 1.$$

In yet another embodiment, the set of configurations of Type0-PDCCH CSS can be different or partially different from NR specification, such that the location of Type0-PDCCH CSS can be more compact with the QCLed SS/PBCH block, and the transmission of SS/PBCH block and the QCLed PDCCH/PDSCH of RMSI can share the same LBT. One or multiple of the following approaches can be supported for NR-U, and it can be configurable among the approaches if multiple approaches are supported.

Figure 9:
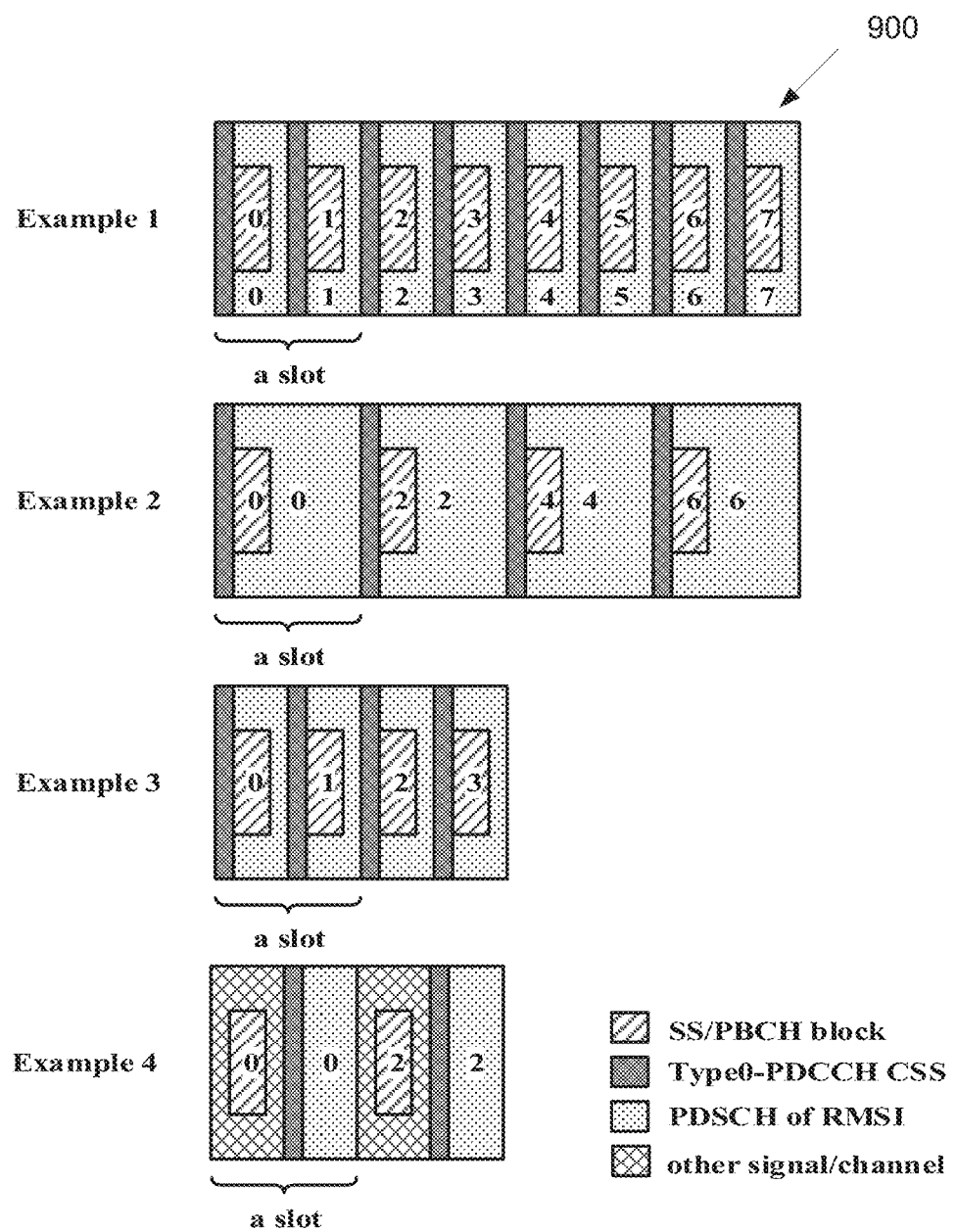
FIG. 9 illustrates an example configured Type0-PDCCH CSS according to embodiments of the present disclosure.

FIG. 9 illustrates an example configured Type0-PDCCH CSS 900 according to embodiments of the present disclosure. An embodiment of the configured Type0-PDCCH CSS 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In one approach for this embodiment, the index of the slot for monitoring Type0-PDCCH CSS corresponding to the candidate SS/PBCH block with index i (e.g., QCLed with the candidate SS/PBCH block with index i) can be the same as the index of the slot containing the candidate SS/PBCH block with index i. An illustration of this approach is in FIG. 9, wherein L_max=8. The multiplexing pattern in a slot in Example 1 of the figure is for illustration purpose, e.g., the symbol index of Type0-PDCCH CSS can be one from {0, 7} as in the figure, or one from {0, number of CORESET symbol}. For this approach, there can be either one Type0-PDCCH CSS to be monitored in a slot, wherein the starting symbol index of Type0-PDCCH CSS is given by 0, e.g., Example 2 and Example 4 in FIG. 9, or two Type0-PDCCH CSS to be monitored in a slot, wherein the starting symbol index of Type0-PDCCH CSS is given by 0 for the first CSS and given by 7 for the second CSS, e.g., Example 1 and Example 3 in FIG. 9. This approach can be applicable to any configuration of the indication of actually transmitted SS/PBCH blocks (e.g., the bitmap indication in RMSI), for example, the bitmap is 11111111 in Example 1 of FIG. 9, the bitmap is 10101010 in Example 2 of FIG. 9, the bitmap is 11110000 in Example 3 of FIG. 9, and the bitmap is 10100000 in Example 4 of FIG. 9. In one example, if configuration of Type0-PDCCH CSS within a DSCH transmission window is fixed/predefined, this approach can be used as the default configuration.

Figure 10:
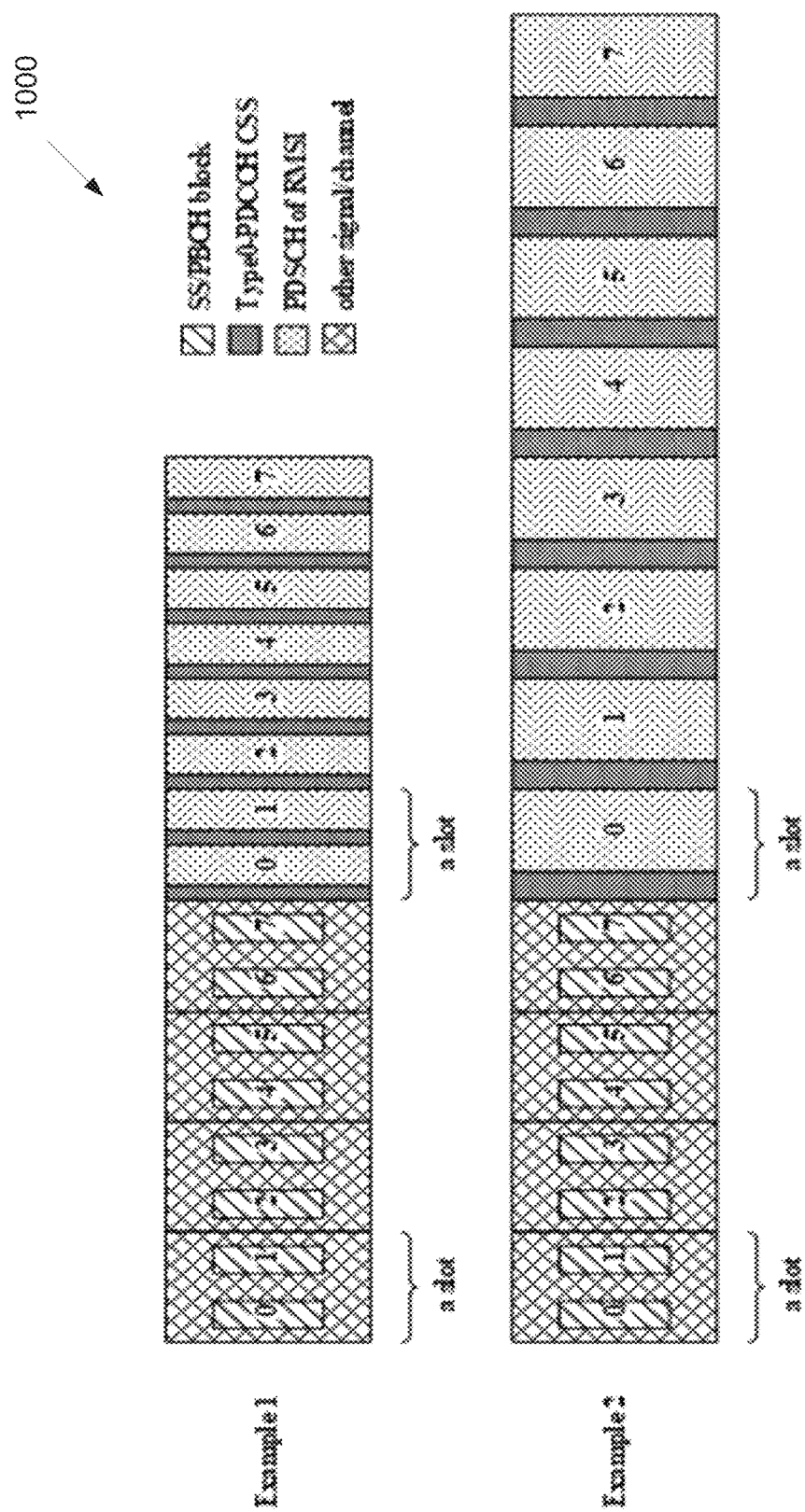
FIG. 10 illustrates an example configured Type0-PDCCH CSS according to embodiments of the present disclosure.

FIG. 10 illustrates an example configured Type0-PDCCH CSS 1000 according to embodiments of the present disclosure. An embodiment of the Type0-PDCCH CSS 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

In another approach for this embodiment, the transmission of the burst of PDCCH/PDSCH of RMSI can be right after the transmission of the burst of SS/PBCH blocks. In one example, the maximum number of SS/PBCH blocks are transmitted (e.g., the indication of actually transmitted SS/PBCH blocks is an all-one bitmap), then the index of the starting slot for monitoring Type0-PDCCH CSS corresponding to SS/PBCH block index i can be configurable as n_SSB_i+L_max/2, if there are 2 Type0-PDCCH CSSs in a slot (e.g., Example 1 in FIG. 10), and can be configurable as n_SSB_i+L_max/2+ floor(i/2), if there is only one Type0-PDCCH CSS in a slot (e.g., Example 2 in FIG. 10), wherein n_SSB_i is the index of slot containing the SS/PBCH block with SS/PBCH block index i, and L_max is the maximum number of SS/PBCH blocks in a DSCH transmission window.

Figure 11A:
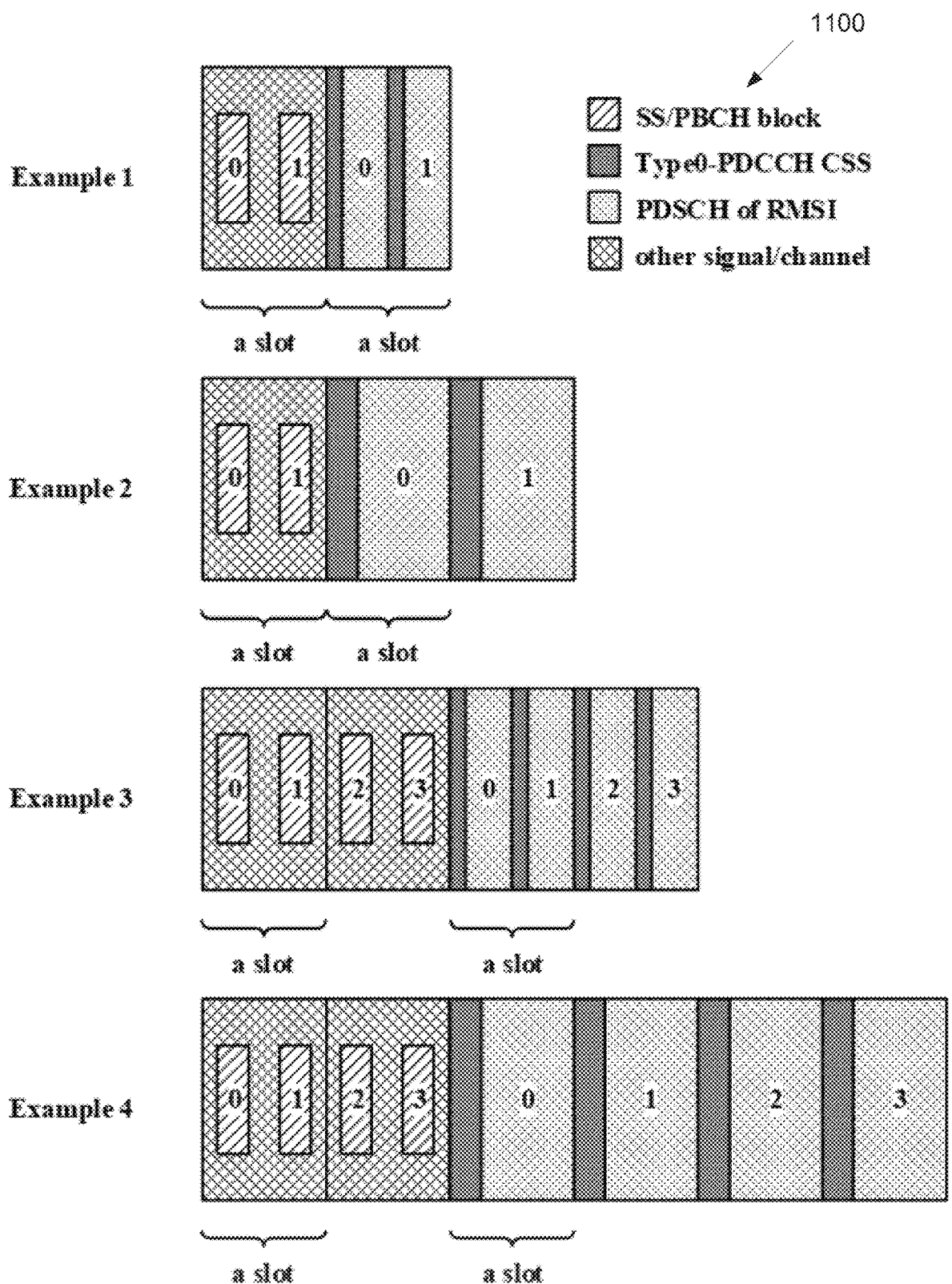
FIG. 11A illustrates an example configured Type0-PDCCH CSS according to embodiments of the present disclosure.

FIG. 11A illustrates an example configured Type0-PDCCH CSS 1100 according to embodiments of the present disclosure. An embodiment of the configured Type0-PDCCH CSS 1100 shown in FIG. 11A is for illustration only. One or more of the components illustrated in FIG. 11A can be implemented in specialized circuitry configured to perform the noted functions or one or more of the components can be implemented by one or more processors executing instructions to perform the noted functions. Other embodiments are used without departing from the scope of the present disclosure.

Figure 11B:
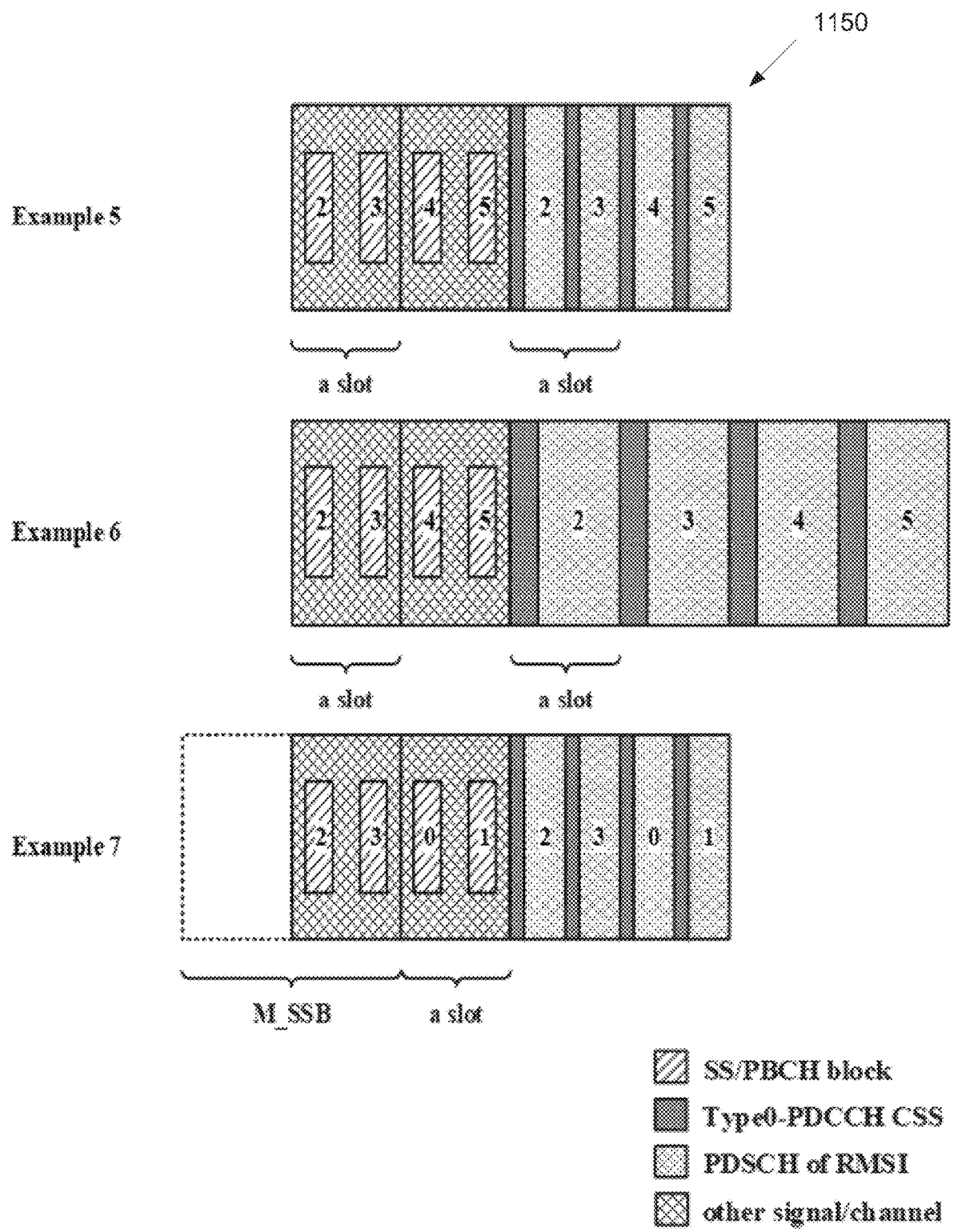
FIG. 11B illustrates another example configured Type0-PDCCH CSS according to embodiments of the present disclosure.

FIG. 11B illustrates another example configured Type0-PDCCH CSS 1150 according to embodiments of the present disclosure. An embodiment of the configured Type0-PDCCH CSS 1150 shown in FIG. 11B is for illustration only. One or more of the components illustrated in FIG. 11B can be implemented in specialized circuitry configured to perform the noted functions or one or more of the components can be implemented by one or more processors executing instructions to perform the noted functions. Other embodiments are used without departing from the scope of the present disclosure.

In another example, the maximum number of SS/PBCH blocks are not all transmitted (e.g., the indication of actually transmitted SS/PBCH blocks is not an all-one bitmap), then the index of the starting slot for monitoring Type0-PDCCH CSS corresponding to SS/PBCH block index i can be configurable as one from {n_SSB_i+1, n_SSB_i+2, . . . , n_SSB_i+L_max/2-1}, if there are two Type0-PDCCH CSSs in a slot (e.g., Example 1, Example 3, and Example 5 in FIGS. 11A and 11B), and can be configurable as one from {n_SSB_i+1+ mod(i, 2), n_SSB_i+2+ mod(i, 2), . . . , n_SSB_i+5+ mod(i, 2)}, if there is only one Type0-PDCCH CSS in a slot (e.g., Example 2, Example 4, and Example 6 in FIGS. 11A and 11B), wherein n_SSB_i is the index of slot containing the SS/PBCH block with SS/PBCH block index i, and L_max is the maximum number of SS/PBCH blocks in a DSCH transmission window.

In yet another example, if there is an indication of the wrapping around modeling value, e.g., M_SSB in term of number of slots, then the index of the starting slot for monitoring Type0-PDCCH CSS corresponding to SS/PBCH block index i can be determined as n_SSB_i+M_SSB1, if there are two Type0-PDCCH CSSs in a slot (e.g., Example 7 in FIGS. 11A and 11B), wherein n_SSB_i is the index of slot containing the SS/PBCH block with SS/PBCH block index i.

Figure 12:
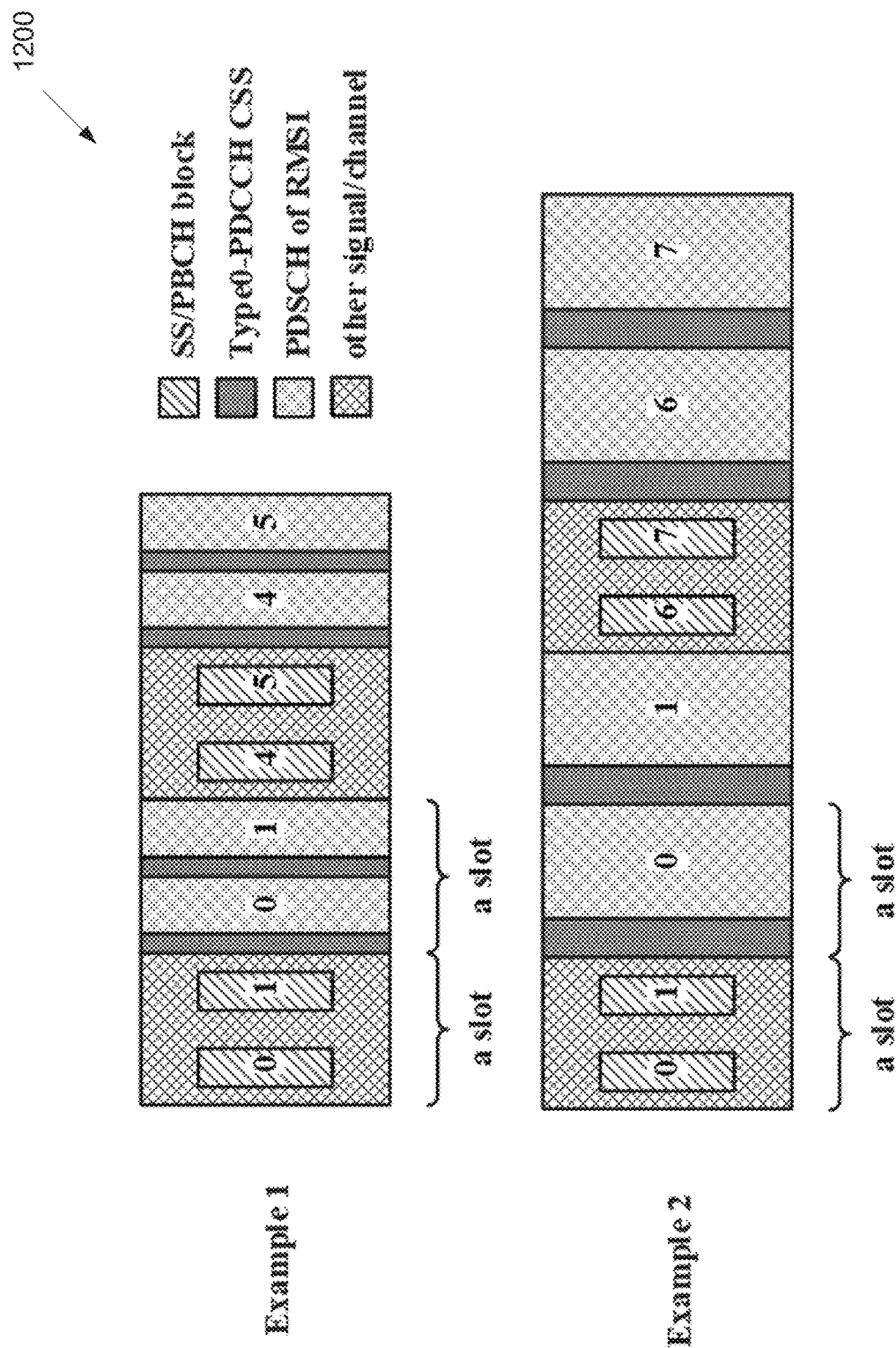
FIG. 12 illustrates an example configured Type0-PDCCH CSS according to embodiments of the present disclosure.

FIG. 12 illustrates an example configured Type0-PDCCH CSS 1200 according to embodiments of the present disclosure. An embodiment of the configured Type0-PDCCH CSS 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In yet another approach for this embodiment, the transmission of part of the burst of PDCCH/PDSCH of RMSI can be right after the transmission of part of the burst of SS/PBCH blocks (e.g., among the transmission of SS/PBCH blocks within a burst). For example, the actually transmitted SS/PBCH blocks are not all the possible SS/PBCH blocks, and they can be divided into multiple parts within the burst, then the transmission of corresponding RMSI (and/or with other signal/channels) can follow parts of the burst of SS/PBCH blocks. The index of the starting slot for monitoring Type0-PDCCH CSS corresponding to SS/PBCH block index i can be configurable as n_SSB_i+1, if there are two Type0-PDCCH CSSs in a slot (e.g., Example 1 in FIG. 12), and can be configurable as n_SSB_i+1+ mod(i, 2), if there is only one Type0-PDCCH CSS in a slot (e.g., Example 2 in FIG. 12), wherein n_SSB_i is the index of slot containing the SS/PBCH block with SS/PBCH block index i, and L_max is the maximum number of SS/PBCH blocks in a DSCH transmission window.

Figure 13A:
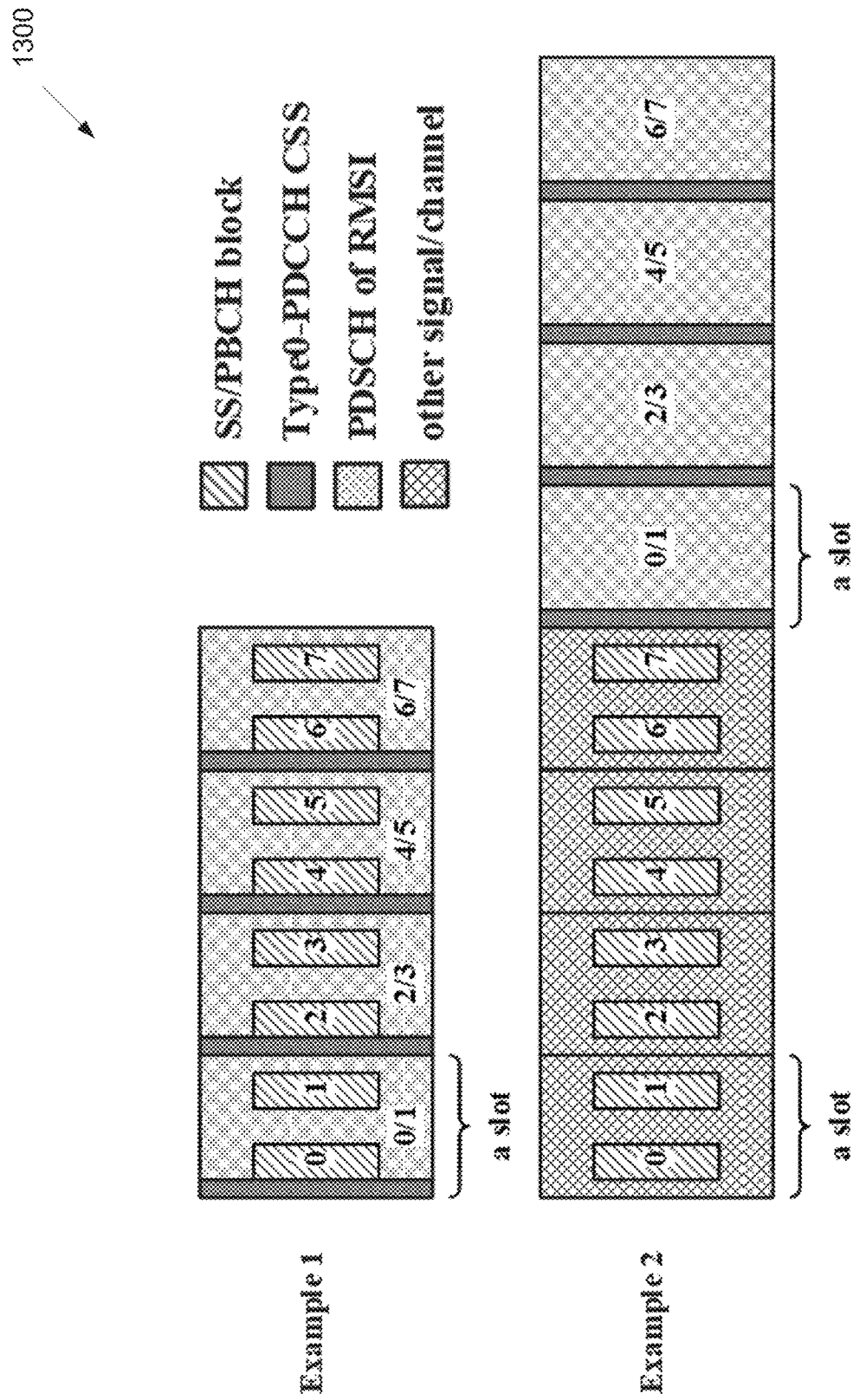
FIG. 13A illustrates an example configured Type0-PDCCH CSS according to embodiments of the present disclosure.

FIG. 13A illustrates an example configured Type0-PDCCH CSS 1300 according to embodiments of the present disclosure. An embodiment of the configured Type0-PDCCH CSS 1300 shown in FIG. 13A is for illustration only. One or more of the components illustrated in FIG. 13A can be implemented in specialized circuitry configured to perform the noted functions or one or more of the components can be implemented by one or more processors executing instructions to perform the noted functions. Other embodiments are used without departing from the scope of the present disclosure.

Figure 13B:
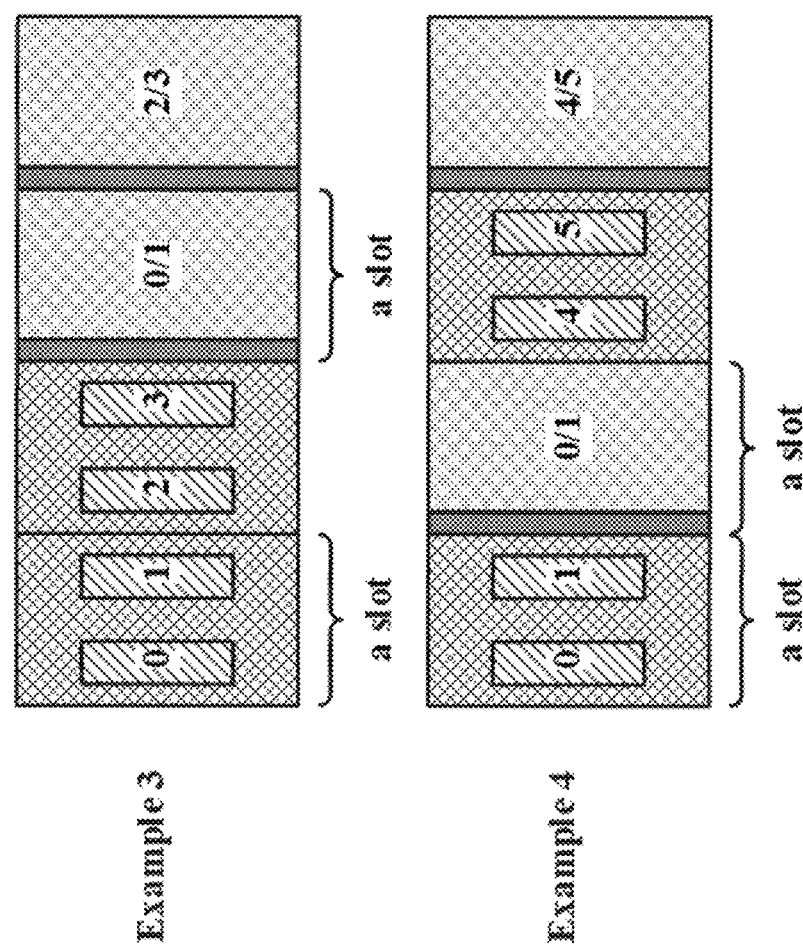
FIG. 13B illustrates an example configured Type0-PDCCH CSS according to embodiments of the present disclosure.

FIG. 13B illustrates an example configured Type0-PDCCH CSS 1350 according to embodiments of the present disclosure. An embodiment of the configured Type0-PDCCH CSS 1350 shown in FIG. 13B is for illustration only. One or more of the components illustrated in FIG. 13B can be implemented in specialized circuitry configured to perform the noted functions or one or more of the components can be implemented by one or more processors executing instructions to perform the noted functions. Other embodiments are used without departing from the scope of the present disclosure.

In yet another approach for this embodiment, the pair of SS/PBCH blocks within a slot are QCLed and there is only one Type0-PDCCH CSS associated to the pair of SS/PBCH blocks. In one example of this approach, there can be one Type0-PDCCH CSS in a slot, and associated to the pair of SS/PBCH blocks. The index of the starting slot for monitoring Type0-PDCCH CSS corresponding to SS/PBCH block index i can be configurable as one from {n_SSB n_SSB_i+1, n_SSB_i+L_max/2} (e.g., Examples in FIGS. 13A and 13B), wherein n_SSB_i is the index of slot containing the SS/PBCH block with SS/PBCH block index i, and L_max is the maximum number of SS/PBCH blocks in a DSCH transmission window.

In one example of this embodiment, the index of slot for monitoring the associated Type0-PDCCH corresponding to the candidate SS/PBCH block with index i is the same as the index of slot containing the candidate SS/PBCH block with index i. Starting symbol index of Type0-PDCCH CSS is given by n_sym, wherein in one example, n_sym=0 if i is even and n_sym=n_CORESET0 if i is odd, wherein i is the index of the associated candidate SS/PBCH block and n_CORESET0 is the number of symbols for CORESET 0; and in another example, n_sym=0 if i is even and n_sym=7 if i is odd, wherein i is the index of the associated candidate SS/PBCH block (e.g., i=0, 1, . . . , 19 if using 30 kHz SCS for DSCH, and i=0, 1, . . . , 9 if using 15 kHz SCS for DSCH). In one aspect of this example, the periodicity for monitoring Type0-PDCCH is the same as the periodicity of SS/PBCH block.

In another example of this embodiment, the index of slot for monitoring the associated Type0-PDCCH corresponding to the candidate SS/PBCH block with index i is the same as the index of slot containing the candidate SS/PBCH block with index i. If using the configuration in multiplexing Pattern 1 for this example, the configuration is given by O=0 (wherein O is defined as the timing offset between the starting of slots for monitoring Type0-PDCCH CSS and the starting of slots containing the corresponding SS/PBCH blocks, expressed in ms), and M=½, such that the UE determines the index of the starting slot for monitoring Type0-PDCCH CSS as $n\_0=(O*2^\mu+ \text{floor}(i*M)) \mod N\_slot^\mu$, where $2^\mu$ is ratio of the SCS of DSCH comparing to 15 kHz (e.g., µ=1 if using 30 kHz SCS for DSCH, and µ=0 if using 15 kHz SCS for DSCH), i is the index of candidate SS/PBCH block in a half frame (e.g., i=0, 1, . . . , 19 if using 30 kHz SCS for DSCH, and i=0, 1, . . . , 9 if using 15 kHz SCS for DSCH), and $N\_slot^\mu$ is the number of slots in a frame with respect to SCS with parameter µ (e.g., $N\_slot^\mu$=20 if using 30 kHz SCS for DSCH, and $N\_slot^\mu$=10 if using 30 kHz SCS for DSCH).

Starting symbol index of Type0-PDCCH CSS is given by n_sym, wherein in one example, for M=½ n_sym=0 if i is even and n_sym=n_CORESET0 if i is odd, wherein i is the index of the associated candidate SS/PBCH block and n_CORESET0 is the number of symbols for CORESET 0; and in another example, for M=½, n_sym=0 if i is even and n_sym=7 if i is odd, wherein i is the index of the associated candidate SS/PBCH block.

In yet another example of this embodiment, the index of slot for monitoring Type0-PDCCH corresponding to the candidate SS/PBCH block with index i is the same as the index of slot containing the candidate SS/PBCH block with index i. If using the configuration in multiplexing Pattern 1 for this example, the configuration is given by O is configurable between 0 and 5 (wherein 0 is defined as the timing offset between the starting of slots for monitoring Type0-PDCCH CSS and the starting of a half frame, expressed in ms), and M=½, such that the UE determines the index of the starting slot for monitoring Type0-PDCCH CSS as $n\_0 = (O*2^\mu + \text{floor}(i*M)) \mod N\_slot^\mu$, where $2^\mu$ is ratio of the SCS of DSCH comparing to 15 kHz (e.g., $\mu=1$ if using 30 kHz SCS for DSCH, and $\mu=0$ if using 15 kHz SCS for DSCH), i is the index of candidate SS/PBCH block in a half frame (e.g., i=0, 1, . . . , 19 if using 30 kHz SCS for DSCH, and i=0, 1, . . . , 9 if using 15 kHz SCS for DSCH), and $N\_slot^\mu$ is the number of slots in a frame with respect to SCS with parameter $\mu$ (e.g., $N\_slot^\mu=20$ if using 30 kHz SCS for DSCH, and $N\_slot^\mu=10$ if using 30 kHz SCS for DSCH).

Starting symbol index of Type0-PDCCH CSS is given by n_sym, wherein in one example, for M=½, n_sym=0 if i is even and n_sym=n_CORESET0 if i is odd, wherein i is the index of the associated candidate SS/PBCH block and n_CORESET0 is the number of symbols for CORESET 0; and in another example, for M=½, n_sym=0 if i is even and n_sym=7 if i is odd, wherein i is the index of the associated candidate SS/PBCH block.

In one aspect of this example, a UE assumes the half frame containing the associated SS/PBCH block is the same as the half frame containing the Type0-PDCCH monitoring occasion. For instance, it can be achieved by assuming the indication of half frame by the half frame indicator in the PBCH payload of the associated is same as the information of half frame provided by the parameter O in the configuration of Type0-PDCCH monitoring occasion, e.g., O=0 corresponds to the first half frame and O=5 corresponds to the second half frame. The UE only expects the combination of $\{\bar{a}_{HRF}=0, O=0\}$ or $\{\bar{a}_{HRF}=1, O=5\}$, wherein $\bar{a}_{HRF}$ is the half frame indicator in PBCH payload. An example configuration table can refer to TABLE 3-4.

In another example of this embodiment, a UE determines the index of the starting slot for monitoring Type0-PDCCH CSS as $n\_0 = (O*2^\mu + \text{floor}(i*M)) \mod N\_slot^\mu$, where $2^\mu$ is ratio of the SCS of DSCH comparing to 15 kHz (e.g., $\mu=1$ if using 30 kHz SCS for DSCH, and $\mu=0$ if using 15 kHz SCS for DSCH), i is the index of candidate SS/PBCH block in a half frame (e.g., i=0, 1, . . . , 19 if using 30 kHz SCS for DSCH, and i=0, 1, . . . , 9 if using 15 kHz SCS for DSCH), and $N\_slot^\mu$ is the number of slots in a frame with respect to SCS with parameter $\mu$ (e.g., $N\_slot^\mu=20$ if using 30 kHz SCS for DSCH, and $N\_slot^\mu=10$ if using 30 kHz SCS for DSCH). At least part of the following examples in TABLE 1 can be configurable as the configuration of O and M for this example. Starting symbol index of Type0-PDCCH CSS is given by n_sym, wherein in one example, for M=½, n_sym=0 if i is even and n_sym=n_CORESET0 if i is odd, wherein i is the index of the associated candidate SS/PBCH block and n_CORESET0 is the number of symbols for CORESET 0; and in another example, for M=½, n_sym=0 if i is even and n_sym=7 if i is odd, wherein i is the index of the associated candidate SS/PBCH block.

TABLE 1

Examples of parameters for Type0-PDCCH CSS.

| Index | O | No. of CSS per slot | M | First symbol index |
|---|---|---|---|---|
| 0 | 0 | 2 | ½ | n_sym |
| 1 | 0.5 | 2 | ½ | n_sym |
| 2 | 1 | 2 | ½ | n_sym |
| 3 | 1.5 | 2 | ½ | n_sym |
| 4 | 2 | 2 | ½ | n_sym |

In yet another example of this embodiment, a UE determines the index of the starting slot for monitoring Type0-PDCCH CSS as $n\_0 = (O*2^\mu + \text{floor}(i*M)) \mod N\_slot^\mu$, where $2^\mu$ is ratio of the SCS of DSCH comparing to 15 kHz (e.g., $\mu=1$ if using 30 kHz SCS for DSCH, and $\mu=0$ if using 15 kHz SCS for DSCH), i is the index of candidate SS/PBCH block in a half frame (e.g., i=0, 1, . . . , 19 if using 30 kHz SCS for DSCH, and i=0, 1, . . . , 9 if using 15 kHz SCS for DSCH), and $N\_slot^\mu$ is the number of slots in a frame with respect to SCS with parameter $\mu$ (e.g., $N\_slot^\mu=20$ if using 30 kHz SCS for DSCH, and $N\_slot^\mu=10$ if using 30 kHz SCS for DSCH). At least part of the following examples in TABLE 2 can be configurable as the configuration of O and M for this example. Starting symbol index of Type0-PDCCH CSS is given by n_sym, wherein in one example, for M=½, n_sym=0 if i is even and n_sym=n_CORESET0 if i is odd, wherein i is the index of the associated candidate SS/PBCH block and n_CORESET0 is the number of symbols for CORESET 0; and in another example, for M=½, n_sym=0 if i is even and n_sym=7 if i is odd, wherein i is the index of the associated candidate SS/PBCH block. In one example, for M=1, n_sym=0. In another example, for M=1, n_sym=7.

TABLE 2

Examples of parameters for Type0-PDCCH CSS.

| Index | O | No. of CSS per slot | M | First symbol index |
|---|---|---|---|---|
| 0 | 0 | 2 | ½ | n_sym |
| 1 | 0.5 | 2 | ½ | n_sym |
| 2 | 1 | 2 | ½ | n_sym |
| 3 | 1.5 | 2 | ½ | n_sym |
| 4 | 2 | 2 | ½ | n_sym |
| 5 | 0 | 1 | 1 | n_sym |
| 6 | 0.5 | 1 | 1 | n_sym |
| 7 | 1 | 1 | 1 | n_sym |
| 8 | 1.5 | 1 | 1 | n_sym |
| 9 | 2 | 1 | 1 | n_sym |

In yet another example of this embodiment, a UE determines the index of the starting slot for monitoring Type0-PDCCH CSS as $n\_0 = (O*2^\mu + \text{floor}(i*M)) \mod N\_slot^\mu$, where $2^\mu$ is ratio of the SCS of DSCH comparing to 15 kHz (e.g., $\mu=1$ if using 30 kHz SCS for DSCH, and $\mu=0$ if using 15 kHz SCS for DSCH), i is the index of candidate SS/PBCH block in a half frame (e.g., i=0, 1, . . . , 19 if using 30 kHz SCS for DSCH, and i=0, 1, . . . , 9 if using 15 kHz SCS for DSCH), and $N\_slot^\mu$ is the number of slots in a frame with respect to SCS with parameter $\mu$ (e.g., $N\_slot^\mu=20$ if using 30 kHz SCS for DSCH, and $N\_slot^\mu=10$ if using 30 kHz SCS for DSCH). At least part of the following examples in TABLE 3-1 can be configurable as the configuration of O and M for this example.

Starting symbol index of Type0-PDCCH CSS is given by n_sym, wherein in one example, for M=½, n_sym=0 if i is even and n_sym=n_CORESET0 if i is odd, wherein i is the index of the associated candidate SS/PBCH block and n_CORESET0 is the number of symbols for CORESET 0; and in another example, for M=½, n_sym=0 if i is even and n_sym=7 if i is odd, wherein i is the index of the associated candidate SS/PBCH block. In one example, for M=1, n_sym=0. In another example, for M=1, n_sym=7.

TABLE 3-1

Examples of parameters for Type0-PDCCH CSS.

| Index | O | No. of CSS per slot | M | First symbol index |
|---|---|---|---|---|
| 0 | 0 | 2 | ½ | n_sym |
| 1 | 0.5 | 2 | ½ | n_sym |
| 2 | 1 | 2 | ½ | n_sym |
| 3 | 1.5 | 2 | ½ | n_sym |
| 4 | 2 | 2 | ½ | n_sym |
| 5 | 0 | 1 | 1 | n_sym |
| 6 | 0.5 | 1 | 1 | n_sym |
| 7 | 1 | 1 | 1 | n_sym |
| 8 | 1.5 | 1 | 1 | n_sym |
| 9 | 2 | 1 | 1 | n_sym |
| 10 | 5 | 2 | ½ | n_sym |
| 11 | 5.5 | 2 | ½ | n_sym |
| 12 | 6 | 2 | ½ | n_sym |
| 13 | 6.5 | 2 | ½ | n_sym |
| 14 | 7 | 2 | ½ | n_sym |
| 15 | 5 | 1 | 1 | n_sym |
| 16 | 5.5 | 1 | 1 | n_sym |
| 17 | 6 | 1 | 1 | n_sym |
| 18 | 6.5 | 1 | 1 | n_sym |
| 19 | 7 | 1 | 1 | n_sym |

In yet another example of this embodiment, a UE determines the index of the starting slot for monitoring Type0-PDCCH CSS as $n\_0=(O*2^\mu + floor(i*M))\ mod\ N\_slot^\mu$, where $2^\mu$ is ratio of the SCS of DSCH comparing to 15 kHz (e.g., $\mu=1$ if using 30 kHz SCS for DSCH, and $\mu=0$ if using 15 kHz SCS for DSCH), i is the index of candidate SS/PBCH block in a half frame (e.g., i=0, 1, ..., 19 if using 30 kHz SCS for DSCH, and i=0, 1, ..., 9 if using 15 kHz SCS for DSCH), and $N\_slot^\mu$ is the number of slots in a frame with respect to SCS with parameter μ (e.g., $N\_slot^\wedge=20$ if using 30 kHz SCS for DSCH, and $N\_slot^\wedge=10$ if using 30 kHz SCS for DSCH). Starting symbol index of Type0-PDCCH CSS is given by n_sym, wherein in one example, for M=½, n_sym=0 if i is even and n_sym=n_CORESET0 if i is odd, wherein i is the index of the associated candidate SS/PBCH block and n_CORESET0 is the number of symbols for CORESET 0; and in another example, for M=½, n_sym=0 if i is even and n_sym=7 if i is odd, wherein i is the index of the associated candidate SS/PBCH block. In another example, for M=1, n_sym=0. The set of supported {O, M, No. of CSS per slot} can be down-selected from NR specification, and examples of the supported configurations are shown in TBLE 3-2 to TABLE 3-5. This is equivalent to adding restriction of using configurations in NR specification.

In one example as in TABLE 3-22, NR-U supports M=½ only.

TABLE 3-2

Examples of parameters for Type0-PDCCH CSS.

| Index | O | No. of CSS per slot | M | First symbol index |
|---|---|---|---|---|
| 0 | 0 | 2 | ½ | n_sym |
| 1 | 2 | 2 | ½ | n_sym |

TABLE 3-2-continued

Examples of parameters for Type0-PDCCH CSS.

| Index | O | No. of CSS per slot | M | First symbol index |
|---|---|---|---|---|
| 2 | 5 | 2 | ½ | n_sym |
| 3 | 7 | 2 | ½ | n_sym |

In another example as in TABLE 3-3, NR-U supports M=½, and M=1 with the condition that O is either 2 or 7.

TABLE 3-3

Examples of parameters for Type0-PDCCH CSS.

| Index | O | No. of CSS per slot | M | First symbol index |
|---|---|---|---|---|
| 0 | 0 | 2 | ½ | n_sym |
| 1 | 2 | 2 | ½ | n_sym |
| 2 | 2 | 1 | 1 | n_sym |
| 3 | 5 | 2 | ½ | n_sym |
| 4 | 7 | 2 | ½ | n_sym |
| 5 | 7 | 1 | 1 | n_sym |

In yet another example as in TABLE 3-3, NR-U supports M=½ with the condition that O is either 0 or 5.

TABLE 3-4

Examples of parameters for Type0-PDCCH CSS.

| Index | O | No. of CSS per slot | M | First symbol index |
|---|---|---|---|---|
| 0 | 0 | 2 | ½ | n_sym |
| 1 | 5 | 2 | ½ | n_sym |

In yet another example as in TABLE 3-5, NR-U supports M=½ and M=1.

TABLE 3-5

Examples of parameters for Type0-PDCCH CSS.

| Index | O | No. of CSS per slot | M | First symbol index |
|---|---|---|---|---|
| 0 | 0 | 2 | ½ | n_sym |
| 1 | 0 | 1 | 1 | n_sym |
| 2 | 2 | 2 | ½ | n_sym |
| 3 | 2 | 1 | 1 | n_sym |
| 4 | 5 | 2 | ½ | n_sym |
| 5 | 5 | 1 | 1 | n_sym |
| 6 | 7 | 2 | ½ | n_sym |
| 7 | 7 | 1 | 1 | n_sym |

In yet another example, M=2 is not supported for NR-U.

In yet another example, some of the M values are not supported for NR-U, with a condition that the configured parameter for determining the QCL assumption of SS/PBCH blocks (e.g., wrapped-around modulo value) is small, e.g., in order to avoid large number of slots for Type0-PDCCH monitoring. For one instance, a UE does not expect to be configured with M=2 if the parameter for determining the QCL assumption of SS/PBCH blocks is 1 (e.g., Q=1). For instance, a UE does not expect to be configured with M=2 if the parameter for determining the QCL assumption of SS/PBCH blocks is 1 or 2 (e.g., Q=1 or 2), and does not expect to be configured with M=1 if the parameter for determining the QCL assumption of SS/PBCH blocks is 1 (e.g., Q=1).

In yet another embodiment, the transmission of DSCH can be impacted by the LBT result, e.g., the burst of SS/PBCH block could be wrapped around, subject to LBT, according to a wrapped-around modulo value, to allow more transmission opportunities. In one approach for this embodiment, the associated Type0-PDCCH CSS is also wrapped around correspondingly, such that Type0-PDCCH also has more transmission opportunities. From the UE's perspective, the original candidate SS/PBCH block and the new candidate SS/PBCH blocks after wrapped-around are assumed to be QCLed, and they together form a group of QCLed candidate SS/PBCH blocks. Hence, upon receiving one SS/PBCH block, the UE can determine the group of QCLed candidate SS/PBCH blocks, and then the UE may need to monitor a group of monitoring occasions for Type0-PDCCH CSS, wherein each of the monitor occasion is associated to one candidate SS/PBCH block within the group of QCLed candidate SS/PBCH blocks. The association of the candidate SS/PBCH block and the corresponding slot(s) containing Type0-PDCCH CSS can be according to the embodiments of the present disclosure. Examples for this approach are shown in FIGS. 14A and 14B, and an example flow chart for a UE procedure is shown in FIG. 14C.

Figure 14A:
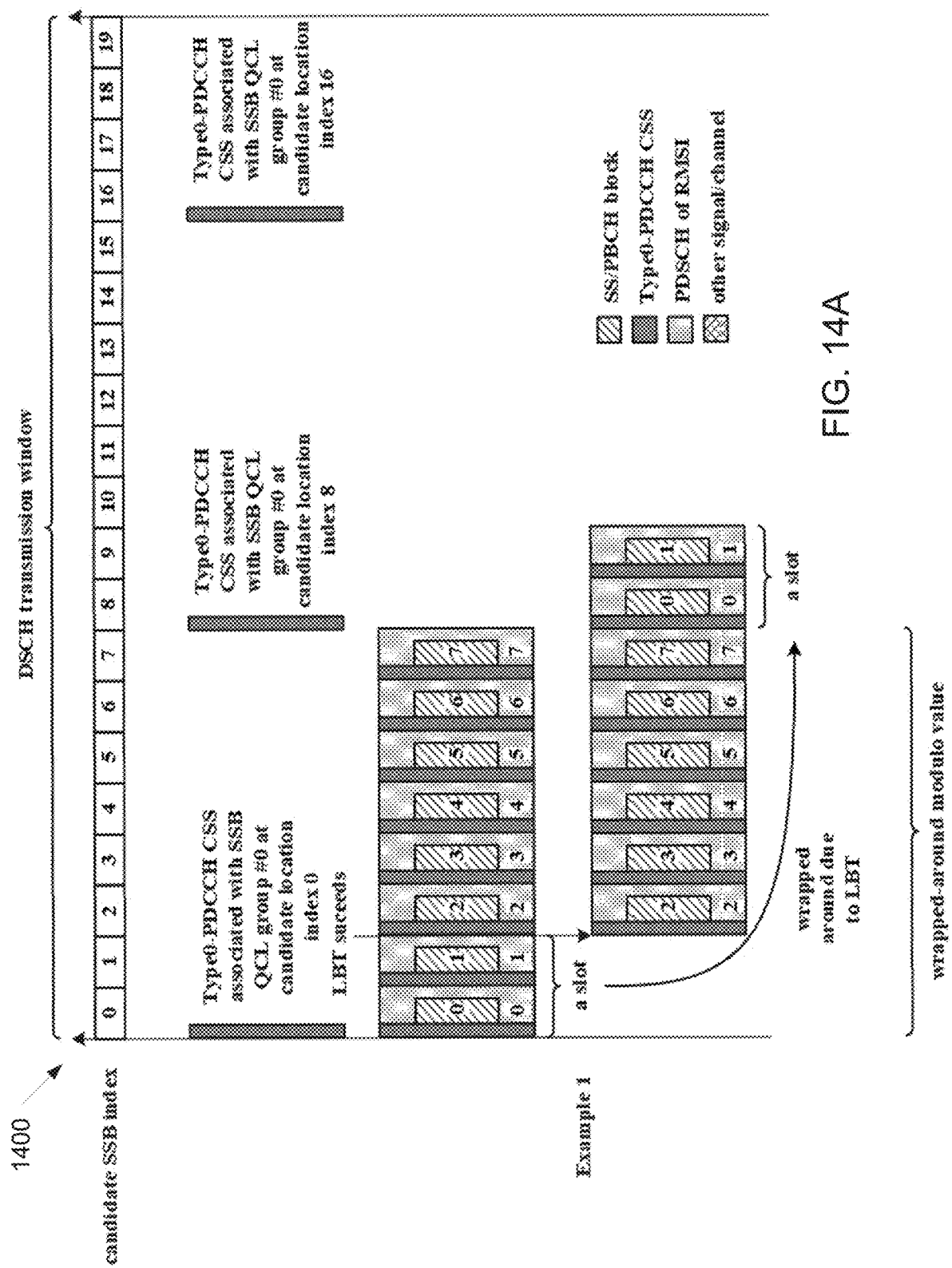
FIG. 14A illustrates an example Type0-PDCCH common search space after wrapping around according to embodiments of the present disclosure.

FIG. 14A illustrates an example Type0-PDCCH common search space 1400 after wrapping around according to embodiments of the present disclosure. An embodiment of the Type0-PDCCH common search space 1400 shown in FIG. 14A is for illustration only. One or more of the components illustrated in FIG. 14A can be implemented in specialized circuitry configured to perform the noted functions or one or more of the components can be implemented by one or more processors executing instructions to perform the noted functions. Other embodiments are used without departing from the scope of the present disclosure.

Figure 14B:
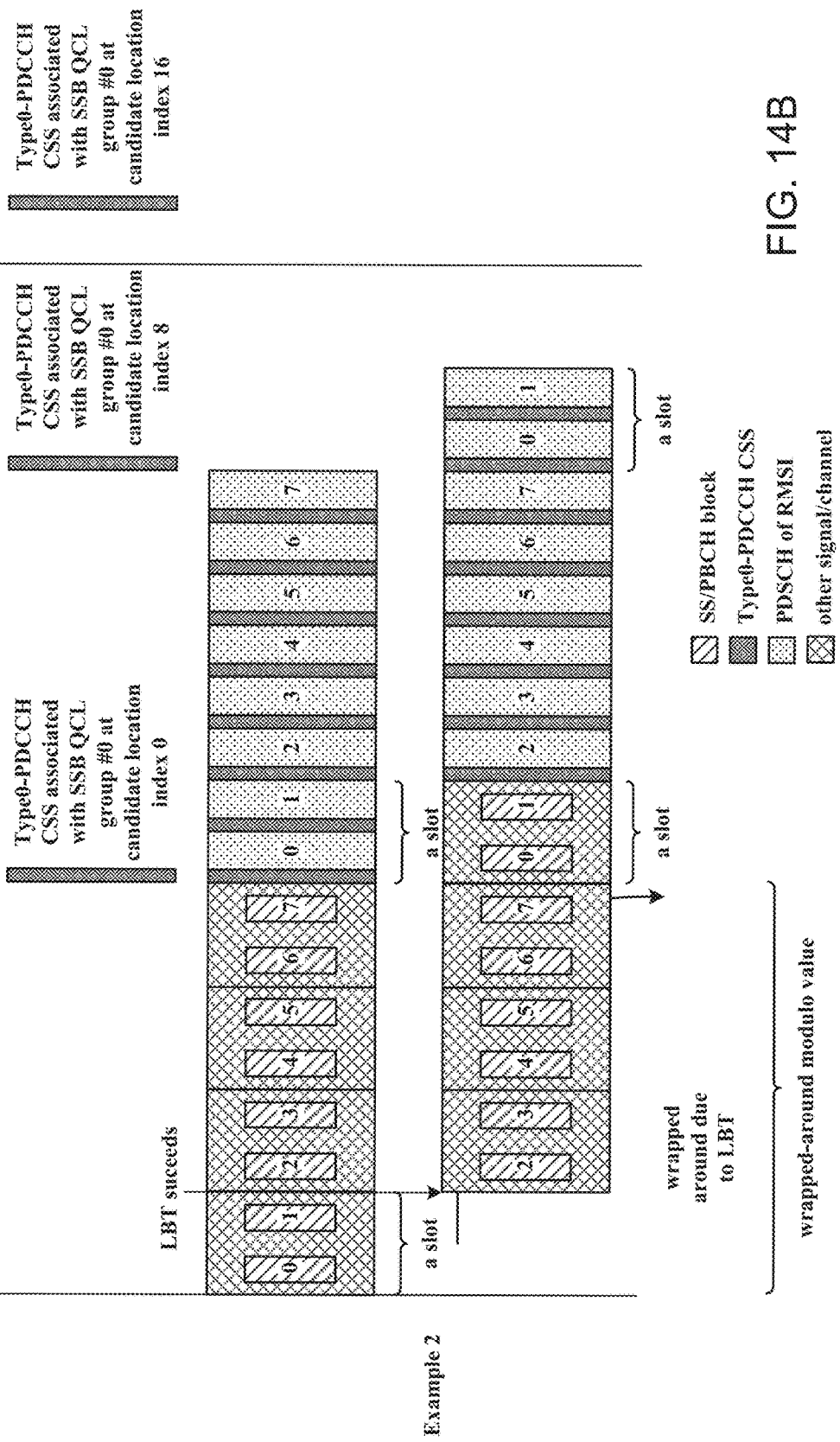
FIG. 14B illustrates an example Type0-PDCCH common search space after wrapping around according to embodiments of the present disclosure.

FIG. 14B illustrates an example Type0-PDCCH common search space 1450 after wrapping around according to embodiments of the present disclosure. An embodiment of the Type0-PDCCH common search space 1450 shown in FIG. 14B is for illustration only. One or more of the components illustrated in FIG. 14B can be implemented in specialized circuitry configured to perform the noted functions or one or more of the components can be implemented by one or more processors executing instructions to perform the noted functions. Other embodiments are used without departing from the scope of the present disclosure.

Figure 14C:
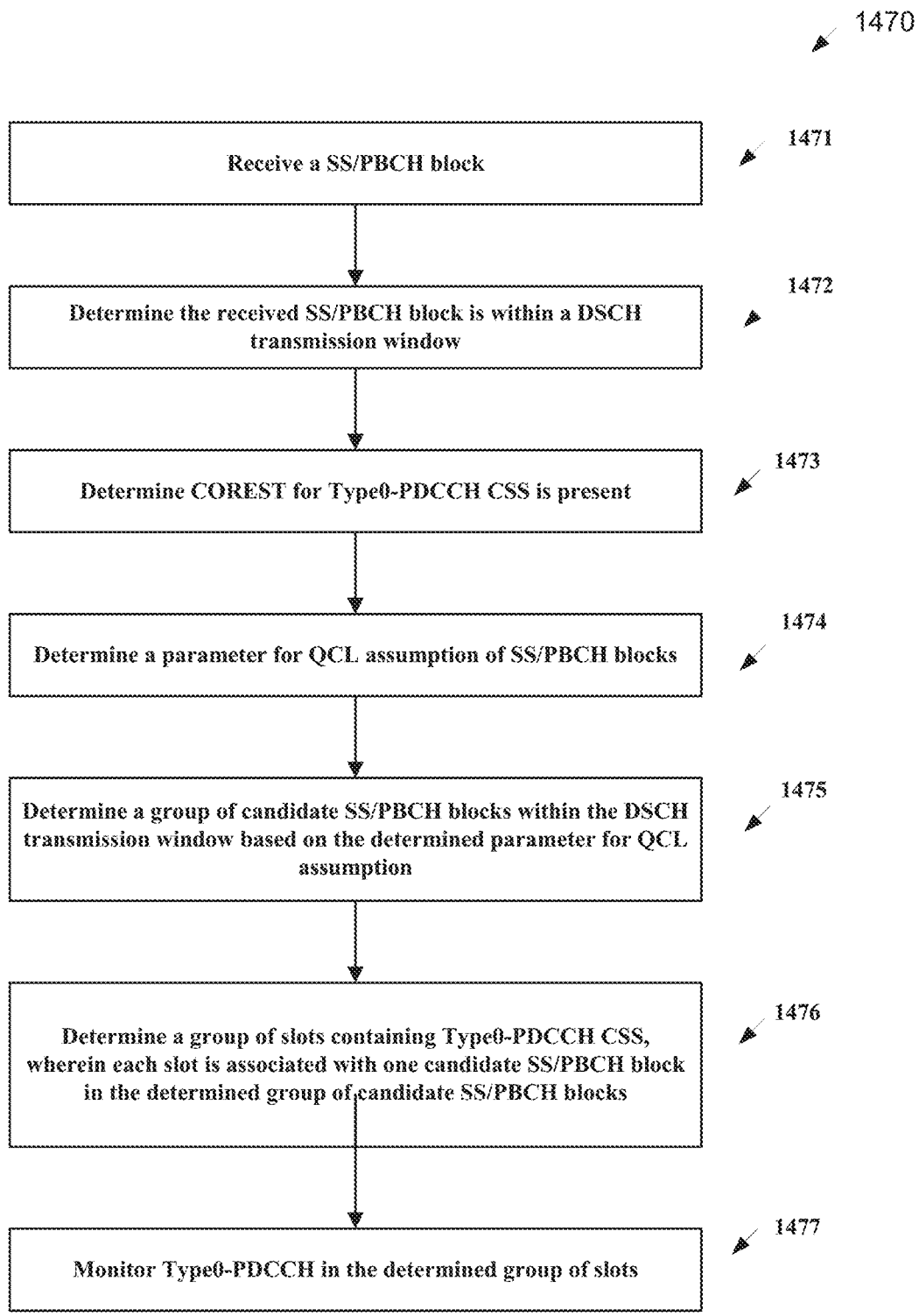
FIG. 14C illustrates an example UE procedure for monitoring Type0-PDCCH on unlicensed spectrum according to embodiments of the present disclosure.

FIG. 14C illustrates an example UE procedure for monitoring Type0-PDCCH on unlicensed spectrum 1470 according to embodiments of the present disclosure. An embodiment of the UE procedure for monitoring Type0-PDCCH on unlicensed spectrum 1470 shown in FIG. 14C is for illustration only. One or more of the components illustrated in FIG. 14C can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 14C, in step 1471, the UE receive a SS/PBCH block. In step 1472, the UE determines the received SS/PBCH block is within a DSCH transmission window. In step 1473, the UE determines COREST for Type0-PDCCH CSS is present. The UE, in step 1474, determines a parameter for QCL assumption of SS/PBCH blocks. In step 1475, the UE determines a group of candidate SS/PBCH blocks within the DSCH transmission window based on the determined parameter for QCL assumption. The UE in step 1476 determine a group of slots containing Type0-PDCCH CSS, wherein each slot is associated with one candidate SS/PBCH block in the determined group of candidate SS/PCH blocks. Finally, in step 1477, the UE monitors Type0-PDCCH in the determined group of slots.

In Example 1 of FIG. 14A, the transmission of SS/PBCH block(s) and its associated PDCCH/PDSCH of RMSI in the same slot are wrapped around together, according to a wrapped-around modulo value (e.g., configured QCL parameter). In one aspect of this example, if a UE detects a SS/PBCH block before monitoring the Type0-PDCCH occasion (e.g., in the initial access procedure), the UE can assume the slot(s) for monitoring Type0-PDCCH occasion is the same as the received QCLed SS/PBCH block. In another aspect of this example, if a UE does not detect or does not require to detect a SS/PBCH block before monitoring the Type0-PDCCH occasion (e.g., after the initial access procedure or in general), the UE can assume the set of slots for monitoring Type0-PDCCH occasion are given by the slots containing the associated group of QCLed candidate SS/PBCH blocks.

For instance, if denoting the slots for monitoring Type0-PDCCH occasion as s_PDCCH, then s_PDCCH modulo M_SSB=s_SSB and s_PDCCH is within the DSCH transmission window, wherein s_SSB is the index of first slot containing the SS/PBCH block position in the DSCH transmission window and QCLed with the DMRS of the Type0-PDCCH, and M_SSB is the wrapped-around modulo value in the unit of slot. In one consideration for this aspect, the UE may assume Type0-PDCCH is transmitted in only one slot of the set of slots for monitoring Type0-PDCCH occasion, and the UE could monitor the Type0-PDCCH occasion based on the set of slots in a time increasing order until one Type0-PDCCH is decoded or reaching the end of the set of slots.

In Example 2 of FIG. 14B, the transmission of SS/PBCH block(s) and its associated PDCCH/PDSCH of RMSI in the different slots are wrapped around together, according to a wrapped-around modulo value (e.g., configured QCL parameter). In one aspect of this example, if a UE detects a SS/PBCH block before monitoring the Type0-PDCCH occasion (e.g., in the initial access procedure), the UE can assume the slot(s) for monitoring Type0-PDCCH occasion is the determined as the one associated with the received QCLed SS/PBCH block.

In another aspect of this example, if a UE does not detect or does not require to detect a SS/PBCH block before monitoring the Type0-PDCCH occasion (e.g., after the initial access procedure or in general), the UE can assume the set of slots for monitoring Type0-PDCCH occasion are given by the slots containing the monitoring Type0-PDCCH occasions associated with the group of QCLed candidate SS/PBCH blocks. In one consideration for this aspect, the UE may assume Type0-PDCCH is transmitted in only one slot of the set of slots for monitoring Type0-PDCCH occasion, and the UE could monitor the Type0-PDCCH occasion based on the set of slots in a time increasing order until one Type0-PDCCH is decoded or reaching the end of the set of slots. Note that in this example, part of the slot(s) containing Type0-PDCCH monitoring occasion can be outside the DSCH transmission window (e.g., the slot(s) containing Type0-PDCCH monitoring occasion associated with candidate SSB index 16 as in the figure).

In NR specification, the configuration of Type0A-PDCCH common search space (CSS), i.e., the CSS for OSI, is indicated in the content of RMSI. For NR-U, there a need for enhancement and/or modification to the configuration of Type0A-PDCCH CSS, such that the configured time-domain location of the Type0A-PDCCH CSS is more appropriate for unlicensed band operation, especially for NR-U DSCH. The following embodiments details the design of configuration of Type0A-PDCCH CSS.

In one embodiment, for NR-U DSCH, there is an indication that whether a UE needs to monitor Type0A-PDCCH CSS (e.g., whether there is OSI multiplexed in/with the DSCH). For one example, the indication can be in the content of PBCH within the DSCH. For another example, the indication can be in the content of RMSI (e.g., PDSCH of RMSI) within in the DSCH. For yet another example, the indication can be in the DCI format for Type0-PDCCH (e.g., PDCCH of RMSI) within the DSCH.

In another embodiment, on the same frequency layer, the configuration of Type0A-PDCCH CSS is the same. For one example, if there can be Type0A-PDCCH CSS both within and outside a DSCH transmission window, the configuration of Type0A-PDCCH CSS within a DSCH transmission window is the same as the configuration of Type0A-PDCCH CSS outside a DSCH transmission window, and both of them are indicated by a same configuration. For another example, a UE assumes all Type0-PDCCH CSS are configured in a DSCH transmission window, and the same configuration of Type0A-PDCCH CSS is indicated to the UE.

In yet another embodiment, on the same frequency layer, the configuration of Type0A-PDCCH CSS within a DSCH transmission window can be different from the configuration of Type0A-PDCCH CSS outside a DSCH transmission window. In one example, the indication of the configuration of Type0A-PDCCH CSS within and outside the DSCH transmission window can be using two separate fields in RMSI. In another example, the indication of the configuration of Type0A-PDCCH CSS within the DSCH transmission window can be in a DCI format for Type0-PDCCH within the DSCH, and the indication of the configuration of Type0A-PDCCH CSS outside the DSCH transmission window can be using a field in the RMSI (e.g., same as NR specification).

In yet another example, the indication of the configuration of Type0A-PDCCH CSS within and outside the DSCH transmission window can be using the same field in RMSI, and the value of the field can be configured separately for the configuration of Type0A-PDCCH CSS within and outside the DSCH transmission window such that the content of RMSI may or may not be the same within and outside the DSCH transmission window. In yet another example, the configuration of Type0A-PDCCH CSS within the DSCH transmission window is fixed (e.g., no need for indication) and the configuration of Type0A-PDCCH CSS outside the DSCH transmission window can be using a field in the RMSI (e.g., same as NR specification or selected from the configuration as in NR specification).

In yet another embodiment, if a UE determines the Type0A-PDCCH CSS is within a DSCH, the monitoring periodicity of Type0A-PDCCH CSS can be the same as the periodicity of DSCH transmission window.

In yet another embodiment, if a UE determines the Type0A-PDCCH CSS is within a DSCH, and a time-domain offset for the transmission of the associated SS/PBCH block, where the SS/PBCH block is QCLed with the DMRS of Type0A-PDCCH and located in the same DSCH window, (e.g., the offset denoted as O_SSB in the unit of slot) is known to the UE (e.g., by using signal/channel in the corresponding SS/PBCH block), the UE can determine the slot index for Type0A-PDCCH CSS as n_0A+O_SSB, wherein n_0A is the configured slot index for Type0A-PDCCH CSS.

In yet another embodiment, if there is an indication for a configuration of Type0A-PDCCH CSS within a DSCH transmission window (e.g., in DCI format for Type0-PDCCH CSS or RMSI content or PBCH content), there can be one configuration (e.g., one codepoint in a table) indicating there is no Type0A-PDCCH CSS required to monitor within the DSCH.

In yet another embodiment, if a UE is not monitoring Type0-PDCCH CSS within a DSCH transmission window, the UE does not need to monitor Type0A-PDCCH CSS within the same DSCH transmission window.

In yet another embodiment, a UE is not expected to monitor Type0A-PDCCH CSS in slots prior to the slot wherein a UE detects the QCLed SS/PBCH block and/or Type0-PDCCH (e.g., PDCCH of RMSI) in the same DSCH transmission window.

In yet another embodiment, the number of slot for monitoring Type0A-PDCCH CSS within a DSCH transmission window corresponding to an SS/PBCH block is 1, where the SS/PBCH block is QCLed with the DMRS of Type0A-PDCCH and located in the same DSCH transmission window.

In yet another embodiment, the set of configurations of Type0A-PDCCH CSS indicating the location of Type0A-PDCCH CSS can be compact with the QCLed SS/PBCH block and Type0-PDCCH CSS, and the transmission of SS/PBCH block and the QCLed PDCCH/PDSCH of RMSI/OSI can share the same LBT. One or multiple of the following approaches can be supported for NR-U, and it can be configurable among the approaches if multiple approaches are supported.

In one approach for this embodiment, the configuration for the Type0-PDCCH CSS within the DSCH transmission window in the present disclosure can be reused for Type0A-PDCCH CSS within DSCH transmission window.

In one example, all the Type0-PDCCH CSS in FIG. 9 to FIGS. 13A and 13B can be replaced by Type0A-PDCCH CSS, and the examples still apply to the configuration for Type0A-PDCCH CSS within the DSCH transmission window.

For another example, at least part of the following examples in TABLE 4(a) and TABLE 4(b) can be configurable as the configuration of Type0A-PDCCH CSS, wherein O_A and M_A are parameters for determining the slot index of CSS, e.g., a UE determines the index of the starting slot for monitoring Type0A-PDCCH CSS as n_0A= (n_DSCH+OA*$2^\mu$+ floor(i*M_A)) mod N_slot$^\mu$, where n_DSCH is the starting slot index within the frame of a DSCH transmission window, $2^\mu$ is ratio of the SCS of DSCH comparing to 15 kHz (e.g., μ=1 if using 30 kHz SCS for DSCH), i is the SS/PBCH block index, and N_slot$^\mu$ is the number of slots in a frame with respect to SCS with parameter μ (e.g., N_slot$^\mu$=20 if using 30 kHz SCS for DSCH). n_sym_A is the first symbol index of Type0A-PDCCH CSS, which can be determined using at least one of the following examples.

In one example, for M_A=½, n_sym_A=0 if i is even and n_sym_A=n_CORESET0 if i is odd, wherein i is the associated SS/PBCH block index and n_CORESET0 is the number of symbols for CORESET 0. In yet another example, for $M\_A=\frac{1}{2}$, $n\_sym\_A=0$ if i is even and $n\_sym\_A=7$ if i is odd, wherein i is the associated SS/PBCH block index.

TABLE 4(a)

Examples of parameters for Type0A-PDCCH CSS.

| Index | O_A | No. of CSS per slot | M_A | First symbol index |
|---|---|---|---|---|
| 0 | No need to monitor Type0A-PDCCH CSS | | | |
| 1 | 0 | 2 | ½ | n_sym_A |
| 2 | 0.5 | 2 | ½ | n_sym_A |
| 3 | 1 | 2 | ½ | n_sym_A |
| 4 | 1.5 | 2 | ½ | n_sym_A |
| 5 | 2 | 2 | ½ | n_sym_A |

TABLE 4(b)

Examples of parameters for TypeOA-PDCCH CSS.

| Index | O_A | No. of CSS per slot | M_A | First symbol index |
|---|---|---|---|---|
| 0 | No need to monitor Type0A-PDCCH CSS | | | |
| 1 | 0 | 2 | ½ | n_sym_A |
| 2 | 0.5 | 2 | ½ | n_sym_A |
| 3 | 1 | 2 | ½ | n_sym_A |
| 4 | 1.5 | 2 | ½ | n_sym_A |
| 5 | 2 | 2 | ½ | n_sym_A |
| 6 | 5 | 2 | ½ | n_sym_A |
| 7 | 5.5 | 2 | ½ | n_sym_A |
| 8 | 6 | 2 | ½ | n_sym_A |
| 9 | 6.5 | 2 | ½ | n_sym_A |
| 10 | 7 | 2 | ½ | n_sym_A |

Figure 15A:
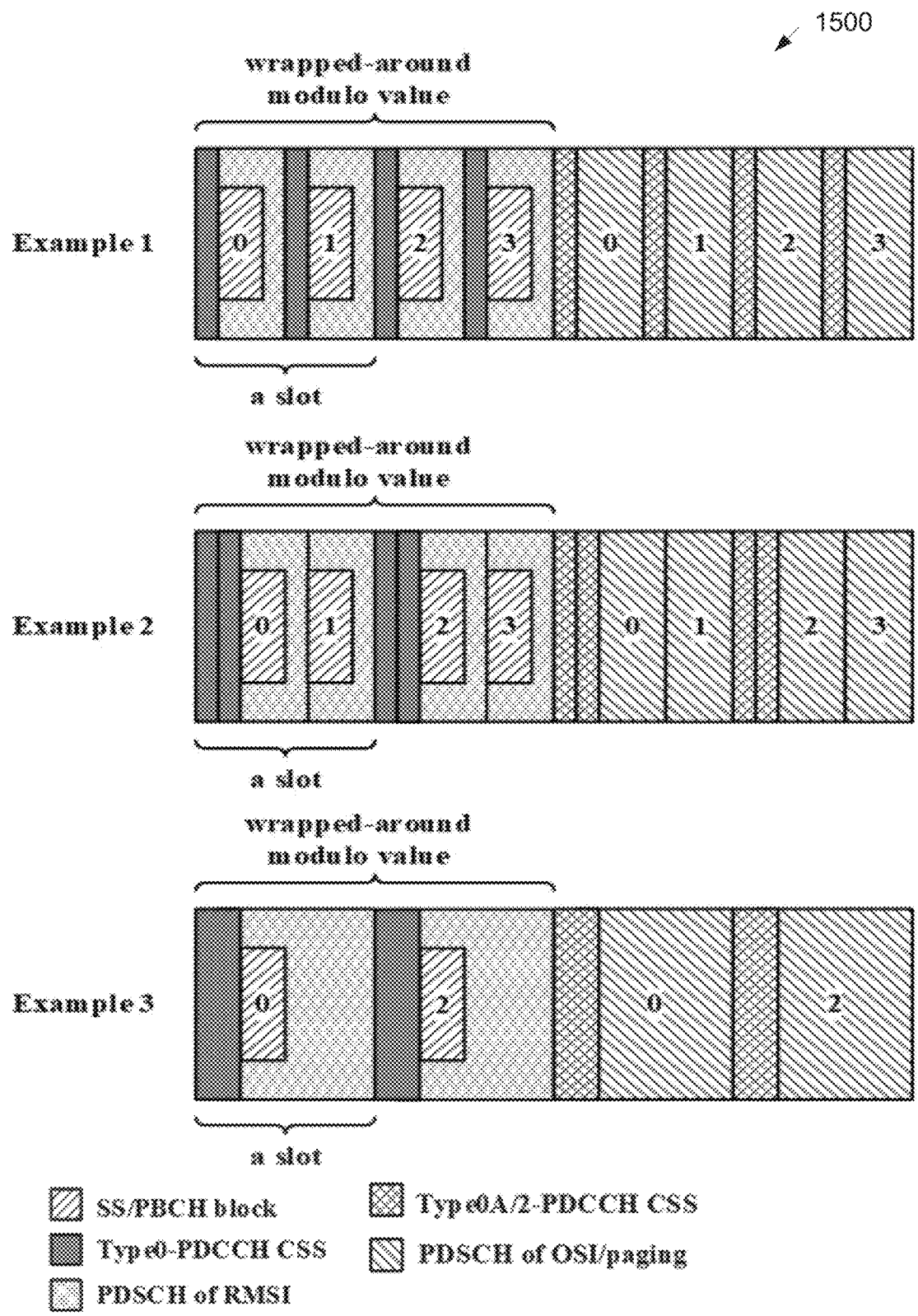
FIG. 15A illustrates an example configuration of Type0A/2-PDCCH CSS based on the configuration of Type0-PDCCH CSS as well as the wrapped-around modulo value according to embodiments of the present disclosure.

For yet another example, the transmission of the burst of PDCCH/PDSCH of OSI can be right after the transmission of the burst of PDCCH/PDSCH of RMSI, and the configuration of Type0A-PDCCH CSS can be determined based on the configuration of Type0-PDCCH CSS. When the transmission of SS/PBCH block is subject to a wrapped-around modulo value to allow more transmission opportunities in order to compensate the loss due to LBT, a SS/PBCH block (e.g., as well as the associated QCLed PDCCH and PDSCH of RMSI) is wrapped-around to a later transmission opportunity within the same DSCH transmission window, then the wrapped-around modulo value can also be utilized to determine the Type0A-PDCCH CSS. FIG. 15A illustrates examples of determining the configuration of Type0A-PDCCH CSS based on the configuration of Type0-PDCCH CSS as well as the wrapped-around modulo value, wherein the slot for monitoring Type0A-PDCCH CSS is the slot for monitoring Type0-PDCCH CSS plus the wrapped-around modulo value (e.g., the Type0-PDCCH CSS is wrapped-around accordingly).

In one aspect, the periodicity of monitoring Type0A-PDCCH CSS is the same as the monitoring Type0-PDCCH CSS, when the two CSS are both multiplexed in/with DSCH. In another aspect, the SFN for monitoring Type0A-PDCCH CSS is the same as the monitoring Type0-PDCCH CSS, when the two CSS are both multiplexed in/with DSCH. In yet another aspect, the starting symbol index for monitoring Type0A-PDCCH CSS is the same as the monitoring Type0-PDCCH CSS, when the two CSS are both multiplexed in/with DSCH.

In yet another approach for this embodiment, the transmission of part of the burst of PDCCH/PDSCH of OSI can be right after the transmission of part of the burst of PDCCH/PDSCH of RMSI. For example, the actually transmitted SS/PBCH blocks are not all the possible SS/PBCH blocks, and they can be divided into multiple parts within the burst, then the transmission of corresponding RMSI followed by OSI can follow parts of the burst of SS/PBCH blocks.

In yet another embodiment, the configuration of Type0A-PDCCH CSS can be determined based on the indication of actually transmitted SS/PBCH blocks in RMSI (e.g., a bitmap with length L_max), and no separate configuration of Type0A-PDCCH CSS is required. For example, at least part of the following examples in TABLE 5 can be used as the configuration of Type0A-PDCCH CSS based on the bitmap indicating the actually transmitted SS/PBCH blocks, wherein O_A and M_A are parameters for determining the slot index of CSS, e.g., a UE determines the index of the starting slot for monitoring Type0A-PDCCH CSS as $n\_0A = (n\_DSCH + O\_A * 2^\mu + \text{floor}(i * M\_A)) \mod N\_slot^\mu$, where n_DSCH is the starting slot index within the frame of a DSCH transmission window, $2^\mu$ is ratio of the SCS of DSCH comparing to 15 kHz (e.g., $\mu=1$ if using 30 kHz SCS for DSCH), i is the SS/PBCH block index, and $N\_slot^\mu$ is the number of slots in a frame with respect to SCS with parameter $\mu$ (e.g., $N\_slot^\mu=20$ if using 30 kHz SCS for DSCH). n_sym_A is the first symbol index of Type0A-PDCCH CSS, which can be determined using at least one of the following examples.

In one example, for $M\_A=\frac{1}{2}$, $n\_sym\_A=0$ if i is even and $n\_sym\_A=n\_CORESET0$ if i is odd, wherein i is the associated SS/PBCH block index and n_CORESET0 is the number of symbols for CORESET 0. In yet another example, for $M\_A=\frac{1}{2}$, $n\_sym\_A=0$ if i is even and $n\_sym\_A=7$ if i is odd, wherein i is the associated SS/PBCH block index.

TABLE 5

Examples of parameters for Type0A-PDCCH CSS based on bitmap of actually transmitted SS/PBCH blocks.

| Bitmap | O_A | No. of CSS per slot | M_A | First symbol index |
|---|---|---|---|---|
| 10000000 | 0.5 | 1 | 1 | 0 |
| 00100000 | 0.5 | 1 | 1 | 0 |
| 00001000 | 0.5 | 1 | 1 | 0 |
| 00000010 | 0.5 | 1 | 1 | 0 |
| 11000000 | 0.5 | 2 | ½ | n_sym_A |
| 00110000 | 0.5 | 2 | ½ | n_sym_A |
| 00001100 | 0.5 | 2 | ½ | n_sym_A |
| 00000011 | 0.5 | 2 | ½ | n_sym_A |
| 10100000 | 1 | 1 | 1 | 0 |
| 00101000 | 1 | 1 | 1 | 0 |
| 00001010 | 1 | 1 | 1 | 0 |
| 10101000 | 1.5 | 1 | 1 | 0 |
| 00101010 | 1.5 | 1 | 1 | 0 |
| 10101010 | 2 | 1 | 1 | 0 |
| 11110000 | 1 | 2 | ½ | n_sym_A |
| 00111100 | 1 | 2 | ½ | n_sym_A |
| 00001111 | 1 | 2 | ½ | n_sym_A |
| 11111100 | 1.5 | 2 | ½ | n_sym_A |
| 00111111 | 1.5 | 2 | ½ | n_sym_A |
| 11111111 | 2 | 2 | ½ | n_sym_A |

Figure 15B:
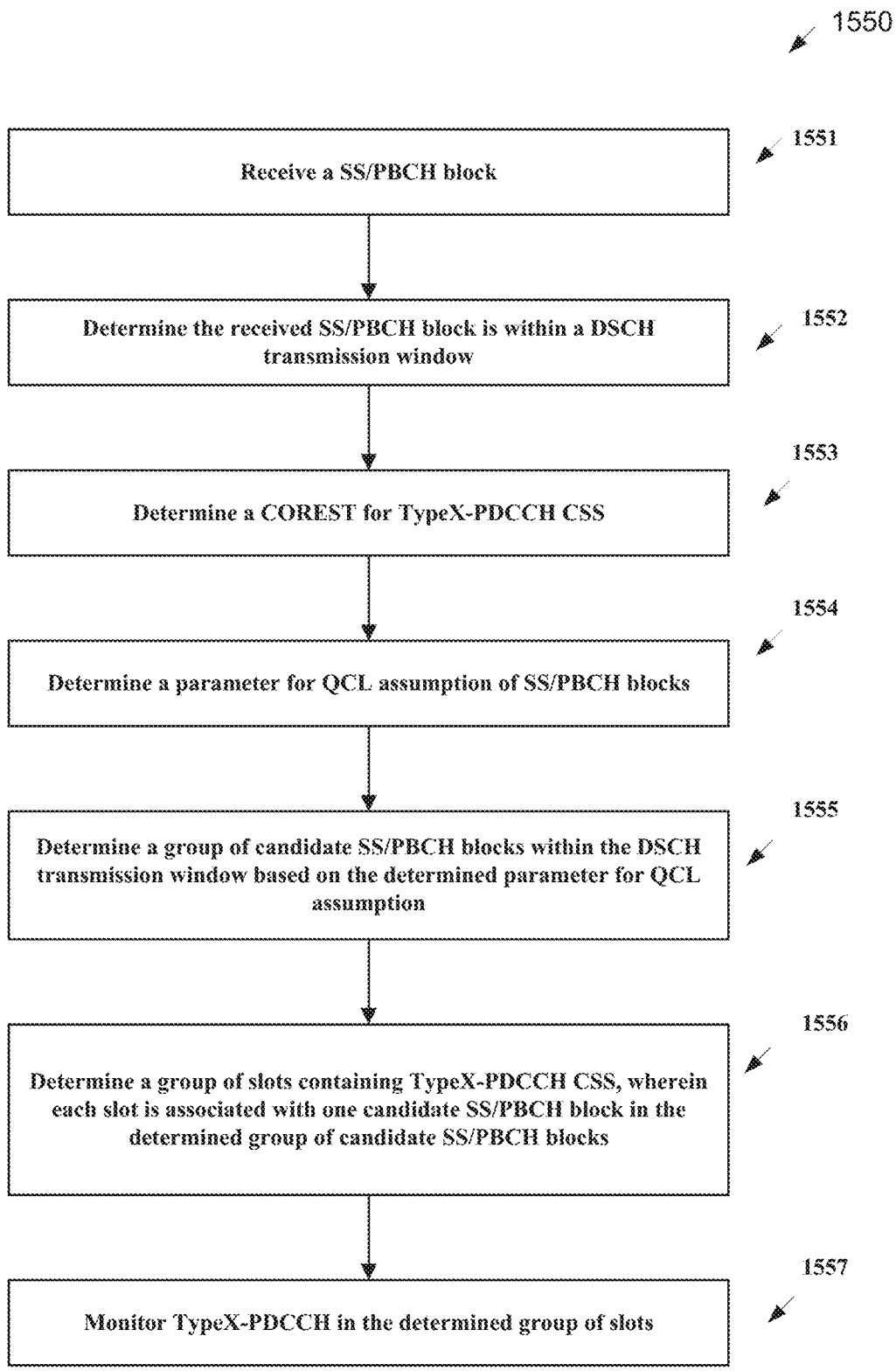
FIG. 15B illustrates an example UE procedure for monitoring TypeX-PDCCH on unlicensed spectrum according to embodiments of the present disclosure.

In yet another embodiment, the transmission of DSCH can be impacted by the LBT result, e.g., the burst of SS/PBCH block could be wrapped around, subject to LBT, according to a wrapped-around modulo value, to allow more transmission opportunities. In one approach for this embodiment, the associated Type0A-PDCCH CSS is also wrapped around correspondingly, such that Type0A-PDCCH also has more transmission opportunities. From the UE's perspective, the original candidate SS/PBCH block and the new candidate SS/PBCH blocks after wrapped-around are assumed to be QCLed, and they together form a group of QCLed candidate SS/PBCH blocks. Hence, upon receiving one SS/PBCH block, the UE can determine the group of QCLed candidate SS/PBCH blocks, and then the UE may need to monitor a group of monitoring occasions for Type0A-PDCCH CSS, wherein each of the monitor occasion is associated to one candidate SS/PBCH block within the group of QCLed candidate SS/PBCH blocks. The association of the candidate SS/PBCH block and the corresponding slot(s) containing Type0A-PDCCH CSS can be according to the embodiments of the present disclosure. An example flow chart for a UE procedure is shown in FIG. 15B, where X refers to "0A."

In NR specification, the configuration of Type2-PDCCH common search space (CSS), i.e., the CSS for paging, is indicated in the content of RMSI. For NR-U, there a need for enhancement and/or modification to the configuration of Type2-PDCCH CSS, such that the configured time-domain location of the Type2-PDCCH CSS is more appropriate for unlicensed band operation, especially for NR-U DSCH. The following embodiments details the design of configuration of Type2-PDCCH CSS.

In one embodiment, for NR-U DSCH, there is an indication that whether a UE needs to monitor Type2-PDCCH CSS (e.g., whether there is paging multiplexed in/with the DSCH). For one example, the indication can be in the content of PBCH within the DSCH. For another example, the indication can be in the content of RMSI (e.g., PDSCH of RMSI) within in the DSCH. For yet another example, the indication can be in the DCI format for Type0-PDCCH within the DSCH.

In another embodiment, on the same frequency layer, the configuration of Type2-PDCCH CSS is the same. For one example, if there can be Type2-PDCCH CSS both within and outside a DSCH transmission window, the configuration of Type2-PDCCH CSS within a DSCH transmission window is the same as the configuration of Type2-PDCCH CSS outside a DSCH transmission window, and both of them are indicated by a same configuration. For another example, a UE assumes all Type0-PDCCH CSS are configured in a DSCH transmission window, and the same configuration of Type2-PDCCH CSS is indicated to the UE.

In yet another embodiment, on the same frequency layer, the configuration of Type2-PDCCH CSS within a DSCH transmission window can be different from the configuration of Type2-PDCCH CSS outside a DSCH transmission window. In one example, the indication of the configuration of Type2-PDCCH CSS within and outside the DSCH transmission window can be using two separate fields in RMSI.

In another example, the indication of the configuration of Type2-PDCCH CSS within the DSCH transmission window can be in a DCI format for Type0-PDCCH within the DSCH, and the indication of the configuration of Type2-PDCCH CSS outside the DSCH transmission window can be using a field in the RMSI (e.g., same as NR specification). In yet another example, the indication of the configuration of Type2-PDCCH CSS within and outside the DSCH transmission window can be using the same field in RMSI, and the value of the field can be configured separately for the configuration of Type2-PDCCH CSS within and outside the DSCH transmission window such that the content of RMSI may or may not be the same within and outside the DSCH transmission window. In yet another example, the configuration of Type2-PDCCH CSS within the DSCH transmission window is fixed (e.g., no need for indication) and the configuration of Type2-PDCCH CSS outside the DSCH transmission window can be using a field in the RMSI (e.g., same as NR specification).

In yet another embodiment, if a UE determines the Type2-PDCCH CSS is within a DSCH, the monitoring periodicity of Type2-PDCCH CSS can be the same as the periodicity of DSCH transmission window.

In yet another embodiment, if a UE determines the Type2-PDCCH CSS is within a DSCH, and a time-domain offset for the transmission of the associated SS/PBCH block, where the SS/PBCH block is QCLed with the DMRS of Type2-PDCCH and located in the same DSCH window, (e.g., the offset denoted as O_SSB in the unit of slot) is known to the UE (e.g., by using signal/channel in the corresponding SS/PBCH block), the UE can determine the slot index for Type2-PDCCH CSS as n_2+O_SSB, wherein n_2 is the configured slot index for Type2-PDCCH CSS.

In yet another embodiment, if there is an indication for a configuration of Type2-PDCCH CSS within a DSCH transmission window (e.g., in DCI format for Type0-PDCCH CSS or RMSI content or PBCH content), there can be one configuration (e.g., one codepoint in a table) indicating there is no Type2-PDCCH CSS required to monitor within the DSCH.

In yet another embodiment, if a UE is not monitoring Type0-PDCCH CSS within DSCH, the UE does not need to monitor Type2-PDCCH CSS within the same DSCH transmission window.

In yet another embodiment, a UE is not expected to monitor Type2-PDCCH CSS in slots prior to the slot wherein a UE detects the QCLed SS/PBCH block and/or Type0-PDCCH (e.g., PDCCH of RMSI) in the same DSCH transmission window.

In yet another embodiment, the number of slot for monitoring Type2-PDCCH CSS within a DSCH transmission window corresponding to an SS/PBCH block is 1, where the SS/PBCH block is QCLed with the DMRS of Type0A-PDCCH and located in the same DSCH transmission window.

In yet another embodiment, the set of configurations of Type2-PDCCH CSS indicating the location of Type2-PDCCH CSS can be compact with the QCLed SS/PBCH block and Type0-PDCCH CSS, and the transmission of SS/PBCH block and the QCLed PDCCH/PDSCH of RMSI/paging can share the same LBT. One or multiple of the following approaches can be supported for NR-U, and it can be configurable among the approaches if multiple approaches are supported.

In one approach for this embodiment, the configuration for the Type0-PDCCH CSS within the DSCH transmission window in the present disclosure can be reused for Type2-PDCCH CSS within DSCH transmission window.

For one example, all the Type0-PDCCH CSS in FIG. 9 to FIGS. 13A and 13B can be replaced by Type2-PDCCH CSS, and the examples still apply to the configuration for Type2-PDCCH CSS within the DSCH transmission window.

For another example, at least part of the following examples in TABLE 6(a) and TABE 6(b) can be configurable as the configuration of Type2-PDCCH CSS, wherein O_2 and M_2 are parameters for determining the slot index of CSS, e.g., a UE determines the index of the starting slot for monitoring Type2-PDCCH CSS as $n\_2=(n\_DSCH+ O\_2*2^\mu+ \text{floor}(i*M\_2)) \bmod N\_slot^\mu$, where n_DSCH is the starting slot index within the frame of a DSCH transmission window, $2^\mu$ is ratio of the SCS of DSCH comparing to 15 kHz (e.g., μ=1 if using 30 kHz SCS for DSCH), i is the SS/PBCH block index, and $N\_slot^\mu$ is the number of slots in a frame with respect to SCS with parameter μ (e.g., $N\_slot^\mu=20$ if using 30 kHz SCS for DSCH). n_sym_2 is the first symbol index of Type2-PDCCH CSS, which can be determined using at least one of the following examples.

In one example, for M_2=½, n_sym_2=0 if i is even and n_sym_2=n_CORESET0 if i is odd, wherein i is the associated SS/PBCH block index and n_CORESET0 is the number of symbols for CORESET 0. In yet another example, for M_2=½, n_sym_2=0 if i is even and n_sym_2=7 if i is odd, wherein i is the associated SS/PBCH block index.

TABLE 6(a)

Examples of parameters for Type2-PDCCH CSS.

| Index | O_2 | No. of CSS per slot | M_2 | First symbol index |
|---|---|---|---|---|
| 0 | No need to monitor Type2-PDCCH CSS | | | |
| 1 | 0 | 2 | ½ | n_sym_2 |
| 2 | 0.5 | 2 | ½ | n_sym_2 |
| 3 | 1 | 2 | ½ | n_sym_2 |
| 4 | 1.5 | 2 | ½ | n_sym_2 |
| 5 | 2 | 2 | ½ | n_sym_2 |

TABLE 6(b)

Examples of parameters for Type2-PDCCH CSS.

| Index | O_2 | No. of CSS per slot | M_2 | First symbol index |
|---|---|---|---|---|
| 0 | No need to monitor Type2-PDCCH CSS | | | |
| 1 | 0 | 2 | ½ | n_sym_2 |
| 2 | 0.5 | 2 | ½ | n_sym_2 |
| 3 | 1 | 2 | ½ | n_sym_2 |
| 4 | 1.5 | 2 | ½ | n_sym_2 |
| 5 | 2 | 2 | ½ | n_sym_2 |
| 6 | 5 | 2 | ½ | n_sym_2 |
| 7 | 5.5 | 2 | ½ | n_sym_2 |
| 8 | 6 | 2 | ½ | n_sym_2 |
| 9 | 6.5 | 2 | ½ | n_sym_2 |
| 10 | 7 | 2 | ½ | n_sym_2 |

For yet another example, the transmission of the burst of PDCCH/PDSCH of paging can be right after the transmission of the burst of PDCCH/PDSCH of RMSI, and the configuration of Type2-PDCCH CSS can be determined based on the configuration of Type0-PDCCH CSS. When the transmission of SS/PBCH block is subject to a wrapped-around modulo value to allow more transmission opportunities in order to compensate the loss due to LBT, a SS/PBCH block (e.g., as well as the associated QCLed PDCCH and PDSCH of RMSI) is wrapped-around to a later transmission opportunity within the same DSCH transmission window, then the wrapped-around modulo value can also be utilized to determine the Type2-PDCCH CSS.

FIG. 15A illustrates an example configuration of Type0A/2-PDCCH CSS 1500 based on the configuration of Type0-PDCCH CSS as well as the wrapped-around modulo value according to embodiments of the present disclosure. An embodiment of the configuration of Type0A/2-PDCCH CSS 1500 shown in FIG. 15A is for illustration only. One or more of the components illustrated in FIG. 15A can be implemented in specialized circuitry configured to perform the noted functions or one or more of the components can be implemented by one or more processors executing instructions to perform the noted functions. Other embodiments are used without departing from the scope of the present disclosure.

FIG. 15B illustrates an example UE procedure 1550 for monitoring TypeX-PDCCH on unlicensed spectrum according to embodiments of the present disclosure. An embodiment of the UE procedure 1550 shown in FIG. 15B is for illustration only. One or more of the components illustrated in FIG. 15B can be implemented in specialized circuitry configured to perform the noted functions or one or more of the components can be implemented by one or more processors executing instructions to perform the noted functions. Other embodiments are used without departing from the scope of the present disclosure.

FIGS. 15A and 15B illustrate examples of determining the configuration of Type2-PDCCH CSS based on the configuration of Type0-PDCCH CSS as well as the wrapped-around modulo value, wherein the slot for monitoring Type2-PDCCH CSS is the slot for monitoring Type0-PDCCH CSS plus the wrapped-around modulo value (e.g., the Type0-PDCCH CSS is wrapped-around accordingly). In one aspect, the periodicity of monitoring Type2-PDCCH CSS is the same as the monitoring Type0-PDCCH CSS, when the two CSS are both multiplexed in/with DSCH. In another aspect, the SFN for monitoring Type2-PDCCH CSS is the same as the monitoring Type0-PDCCH CSS, when the two CSS are both multiplexed in/with DSCH. In yet another aspect, the starting symbol index for monitoring Type2-PDCCH CSS is the same as the monitoring Type0-PDCCH CSS, when the two CSS are both multiplexed in/with DSCH.

As illustrated in FIG. 15B, in step 1551, the UE receives a SS/PBCH block. In step 1552, the UE determines the received SS/PBCH block is within a DSCH transmission window. In step 1553, the UE determines a COREST for TypeX-PDCCH CSS. In step 1554, the UE determines a parameter for QCL assumption of SS/PBCH blocks. The UE in step 1555 determines a group of candidate SS/PBCH blocks within the DSCH transmission window based on the determined parameter for QCL assumption. The UE in step 1556 determines a group of slots containing TypeX-PDCCH CSS, wherein each slot is associated with one candidate SS/PBCH block in the determined group of candidate SS/PBCH blocks. Finally, the UE in step 1557 monitors TypeX-PDCCH in the determined group of slots.

In yet another approach for this embodiment, the transmission of part of the burst of PDCCH/PDSCH of paging can be right after the transmission of part of the burst of PDCCH/PDSCH of RMSI. For example, the actually transmitted SS/PBCH blocks are not all the possible SS/PBCH blocks, and they can be divided into multiple parts within the burst, then the transmission of corresponding RMSI followed by paging can follow parts of the burst of SS/PBCH blocks.

In yet another embodiment, the configuration of Type2-PDCCH CSS can be determined based on the indication of actually transmitted SS/PBCH blocks in RMSI (e.g., a bitmap with length L_max), and no separate configuration of Type2-PDCCH CSS is required. For example, at least part of the following examples in TABLE 7 can be used as the configuration of Type2-PDCCH CSS based on the bitmap indicating the actually transmitted SS/PBCH blocks, wherein O_2 and M_2 are parameters for determining the slot index of CSS, e.g., a UE determines the index of the starting slot for monitoring Type2-PDCCH CSS as $n\_2 = (n\_DSCH + O\_2 \cdot 2^\mu + \lfloor i \cdot M\_2 \rfloor) \mod N\_slot^\mu$, where n_DSCH is the starting slot index within the frame of a DSCH transmission window, $2^\mu$ is ratio of the SCS of DSCH comparing to 15 kHz (e.g., μ=1 if using 30 kHz SCS for DSCH), i is the SS/PBCH block index, and $N\_slot^\mu$ is the number of slots in a frame with respect to SCS with parameter μ (e.g., N_slot^=20 if using 30 kHz SCS for DSCH). n_sym_2 is the first symbol index of Type2-PDCCH CSS, which can be determined using at least one of the following examples.

In one example, for M_2=½, n_sym_2=0 if i is even and n_sym_2=n_CORESET0 if i is odd, wherein i is the associated SS/PBCH block index and n_CORESET0 is the number of symbols for CORESET 0. In yet another example, for M_2=½, n_sym_2=0 if i is even and n_sym_2=7 if i is odd, wherein i is the associated SS/PBCH block index. In one consideration of this example, the UE does not expect to monitor the remaining CSS, if the detected bitmap for indicating the actually SS/PBCH blocks is not in TABLE 7.

TABLE 7

Examples of parameters for Type2-PDCCH CSS based on bitmap of actually transmitted SS/PBCH blocks.

| Bitmap | O_2 | No. of CSS per slot | M_2 | First symbol index |
|---|---|---|---|---|
| 10000000 | 0.5 | 1 | 1 | 0 |
| 00100000 | 0.5 | 1 | 1 | 0 |
| 00001000 | 0.5 | 1 | 1 | 0 |
| 00000010 | 0.5 | 1 | 1 | 0 |
| 11000000 | 0.5 | 2 | ½ | n_sym_2 |
| 00110000 | 0.5 | 2 | ½ | n_sym_2 |
| 00001100 | 0.5 | 2 | ½ | n_sym_2 |
| 00000011 | 0.5 | 2 | ½ | n_sym_2 |
| 10100000 | 1 | 1 | 1 | 0 |
| 00101000 | 1 | 1 | 1 | 0 |
| 00001010 | 1 | 1 | 1 | 0 |
| 10101000 | 1.5 | 1 | 1 | 0 |
| 00101010 | 1.5 | 1 | 1 | 0 |
| 10101010 | 2 | 1 | 1 | 0 |
| 11110000 | 1 | 2 | ½ | n_sym_2 |
| 00111100 | 1 | 2 | ½ | n_sym_2 |
| 00001111 | 1 | 2 | ½ | n_sym_2 |
| 11111100 | 1.5 | 2 | ½ | n_sym_2 |
| 00111111 | 1.5 | 2 | ½ | n_sym_2 |
| 11111111 | 2 | 2 | ½ | n_sym_2 |

In yet another embodiment, if both OSI and paging are multiplexed in a DSCH, the slots containing PDCCH/PDSCH of OSI and paging, respectively, can be TDMed and be consecutive. In one example, a first CSS of the Type0A-PDCCH CSS and Type2-PDCCH CSS can be configured based on the examples in the present disclosure (e.g., Type0A-PDCCH using TABLE 4 or Type2-PDCCH using TABLE 6), and the remaining CSS of the Type0A-PDCCH CSS and Type2-PDCCH CSS can be configured using another set of configurations. For example, at least part of the following examples in TABLE 8 can be configurable as the configuration of the remaining CSS of the Type0A-PDCCH CSS and Type2-PDCCH CSS, wherein O and M are parameters for determining the slot index of CSS, e.g., a UE determines the index of the starting slot for monitoring the CSS as n=(n_DSCH+O*2^μ+ floor(i*M)) mod N_slot^μ, where n_DSCH is the starting slot index within the frame of a DSCH transmission window, 2^μ is ratio of the SCS of DSCH comparing to 15 kHz (e.g., μ=1 if using 30 kHz SCS for DSCH), i is the SS/PBCH block index, and N_slot^μ is the number of slots in a frame with respect to SCS with parameter μ (e.g., N_slot^μ=20 if using 30 kHz SCS for DSCH). n_sym is the first symbol index of the CSS, which can be determined using at least one of the following examples. In one example, for M=½, n_sym=0 if i is even and n_sym=n_CORESET0 if i is odd, wherein i is the associated SS/PBCH block index and n_CORESET0 is the number of symbols for CORESET 0. In yet another example, for M=½, n_sym=0 if i is even and n_sym=7 if i is odd, wherein i is the associated SS/PBCH block index.

TABLE 8

Examples of parameters for Type0A-PDCCH or Type2-PDCCH CSS.

| Index | O | No. of CSS per slot | M | First symbol index |
|---|---|---|---|---|
| 0 | No need to monitor the remaining CSS | | | |
| 1 | 0 | 2 | ½ | n_sym |
| 2 | 1 | 2 | ½ | n_sym |
| 3 | 2 | 2 | ½ | n_sym |
| 4 | 3 | 2 | ½ | n_sym |
| 5 | 4 | 2 | ½ | n_sym |

In another example, a first CSS of the Type0A-PDCCH CSS and Type2-PDCCH CSS can be determined based on the bitmap indicating the actually transmitted SS/PBCH blocks, as in the examples in the present disclosure (e.g., Type0A-PDCCH using TABLE 5 or Type2-PDCCH using TABLE 7), and the remaining CSS of the Type0A-PDCCH CSS and Type2-PDCCH CSS can be determined, also based on the bitmap indicating the actually transmitted SS/PBCH blocks, using a separate table.

For example, at least part of the following examples in TABLE 9 can be used as the configuration of the remaining CSS based on the bitmap indicating the actually transmitted SS/PBCH blocks, wherein O and M are parameters for determining the slot index of CSS, e.g., a UE determines the index of the starting slot for monitoring the remaining CSS as n=(n_DSCH+O*2^μ+ floor(i*M)) mod N_slot^μ, where n_DSCH is the starting slot index within the frame of a DSCH transmission window, 2^μ is ratio of the SCS of DSCH comparing to 15 kHz (e.g., μ=1 if using 30 kHz SCS for DSCH), i is the SS/PBCH block index, and N_slot^μ is the number of slots in a frame with respect to SCS with parameter μ (e.g., N_slot^μ=20 if using 30 kHz SCS for DSCH). n_sym is the first symbol index of the remaining CSS, which can be determined using at least one of the following examples. In one example, for M=½, n_sym=0 if i is even and n_sym=n_CORESET0 if i is odd, wherein i is the associated SS/PBCH block index and n_CORESET0 is the number of symbols for CORESET 0. In yet another example, for M=½, n_sym=0 if i is even and n_sym=7 if i is odd, wherein i is the associated SS/PBCH block index. In one consideration of this example, the UE does not expect to monitor the remaining CSS, if the detected bitmap for indicating the actually SS/PBCH blocks is not in TABLE 9.

TABLE 9

Examples of parameters for Type0A-PDCCH CSS or Type2-PDCCH CSS based on bitmap of actually transmitted SS/PBCH blocks.

| Bitmap | O | No. of CSS per slot | M | First symbol index |
|---|---|---|---|---|
| 10000000 | 1 | 1 | 1 | 0 |
| 00100000 | 1 | 1 | 1 | 0 |
| 00001000 | 1 | 1 | 1 | 0 |
| 00000010 | 1 | 1 | 1 | 0 |
| 11000000 | 1 | 2 | ½ | n_sym |
| 00110000 | 1 | 2 | ½ | n_sym |
| 00001100 | 1 | 2 | ½ | n_sym |
| 00000011 | 1 | 2 | ½ | n_sym |
| 10100000 | 2 | 1 | 1 | 0 |
| 00101000 | 2 | 1 | 1 | 0 |

TABLE 9-continued

Examples of parameters for Type0A-PDCCH CSS or Type2-PDCCH CSS based on bitmap of actually transmitted SS/PBCH blocks.

| Bitmap | O | No. of CSS per slot | M | First symbol index |
|---|---|---|---|---|
| 00001010 | 2 | 1 | 1 | 0 |
| 10101000 | 3 | 1 | 1 | 0 |
| 00101010 | 3 | 1 | 1 | 0 |
| 10101010 | 4 | 1 | 1 | 0 |
| 11110000 | 2 | 2 | ½ | n_sym |
| 00111100 | 2 | 2 | ½ | n_sym |
| 00001111 | 2 | 2 | ½ | n_sym |
| 11111100 | 3 | 2 | ½ | n_sym |
| 00111111 | 3 | 2 | ½ | n_sym |
| 11111111 | 4 | 2 | ½ | n_sym |

In yet another embodiment, the transmission of DSCH can be impacted by the LBT result, e.g., the burst of SS/PBCH block could be wrapped around, subject to LBT, according to a wrapped-around modulo value, to allow more transmission opportunities. In one approach for this embodiment, the associated Type2-PDCCH CSS is also wrapped around correspondingly, such that Type2-PDCCH also has more transmission opportunities. From the UE's perspective, the original candidate SS/PBCH block and the new candidate SS/PBCH blocks after wrapped-around are assumed to be QCLed, and they together form a group of QCLed candidate SS/PBCH blocks. Hence, upon receiving one SS/PBCH block, the UE can determine the group of QCLed candidate SS/PBCH blocks, and then the UE may need to monitor a group of monitoring occasions for Type2-PDCCH CSS, wherein each of the monitor occasion is associated to one candidate SS/PBCH block within the group of QCLed candidate SS/PBCH blocks. The association of the candidate SS/PBCH block and the corresponding slot(s) containing Type2-PDCCH CSS can be according to the embodiments of the present disclosure. An example flow chart for a UE procedure is shown in FIG. 15B, where X refers to "2."

As illustrated in FIG. 15B,

In yet another embodiment, Type2-PDCCH CSS can be configured to be with the same slot containing the QCLed SS/PBCH block, wherein the corresponding transmission of Type2-PDCCH contains the short control message for paging and there is no corresponding PDSCH transmission of paging.

Figure 16:
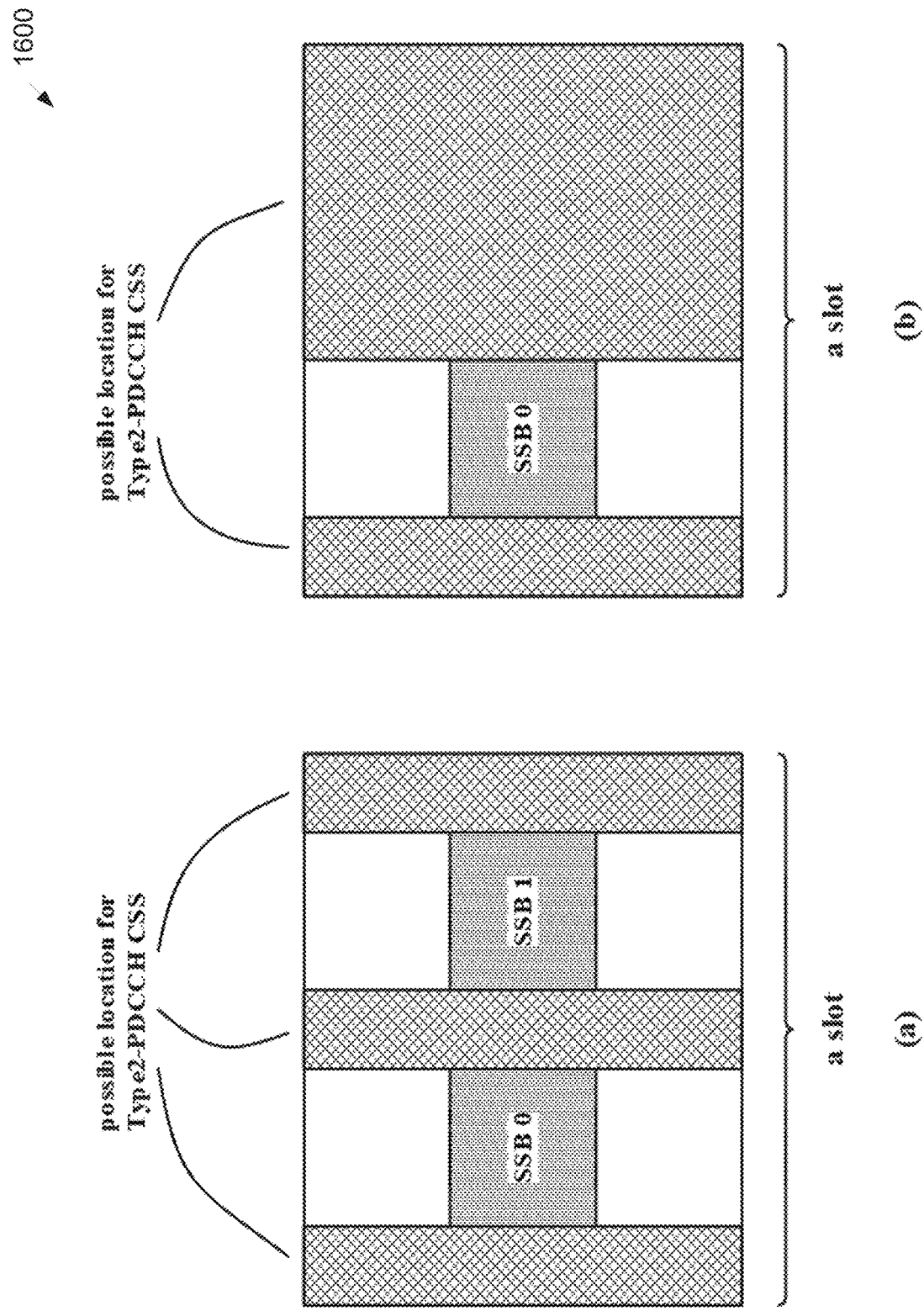
FIG. 16 illustrates an example Type2-PDCCH CSS with short paging message only according to embodiments of the present disclosure.

FIG. 16 illustrates an example Type2-PDCCH CSS with short paging message only 1600 according to embodiments of the present disclosure. An embodiment of the Type2-PDCCH CSS with short paging message only 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

In one example, as illustrated in FIG. 16 (e.g., (a)), at least one of the remaining symbols other than those mapped for potential SS/PBCH blocks within a slot can be used for monitoring Type2-PDCCH.

In another example, as illustrated in FIG. 16 (e.g., (b)), at least one of the remaining symbols other than those mapped for actually transmitted SS/PBCH blocks within a slot can be used for monitoring Type2-PDCCH.

In one aspect of this embodiment, Type2-PDCCH CSS can share the CORESET with other CSS, e.g., Type0-PDCCH CSS and/or Type0A-PDCCH CSS.

In NR specification, the configuration of Type1-PDCCH common search space (CSS), i.e., the CSS for RAR, is indicated in the content of RMSI. For NR-U, there a need for enhancement and/or modification to the configuration of Type1-PDCCH CSS, such that the configured time-domain location of the Type1-PDCCH CSS is more appropriate for unlicensed band operation, especially for NR-U DSCH. The following embodiments details the design of configuration of Type1-PDCCH CSS.

In one embodiment, for NR-U DSCH, there is an indication that whether a UE needs to monitor Type1-PDCCH CSS (e.g., whether there is RAR multiplexed in the DSCH). For one example, the indication can be in the content of PBCH within the DSCH. For another example, the indication can be in the content of RMSI (e.g., PDSCH of RMSI) within in the DSCH. For yet another example, the indication can be in the DCI format for Type0-PDCCH (e.g., PDCCH of RMSI) within the DSCH.

In another embodiment, on the same frequency layer, the configuration of Type1-PDCCH CSS is the same. For one example, if there can be Type1-PDCCH CSS both within and outside a DSCH transmission window, the configuration of Type1-PDCCH CSS within a DSCH transmission window is the same as the configuration of Type1-PDCCH CSS outside a DSCH transmission window, and both of them are indicated by a same configuration. For another example, a UE assumes all Type0-PDCCH CSS are configured in a DSCH transmission window, and the same configuration of Type1-PDCCH CSS is indicated to the UE.

In yet another embodiment, on the same frequency layer, the configuration of Type1-PDCCH CSS within a DSCH transmission window can be different from the configuration of Type1-PDCCH CSS outside a DSCH transmission window. In one example, the indication of the configuration of Type1-PDCCH CSS within and outside the DSCH transmission window can be using two separate fields in RMSI.

In another example, the indication of the configuration of Type1-PDCCH CSS within the DSCH transmission window can be in a DCI format for Type0-PDCCH within the DSCH, and the indication of the configuration of Type1-PDCCH CSS outside the DSCH transmission window can be using a field in the RMSI (e.g., same as NR specification). In yet another example, the indication of the configuration of Type1-PDCCH CSS within and outside the DSCH transmission window can be using the same field in RMSI, and the value of the field can be configured separately for the configuration of Type1-PDCCH CSS within and outside the DSCH transmission window such that the content of RMSI may or may not be the same within and outside the DSCH transmission window.

In yet another example, the configuration of Type1-PDCCH CSS within the DSCH transmission window is fixed (e.g., no need for indication) and the configuration of Type1-PDCCH CSS outside the DSCH transmission window can be using a field in the RMSI (e.g., same as NR specification or selected from the configuration as in NR specification).

In yet another embodiment, for a received SS/PBCH block, if a UE determines the received SS/PBCH block is within a DSCH, the monitoring periodicity of Type1-PDCCH CSS can be the same as the periodicity of DSCH transmission window.

In yet another embodiment, for a received SS/PBCH block, if a UE determines the received SS/PBCH block is within a DSCH, and a time-domain offset for the transmission of the SS/PBCH block (e.g., denoted as O_SSB in the unit of slot) is known to the UE (e.g., by using signal/channel in the corresponding SS/PBCH block), the UE can determine the slot index for Type1-PDCCH CSS as n_1+ O_SSB, wherein n_1 is the configured slot index for Type1-PDCCH CSS.

In yet another embodiment, if there is an indication for a configuration of Type1-PDCCH CSS within a DSCH transmission window (e.g., in DCI format for Type0-PDCCH CSS or RMSI content or PBCH content), there can be one configuration (e.g., one codepoint in a table) indicating there is no Type1-PDCCH CSS required to monitor within the DSCH.

In yet another embodiment, if a UE is not monitoring Type0-PDCCH CSS within DSCH, the UE does not need to monitor Type1-PDCCH CSS within the same DSCH transmission window.

In yet another embodiment, a UE is not expected to monitor Type1-PDCCH CSS in slots prior to the slot wherein a UE detects the QCLed SS/PBCH block and/or Type0-PDCCH (e.g., PDCCH of RMSI) in the same DSCH transmission window.

In yet another embodiment, the number of slot for monitoring Type1-PDCCH CSS within a DSCH transmission window corresponding to an SS/PBCH block is 1.

In yet another embodiment, the set of configurations of Type1-PDCCH CSS indicating the location of Type1-PDCCH CSS can be compact with the QCLed SS/PBCH block and Type0-PDCCH CSS, and the transmission of SS/PBCH block and the QCLed PDCCH/PDSCH of RMSI/RAR can share the same LBT. One or multiple of the following approaches can be supported for NR-U, and it can be configurable among the approaches if multiple approaches are supported.

In one approach for this embodiment, the configuration for the Type0-PDCCH CSS within the DSCH transmission window in the present disclosure can be reused for Type1-PDCCH CSS within DSCH transmission window. In this approach, all the Type0-PDCCH CSS in FIG. 9 to FIGS. 13A and 13B can be replaced by Type1-PDCCH CSS, and the examples still apply to the configuration for Type1-PDCCH CSS within the DSCH transmission window.

For example, at least part of the following examples in TABLE 10(a) and TABLE 10(b) can be configurable as the configuration of Type1-PDCCH CSS, wherein O_1 and M_1 are parameters for determining the slot index of CSS, e.g., a UE determines the index of the starting slot for monitoring Type1-PDCCH CSS as n_1=(n_DSCH+O_A1*2^μ+ floor(i*M_1)) mod N_slot^μ, where n_DSCH is the starting slot index within the frame of a DSCH transmission window, 2^μ is ratio of the SCS of DSCH comparing to 15 kHz (e.g., μ=1 if using 30 kHz SCS for DSCH), i is the SS/PBCH block index, and N_slot^μ is the number of slots in a frame with respect to SCS with parameter μ (e.g., N_slot^μ=20 if using 30 kHz SCS for DSCH). n_sym_1 is the first symbol index of Type1-PDCCH CSS, which can be determined using at least one of the following examples.

In one example, for M_1=½, n_sym_1=0 if i is even and n_sym-1=n_CORESET0 if i is odd, wherein i is the associated SS/PBCH block index and n_CORESET0 is the number of symbols for CORESET 0. In yet another example, for M_1=½, n_sym_1=0 if i is even and n_sym_1=7 if i is odd, wherein i is the associated SS/PBCH block index.

TABLE 10(a)

Examples of parameters for Type1-PDCCH CSS.

| Index | O_1 | No. of CSS per slot | M_1 | First symbol index |
|---|---|---|---|---|
| 0 | No need to monitor Type1-PDCCH CSS | | | |
| 1 | 0 | 2 | ½ | n_sym_1 |
| 2 | 0.5 | 2 | ½ | n_sym_1 |
| 3 | 1 | 2 | ½ | n_sym_1 |
| 4 | 1.5 | 2 | ½ | n_sym_1 |
| 5 | 2 | 2 | ½ | n_sym_1 |

TABLE 10(b)

Examples of parameters for Type1-PDCCH CSS.

| Index | O_1 | No. of CSS per slot | M_1 | First symbol index |
|---|---|---|---|---|
| 0 | No need to monitor Type1-PDCCH CSS | | | |
| 1 | 0 | 2 | ½ | n_sym_1 |
| 2 | 0.5 | 2 | ½ | n_sym_1 |
| 3 | 1 | 2 | ½ | n_sym_1 |
| 4 | 1.5 | 2 | ½ | n_sym_1 |
| 5 | 2 | 2 | ½ | n_sym_1 |
| 6 | 5 | 2 | ½ | n_sym_1 |
| 7 | 5.5 | 2 | ½ | n_sym_1 |
| 8 | 6 | 2 | ½ | n_sym_1 |
| 9 | 6.5 | 2 | ½ | n_sym_1 |
| 10 | 7 | 2 | ½ | n_sym_1 |

In another approach of this embodiment, the transmission of the burst of PDCCH/PDSCH of RAR can be right after the transmission of the burst of PDCCH/PDSCH of RMSI.

In yet another approach for this embodiment, the transmission of part of the burst of PDCCH/PDSCH of RAR can be right after the transmission of part of the burst of PDCCH/PDSCH of RMSI. For example, the actually transmitted SS/PBCH blocks are not all the possible SS/PBCH blocks, and they can be divided into multiple parts within the burst, then the transmission of corresponding RMSI followed by RAR can follow parts of the burst of SS/PBCH blocks.

In yet another embodiment, the configuration of Type1-PDCCH CSS can be determined based on the indication of actually transmitted SS/PBCH blocks in RMSI (e.g., a bitmap with length L_max), and no separate configuration of Type1-PDCCH CSS is required. For example, at least part of the following examples in TABLE 11 can be used as the configuration of Type1-PDCCH CSS based on the bitmap indicating the actually transmitted SS/PBCH blocks, wherein O_1 and M_1 are parameters for determining the slot index of CSS, e.g., a UE determines the index of the starting slot for monitoring Type1-PDCCH CSS as n_1= (n_DSCH+O_1*2^μ+ floor(i*M_1)) mod N_slot^μ, where n_DSCH is the starting slot index within the frame of a DSCH transmission window, 2^μ is ratio of the SCS of DSCH comparing to 15 kHz (e.g., μ=1 if using 30 kHz SCS for DSCH), i is the SS/PBCH block index, and N_slot^μ is the number of slots in a frame with respect to SCS with parameter μ (e.g., N_slot^μ=20 if using 30 kHz SCS for DSCH). n_sym_1 is the first symbol index of Type1-PDCCH CSS, which can be determined using at least one of the following examples.

In one example, for M_1=½, n_sym_1=0 if i is even and n_sym_1=n_CORESET0 if i is odd, wherein i is the associated SS/PBCH block index and n_CORESET0 is the number of symbols for CORESET 0. In yet another example, for M_1=½, n_sym_1=0 if i is even and n_sym_1=7 if i is odd, wherein i is the associated SS/PBCH block index.

TABLE 11

Examples of parameters for Type1-PDCCH CSS based on bitmap of actually transmitted SS/PBCH blocks.

| Bitmap | O_1 | No. of CSS per slot | M_1 | First symbol index |
|---|---|---|---|---|
| 10000000 | 0.5 | 1 | 1 | 0 |
| 00100000 | 0.5 | 1 | 1 | 0 |
| 00001000 | 0.5 | 1 | 1 | 0 |
| 00000010 | 0.5 | 1 | 1 | 0 |
| 11000000 | 0.5 | 2 | 1/2 | n_sym_1 |
| 00110000 | 0.5 | 2 | 1/2 | n_sym_1 |
| 00001100 | 0.5 | 2 | 1/2 | n_sym_1 |
| 00000011 | 0.5 | 2 | 1/2 | n_sym_1 |
| 10100000 | 1 | 1 | 1 | 0 |
| 00101000 | 1 | 1 | 1 | 0 |
| 00001010 | 1 | 1 | 1 | 0 |
| 10101000 | 1.5 | 1 | 1 | 0 |
| 00101010 | 1.5 | 1 | 1 | 0 |
| 10101010 | 2 | 1 | 1 | 0 |
| 11110000 | 1 | 2 | 1/2 | n_sym_1 |
| 00111100 | 1 | 2 | 1/2 | n_sym_1 |
| 00001111 | 1 | 2 | 1/2 | n_sym_1 |
| 11111100 | 1.5 | 2 | 1/2 | n_sym_1 |
| 00111111 | 1.5 | 2 | 1/2 | n_sym_1 |
| 11111111 | 2 | 2 | 1/2 | n_sym_1 |

In yet another embodiment, the transmission of DSCH can be impacted by the LBT result, e.g., the burst of SS/PBCH block could be wrapped around, subject to LBT, according to a wrapped-around modulo value, to allow more transmission opportunities. In one approach for this embodiment, the associated Type1-PDCCH CSS is also wrapped around correspondingly, such that Type1-PDCCH also has more transmission opportunities. From the UE's perspective, the original candidate SS/PBCH block and the new candidate SS/PBCH blocks after wrapped-around are assumed to be QCLed, and they together form a group of QCLed candidate SS/PBCH blocks. Hence, upon receiving one SS/PBCH block, the UE can determine the group of QCLed candidate SS/PBCH blocks, and then the UE may need to monitor a group of monitoring occasions for Type1-PDCCH CSS, wherein each of the monitor occasion is associated to one candidate SS/PBCH block within the group of QCLed candidate SS/PBCH blocks. The association of the candidate SS/PBCH block and the corresponding slot(s) containing Type1-PDCCH CSS can be according to the embodiments of the present disclosure. An example flow chart for a UE procedure is shown in FIG. 15B, where X refers to "1."

In one embodiment, the transmission of RMSI, and/or OSI, and/or paging, and/or RAR, and the associated SS/PBCH block within a DSCH transmission window is as compact as possible and follows certain predefined pattern, such that the configuration of Type0-PDCCH CSS, and/or Type0A-PDCCH CSS, and/or Type2-PDCCH CSS, and/or Type1-PDCCH CSS can be jointly coded. In one approach, the indication of the joint configuration of Type0/Type0A/Type1/Type2-PDCCH CSS is by PBCH content.

In another embodiment, on the same frequency layer, the joint configuration of Type0/Type0A/Type1/Type2-PDCCH CSS is the same within and outside a DSCH transmission window.

In yet another embodiment, on the same frequency layer, the joint configuration of Type0/Type0A/Type1/Type2-PDCCH CSS is only for the scenario of within a DSCH transmission window. In one approach, by reception of an SS/PBCH block, a UE can determine whether the received SS/PBCH block is within or outside a DSCH transmission window (e.g., by one approach specified in the present disclosure), and the UE can interpret the configuration (e.g., in PBCH content) as a joint configuration of Type0/Type0A/Type1/Type2-PDCCH CSS if the SS/PBCH block is determined as within a DSCH transmission window; and interpret the configuration (e.g., in PBCH content) as a configuration of Type0-PDCCH CSS if the SS/PBCH block is determined as outside a DSCH transmission window (e.g., similar as in NR specification).

In yet another embodiment, the joint configuration of Type0/Type0A/Type1/Type2-PDCCH CSS follows a predefined pattern, and a UE can determine the slot index of the CSS based on the predefined pattern and whether the UE is indicated to monitor such CSS.

In one embodiment, the configuration of CORESET #0 and Type0-PDCCH CSS is jointly coded and indicated in the content of PBCH (e.g., MIB), such that the bit-width for indicating the configuration of CORESET #0 and Type0-PDCCH CSS is minimized. For example, a configuration of Type0-PDCCH CSS may only be applicable when the number of symbol for CORESET #0 is 1, then joint coding helps to reduce the total number of bits for indicating the configuration of CORESET #0 and Type0-PDCCH CSS.

In one approach, a UE assumes the index of slot for monitoring Type0-PDCCH CSS corresponding to a SS/PBCH block is the same as the index of slot containing the SS/PBCH block (e.g., the periodicity of monitoring Type0-PDCCH CSS is also same as the periodicity of the corresponding SS/PBCH block), then there can be a table specifying the joint configuration and the entry of table is indicated in PBCH content (e.g., MIB). In one example, the joint configuration table is specified for each supported combination of SCS of SS/PBCH block and SCS of CORESET #0.

In one aspect for all the example of this approach, there can be an extra configuration entry or unused index in the table to indicate the UE does not need to monitor Type0-PDCCH CSS.

In another aspect for all the example of this approach, when there is only one Type0-PDCCH CSS configured per slot, it can be further configured that either the first or the second SS/PBCH block within the slot is transmitted, e.g., the entry in the tables can be split into two, to indicate either the first or the second SS/PBCH block within the slot is transmitted.

One example of this approach for both the SCS of SS/PBCH block and the SCS of CORESET #0 as 30 kHz is shown in TABLE 12(a), and one example of this approach for both the SCS of SS/PBCH block and the SCS of CORESET #0 as 15 kHz is shown in TABLE 12(b), and wherein i is the index of associated candidate SS/PBCH block. In one sub-example, N_offset is fixed as 0. In another sub-example, N_offset is fixed as 28 for TABLE 12(a), and fixed as 76 for TABLE 12(b). In yet another example, N_offset is fixed as 14 for TABLE 12(a), and fixed as 38 for TABLE 12(b).

In yet another example, N_offset is fixed for a given carrier with BW of 20 MHz in the unlicensed band. In one consideration, TABLE 12(b) is not applicable to the scenario wherein the SCS of SS/PBCH block is not indicated by higher layer (e.g., it is only applicable when the SCS of SS/PBCH block is indicated by higher layer as 15 kHz, like reconfigured by higher layer after initial access).

TABLE 12(a)

Configuration of CORESET and PDCCH CSS

| Index | Multiplexing pattern | CORESET #0 BW | No. of symbols for CORESET #0 | No. of Type0-PDCCH CSS per slot | First symbol index of Type0-PDCCH CSS | RB offset between the first RB of SS/PBCH block and the first RB of CORESET #0 |
|---|---|---|---|---|---|---|
| 0 | 1 | 48 | 1 | 2 | 0 if i is even, 1 if i is odd | N_offset |
| 1 | 1 | 48 | 1 | 2 | 0 if i is even, 7 if i is odd | N_offset |
| 2 | 1 | 48 | 1 | 1 | 0 | N_offset |
| 3 | 1 | 48 | 2 | 2 | 0 if i is even, 7 if i is odd | N_offset |
| 4 | 1 | 48 | 2 | 1 | 0 | N_offset |

TABLE 12(b)

Configuration of CORESET and PDCCH CSS

| Index | Multiplexing pattern | CORESET #0 BW | No. of symbols for CORESET #0 | No. of Type0-PDCCH CSS per slot | First symbol index of Type0-PDCCH CSS | RB offset between the first RB of SS/PBCH block and the first RB of CORESET #0 |
|---|---|---|---|---|---|---|
| 0 | 1 | 96 | 1 | 2 | 0 if i is even, 1 if i is odd | N_offset |
| 1 | 1 | 96 | 1 | 2 | 0 if i is even, 7 if i is odd | N_offset |
| 2 | 1 | 96 | 1 | 1 | 0 | N_offset |
| 3 | 1 | 96 | 2 | 2 | 0 if i is even, 7 if i is odd | N_offset |
| 4 | 1 | 96 | 2 | 1 | 0 | N_offset |

Another example of this approach for both the SCS of SS/PBCH block and the SCS of CORESET #0 as 30 kHz is shown in TABLE 13(a), and one example of this approach for both the SCS of SS/PBCH block and the SCS of CORESET #0 as 15 kHz is shown in TABLE 13(b), and wherein i is the index of associated candidate SS/PBCH block. In this set of examples, No. of symbols for CORESET #0 taking value of 2 can only be combined with No. of Type0-PDCCH CSS per slot taking value of 1 (e.g., when the No. of symbols for CORESET #0 is configured as 2, there can be only 1 Type0-PDCCH CSS configured in the slot).

In one sub-example, N_offset is fixed as 0. In another sub-example, N_offset is fixed as 28 for TABLE 13(a), and fixed as 76 for TABLE 13(b). In yet another example, N_offset is fixed as 14 for TABLE 13(a), and fixed as 38 for TABLE 13(b). In yet another example, N_offset is fixed for a given carrier with BW of 20 MHz in the unlicensed band. In one consideration, TABLE 13(b) is not applicable to the scenario wherein the SCS of SS/PBCH block is not indicated by higher layer (e.g., it is only applicable when the SCS of SS/PBCH block is indicated by higher layer as 15 kHz, like reconfigured by higher layer after initial access).

TABLE 13(a)

Configuration of CORESET and PDCCH CSS

| Index | Multiplexing pattern | CORESET #0 BW | No. of symbols for CORESET #0 | No. of Type0-PDCCH CSS per slot | First symbol index of Type0-PDCCH CSS | RB offset between the first RB of SS/PBCH block and the first RB of CORESET #0 |
|---|---|---|---|---|---|---|
| 0 | 1 | 48 | 1 | 2 | 0 if i is even, 1 if i is odd | N_offset |
| 1 | 1 | 48 | 1 | 2 | 0 if i is even, 7 if i is odd | N_offset |
| 2 | 1 | 48 | 1 | 1 | 0 | N_offset |
| 3 | 1 | 48 | 2 | 1 | 0 | N_offset |

TABLE 13(b)

| | | | No. of symbols for CORESET #0 | No. of Type0-PDCCH CSS per slot | First symbol index of Type0-PDCCH CSS | RB offset between the first RB of SS/PBCH block and the first RB of CORESET #0 |
|---|---|---|---|---|---|---|
| Index | Multiplexing pattern | CORESET #0 BW | | | | |
| 0 | 1 | 96 | 1 | 2 | 0 if i is even, 1 if i is odd | N_offset |
| 1 | 1 | 96 | 1 | 2 | 0 if i is even, 7 if i is odd | N_offset |
| 2 | 1 | 96 | 1 | 1 | 0 | N_offset |
| 3 | 1 | 96 | 2 | 1 | 0 | N_offset |

Yet another example of this approach for both the SCS of SS/PBCH block and the SCS of CORESET #0 as 30 kHz is shown in TABLE 14(a), and one example of this approach for both the SCS of SS/PBCH block and the SCS of CORESET #0 as 15 kHz is shown in TABLE 14(b), and wherein i is the index of associated candidate SS/PBCH block. In this set of examples, No. of symbols for CORESET #0 taking value of 2 can be combined with No. of Type0-PDCCH CSS per slot taking value of 2, but the second CSS starts from symbol #6. In one sub-example, N_offset is fixed as 0. In another sub-example, N_offset is fixed as 28 for TABLE 14(a), and fixed as 76 for TABLE 14(b). In yet another example, N_offset is fixed as 14 for TABLE 14(a), and fixed as 38 for TABLE 14(b).

In yet another example, N_offset is fixed for a given carrier with BW of 20 MHz in the unlicensed band. In one consideration, TABLE 14(b) is not applicable to the scenario wherein the SCS of SS/PBCH block is not indicated by higher layer (e.g., it is only applicable when the SCS of SS/PBCH block is indicated by higher layer as 15 kHz, like reconfigured by higher layer after initial access).

TABLE 14(a)

Configuration of CORESET and PDCCH CSS

| Index | Multiplexing pattern | CORESET #0 BW | No. of symbols for CORESET #0 | No. of Type0-PDCCH CSS per slot | First symbol index of Type0-PDCCH CSS | RB offset between the first RB of SS/PBCH block and the first RB of CORESET #0 |
|---|---|---|---|---|---|---|
| 0 | 1 | 48 | 1 | 2 | 0 if i is even, 1 if i is odd | N_offset |
| 1 | 1 | 48 | 1 | 2 | 0 if i is even, 7 if i is odd | N_offset |
| 2 | 1 | 48 | 1 | 1 | 0 | N_offset |
| 3 | 1 | 48 | 2 | 1 | 0 | N_offset |
| 4 | 1 | 48 | 2 | 2 | 0 if i is even, 6 if i is odd | N_offset |

TABLE 14(b)

Configuration of CORESET and PDCCH CSS

| Index | Multiplexing pattern | CORESET #0 BW | No. of symbols for CORESET #0 | No. of Type0-PDCCH CSS per slot | First symbol index of Type0-PDCCH CSS | RB offset between the first RB of SS/PBCH block and the first RB of CORESET #0 |
|---|---|---|---|---|---|---|
| 0 | 1 | 96 | 1 | 2 | 0 if i is even, 1 if i is odd | N_offset |
| 1 | 1 | 96 | 1 | 2 | 0 if i is even, 7 if i is odd | N_offset |
| 2 | 1 | 96 | 1 | 1 | 0 | N_offset |
| 3 | 1 | 96 | 2 | 1 | 0 | N_offset |
| 4 | 1 | 96 | 2 | 2 | 0 if i is even, 6 if i is odd | N_offset |

Yet another example of this approach for both the SCS of SS/PBCH block and the SCS of CORESET #0 as 30 kHz is shown in TABLE 15(a), and one example of this approach for both the SCS of SS/PBCH block and the SCS of CORESET #0 as 15 kHz is shown in TABLE 15(b), and wherein i is the index of associated candidate SS/PBCH block. In this set of examples, No. of symbols for CORESET #0 taking value of 2 can be combined with No. of Type0-PDCCH CSS per slot taking value of 2, but the second CSS starts from symbol #6. In one sub-example, N_offset is fixed as 0. In another sub-example, N_offset is fixed as 28 for TABLE 15(a), and fixed as 76 for TABLE 15(b). In yet another example, N_offset is fixed as 14 for TABLE 15(a), and fixed as 38 for TABLE 15(b).

In yet another example, N_offset is fixed for a given carrier with BW of 20 MHz in the unlicensed band. In one consideration, TABLE 15(b) is not applicable to the scenario wherein the SCS of SS/PBCH block is not indicated by higher layer (e.g., it is only applicable when the SCS of SS/PBCH block is indicated by higher layer as 15 kHz, like reconfigured by higher layer after initial access).

TABLE 15(a)

Configuration of CORESET and PDCCH CSS

| Index | Multiplexing pattern | CORESET #0 BW | No. of Symbols for CORESET #0 | No. of Type0-PDCCH CSS per slot | First symbol index of Type0-PDCCH CSS | RB offset between the first RB of SS/PBCH block and the first RB of CORESET #0 |
|---|---|---|---|---|---|---|
| 0 | 1 | 48 | 1 | 2 | 0 if i is even, 1 if i is odd | N_offset |
| 1 | 1 | 48 | 1 | 2 | 0 if i is even, 6 if i is odd | N_offset |
| 2 | 1 | 48 | 1 | 1 | 0 | N_offset |
| 3 | 1 | 48 | 2 | 1 | 0 | N_offset |
| 4 | 1 | 48 | 2 | 2 | 0 if i is even, 6 if i is odd | N_offset |

TABLE 15(b)

Configuration of CORESET and PDCCH CSS

| Index | Multiplexing pattern | CORESET #0 BW | No. of symbols for CORESET #0 | No. of Type0-PDCCH CSS per slot | First symbol index of Type0-PDCCH CSS | RB offset between the first RB of SS/PBCH block and the first RB of CORESET #0 |
|---|---|---|---|---|---|---|
| 0 | 1 | 96 | 1 | 2 | 0 if i is even, 1 if i is odd | N_offset |
| 1 | 1 | 96 | 1 | 2 | 0 if i is even, 6 if i is odd | N_offset |
| 2 | 1 | 96 | 1 | 1 | 0 | N_offset |
| 3 | 1 | 96 | 2 | 1 | 0 | N_offset |
| 4 | 1 | 96 | 2 | 2 | 0 if i is even, 6 if i is odd | N_offset |

Yet another example of this approach for both the SCS of SS/PBCH block and the SCS of CORESET #0 as 30 kHz is shown in TABLE 16(a), and one example of this approach for both the SCS of SS/PBCH block and the SCS of CORESET #0 as 15 kHz is shown in TABLE 16(b), and wherein i is the index of associated candidate SS/PBCH block. In this set of examples, No. of symbols for CORESET #0 taking value of 2 can be combined with No. of Type0-PDCCH CSS per slot taking value of 2, but the second CSS starts from symbol #6. Meanwhile, when No. of symbols for CORESET #0 takes value of 1, and the second CSS is between two SS/PBCH blocks in the slot, the starting location of the second CSS could be configurable between #6 and #7.

In one sub-example, N_offset is fixed as 0. In another sub-example, N_offset is fixed as 28 for TABLE 16(a), and fixed as 76 for TABLE 16(b). In yet another example, N_offset is fixed as 14 for TABLE 16(a), and fixed as 38 for TABLE 16(b). In yet another example, N_offset is fixed for a given carrier with BW of 20 MHz in the unlicensed band. In one consideration, TABLE 16(b) is not applicable to the scenario wherein the SCS of SS/PBCH block is not indicated by higher layer (e.g., it is only applicable when the SCS of SS/PBCH block is indicated by higher layer as 15 kHz, like reconfigured by higher layer after initial access).

TABLE 16(a)

Configuration of CORESET and PDCCH CSS

| Index | Multiplexing pattern | CORESET #0 BW | No. of symbols for CORESET #0 | No. of Type0-PDCCH CSS per slot | First symbol index of Type0-PDCCH CSS | RB offset between the first RB of SS/PBCH block and the first RB of CORESET #0 |
|---|---|---|---|---|---|---|
| 0 | 1 | 48 | 1 | 2 | 0 if i is even, 1 if i is odd | N_offset |
| 1 | 1 | 48 | 1 | 2 | 0 if i is even, 6 if i is odd | N_offset |
| 2 | 1 | 48 | 1 | 2 | 0 if i is even, 7 if i is odd | N_offset |
| 3 | 1 | 48 | 1 | 1 | 0 | N_offset |
| 4 | 1 | 48 | 2 | 1 | 0 | N_offset |
| 5 | 1 | 48 | 2 | 2 | 0 if i is even, 6 if i is odd | N_offset |

TABLE 16(b)

Configuration of CORESET and PDCCH CSS

| Index | Multiplexing pattern | CORESET #0 BW | No. of symbols for CORESET #0 | No. of Type0-PDCCH CSS per slot | First symbol index of Type0-PDCCH CSS | RB offset between the first RB of SS/PBCH block and the first RB of CORESET #0 |
|---|---|---|---|---|---|---|
| 0 | 1 | 96 | 1 | 2 | 0 if i is even, 1 if i is odd | N_offset |
| 1 | 1 | 96 | 1 | 2 | 0 if i is even, 6 if i is odd | N_offset |
| 2 | 1 | 96 | 1 | 2 | 0 if i is even, 7 if i is odd | N_offset |
| 3 | 1 | 96 | 1 | 1 | 0 | N_offset |
| 4 | 1 | 96 | 2 | 1 | 0 | N_offset |
| 5 | 1 | 96 | 2 | 2 | 0 if i is even, 6 if i is odd | N_offset |

In another embodiment, the CORESET #0 configuration is configured separately from type0-PDCCH, using a separate field in MIB.

One example of this embodiment for both the SCS of SS/PBCH block and the SCS of CORESET #0 as 30 kHz is shown in TABLE 17(a), and one example of this approach for both the SCS of SS/PBCH block and the SCS of CORESET #0 as 15 kHz is shown in TABLE 17(b). In one sub-example, N_offset is fixed as 0. In another sub-example, N_offset is fixed as 28 for TABLE 17(a), and fixed as 76 for TABLE 17(b). In yet another example, N_offset is fixed as 14 for TABLE 17(a), and fixed as 38 for TABLE 17(b). In yet another example, N_offset is fixed for a given carrier with BW of 20 MHz in the unlicensed band. In one consideration, TABLE 17(b) is not applicable to the scenario wherein the SCS of SS/PBCH block is not indicated by higher layer (e.g., it is only applicable when the SCS of SS/PBCH block is indicated by higher layer as 15 kHz, like reconfigured by higher layer after initial access). In one aspect, there are only two configurations in this example, so the configuration index can be given by the MSB or LSB of controlResourceSetZero in pdcch-ConfigSIB1.

TABLE 17(a)

SS/PBCH block and the SCS of CORESET

| Index | Multiplexing pattern | CORESET#0 BW | No. of symbols for CORESET #0 | RB offset between the first RB of SS/PBCH block and the first RB of CORESET #0 |
|---|---|---|---|---|
| 0 | 1 | 48 | 1 | N_offset |
| 1 | 1 | 48 | 2 | N_offset |

TABLE 17(b)

SS/PBCH block and the SCS of CORESET

| Index | Multiplexing pattern | CORESET#0 BW | No. of symbols for CORESET #0 | RB offset between the first RB of SS/PBCH block and the first RB of CORESET #0 |
|---|---|---|---|---|
| 0 | 1 | 96 | 1 | N_offset |
| 1 | 1 | 96 | 2 | N_offset |

Figure 17:
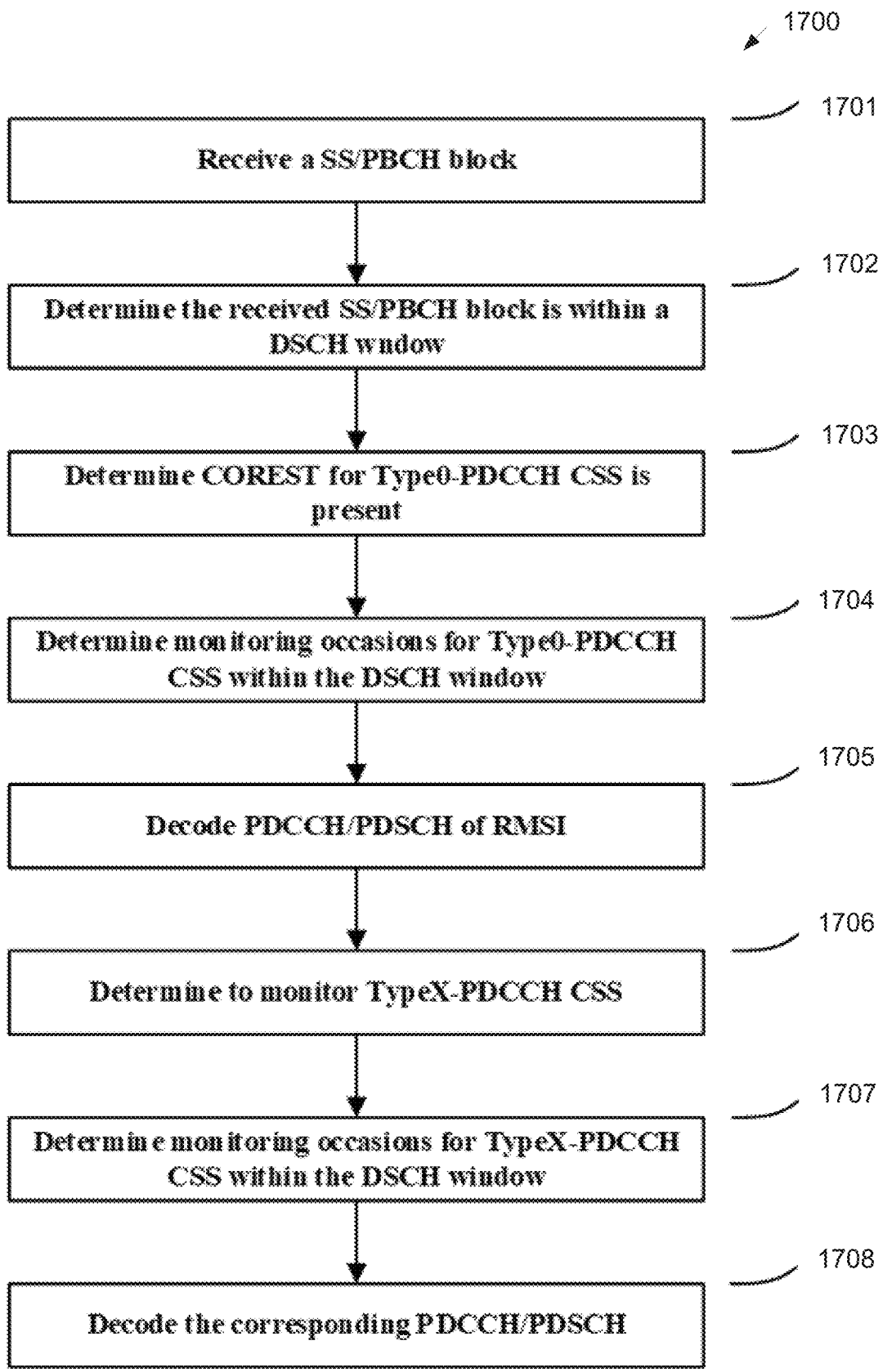
FIG. 17 illustrates an example UE procedure of monitoring CSS in DSCH transmission window according to embodiments of the present disclosure.

FIG. 17 illustrates an example UE procedure 1700 of monitoring CSS in DSCH transmission window according to embodiments of the present disclosure. An embodiment of the UE procedure 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

In one embodiment, a UE procedure for monitoring common search space (CSS) in DSCH transmission window is detailed in the present disclosure. For example, an illustration of the UE procedure is shown in FIG. 17. A UE receives a SS/PBCH block (1701), containing synchronization signals and PBCH, wherein an SS/PBCH block index is carried by the signals and/or channels in the SS/PBCH block, and further timing information is also carried by the signals and/or channels in the SS/PBCH block, such that the UE can determine the frame timing, and/or slot timing, and/or symbol timing based on the SS/PBCH block index and further timing information carried by the received SS/PBCH block. The UE further determines whether the received SS/PBCH block is within a DSCH transmission window (1702), based on an approach specified in the present disclosure.

After determining the received SS/PBCH block is within a DSCH transmission window, the UE further determines whether the CORESET for Type0-PDCCH CSS is present or not (1703), based on the indication in the PBCH of the received SS/PBCH block. After determining the CORESET for Type0-PDCCH CSS is present, the UE further determines the monitoring occasions for Type0-PDCCH CSS within the DSCH transmission window (1704), based on the approach specified in the present disclosure. The UE, then, decodes PDCCH/PDSCH of RMSI (1705).

The UE can further determine whether to monitor at least one of a Type0A-PDCCH CSS or a Type2-PDCCH CSS or a Type1-PDCCH CSS, based on an approach specified in the present disclosure (1706, wherein X can be 0A or 2 or 1). If the UE determines to monitor a TypeX-PDCCH CSS, the UE further determines the monitor occasions for a TypeX-PDCCH CSS within the DSCH transmission window (1707), based on an approach specified in the present disclosure, and then decodes the corresponding PDCCH/PDSCH (1708). Note that the procedure 1706 to 1708 can be performed multiple times (e.g., in series or in parallel) if multiple of Type0A-PDCCH CSS or a Type2-PDCCH CSS or a Type1-PDCCH CSS are determined to be monitored.

In another embodiment, a UE does not expect to receive any UE-specific channels in a slot in the DSCH transmission window, wherein that slot has received an SS/PBCH block or received PDCCH from Type0A-PDCCH CSS or a Type2-PDCCH CSS or a Type1-PDCCH CSS.

In yet another embodiment, a UE expects all slots in the DSCH transmission window are for DL transmission.

In yet another embodiment, the PDCCH candidate(s) in a CORESET #0, at least for those CORSET #0 in a DSCH transmission window, can be mapped symbol per symbol. In this embodiment, if the possible LBT success location can be as small as a symbol, then a gNB can choose one of the PDCCH candidates in a CORESET starting from the LBT success location, and a UE can monitor the PDCCH candidate in a CORESET #0 symbol by symbol to try to detect PDCCH. An example of this embodiment is given by FIG. 18, wherein a CORESET #0 is configured with 2 symbols, and each symbol can be possible LBT success location to start a transmission.

Figure 18:
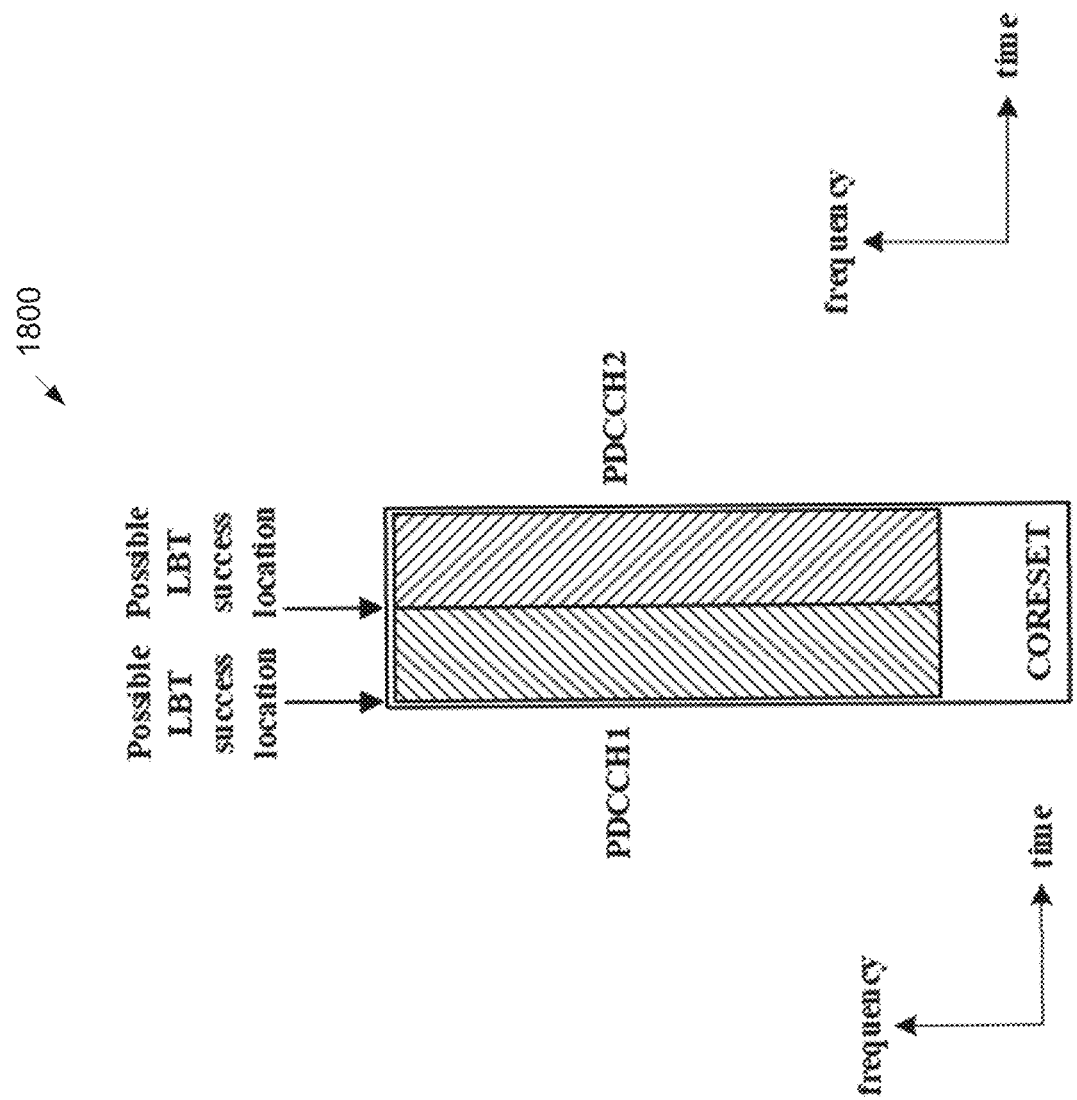
FIG. 18 illustrates an example PDCCH candidate monitoring according to embodiments of the present disclosure.

FIG. 18 illustrates an example PDCCH candidate monitoring 1800 according to embodiments of the present disclosure. An embodiment of the PDCCH candidate monitoring 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

A UE can at least monitor the CORESET symbol by symbol to detect PDCCH candidate, wherein the PDCCH may be transmitted on either of the symbols based on LBT result. In one consideration, this embodiment is only applicable to the number of symbols for CORESET #0 configured as 2, due to the SS/PBCH block pattern (e.g., there are at most 2 symbols available at the beginning of a slot and between two SS/PBCH blocks within a slot). Note that this monitoring procedure can be in addition to the monitoring procedure supported in NR specification, wherein a PDCCH candidate is mapped in time-domain first.

Figure 19:
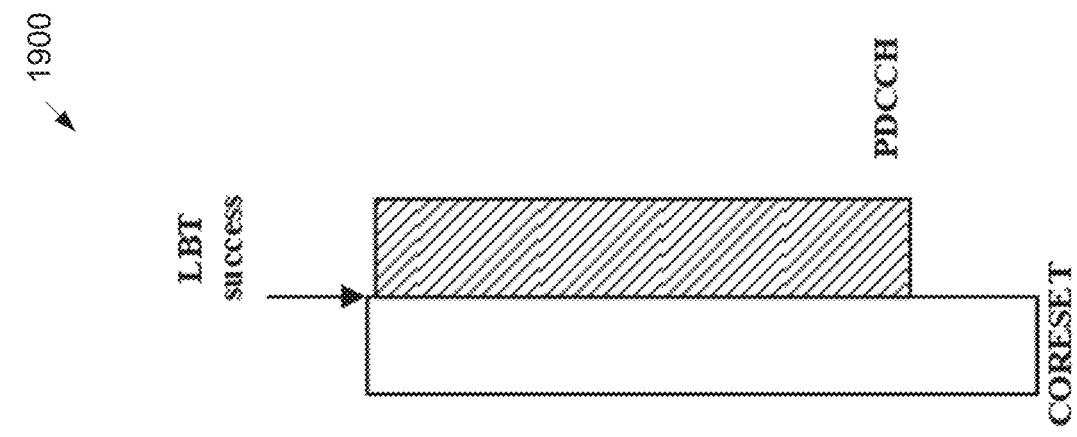
FIG. 19 illustrates another example PDCCH candidate monitoring according to embodiments of the present disclosure.

FIG. 19 illustrates another example PDCCH candidate monitoring 1900 according to embodiments of the present disclosure. An embodiment of the PDCCH candidate monitoring 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

In yet another embodiment, for NR-U, at least for those CORSET #0 in a DSCH transmission window, a UE can monitor PDCCH candidate outside CORESET #0 (e.g., in symbols later than CORESET #0), wherein the transmission of the PDCCH candidate can be expected to delayed subject to LBT. An example of this embodiment is given by FIG. 19, wherein a CORESET #0 is configured with 1 symbol, and a PDCCH candidate can be monitored within the CORESET #0. If the possible LBT success location can be as small as a symbol, and a gNB does not perform LBT successfully at the beginning of the CORESET #0, but performs LBT successfully right after the CORESET #0, then the gNB can transmit the PDCCH on the symbol right after the CORESET #0. In this example, a UE expects to monitor the PDCCH CSS in both the symbol for CORESET #0 and the symbol after CORESET #0.

In one consideration, this embodiment is only applicable to the number of symbols for CORESET #0 configured as 1 and at most 1 more symbol (e.g., the symbol right after the symbol configured for CORESET #0) is required for a UE to monitor the PDCCH CSS, due to the SS/PBCH block pattern (e.g., there are at most 2 symbols available at the beginning of a slot and between two SS/PBCH blocks within a slot). Note that this monitoring procedure can be in addition to the monitoring procedure supported in NR specification, wherein a PDCCH candidate is monitored in CORESET only.

In one embodiment, a UE determines the granularity of actually transmitted SS/PBCH blocks (e.g., planned actually transmitted SS/PBCH blocks, which can be reinterpreted based on LBT result) based on the Type0-PDCCH CSS configuration.

For one approach, if a UE is configured with only one Type0-PDCCH CSS within a slot (e.g., starting from symbol #0), then the granularity of actually transmitted SS/PBCH blocks is 2 SS/PBCH bocks (e.g., the bitmap is defined with granularity of a slot); if a UE is configured with two Type0-PDCCH CSSs within a slot, the granularity of actually transmitted SS/PBCH blocks is 1 SS/PBCH block (e.g., the bitmap is defined with granularity of an SS/PBCH block).

In one example, if a UE is configured with only one Type0-PDCCH CSS within a slot, and if the single SS/PBCH block is with even SS/PBCH block potential index, then a bit in the actually transmitted SS/PBCH block index bitmap taking value of 1 indicates the corresponding single SS/PBCH block within a slot with the even SS/PBCH block potential index is transmitted (e.g., or equivalently the first SS/PBCH block within the corresponding slot is transmitted, and the second SS/PBCH block within the correspondingly slot is not transmitted).

In one example, if a UE is configured with only one Type0-PDCCH CSS within a slot, and if the single SS/PBCH block is with odd SS/PBCH block potential index, then a bit in the actually transmitted SS/PBCH block index bitmap taking value of 1 indicates the corresponding single SS/PBCH block within a slot with the odd SS/PBCH block potential index is transmitted (e.g., or equivalently the second SS/PBCH block within the corresponding slot is transmitted, and the first SS/PBCH block within the correspondingly slot is not transmitted).

In one embodiment, if a UE is configured with only one Type0-PDCCH CSS within a slot, the UE assumes that there is only one SS/PBCH block actually transmitted within the slot. For one example, the UE assumes the one SS/PBCH block is the first SS/PBCH block within the slot (e.g., with even SS/PBCH block potential location index). In another example, the UE assumes the one SS/PBCH block is the second SS/PBCH block within the slot (e.g., with odd SS/PBCH block potential location index).

In yet another example, the one SS/PBCH block is whether the first or second SS/PBCH block is configured to the UE, e.g., by MIB. In yet another example, the UE determines the SS/PBCH block as first or second SS/PBCH block based on its reception of the SS/PBCH block, and there is no indication or pre-specification, and in this example, the UE assumes all other SS/PBCH blocks in the same cell are with the same location within a slot as the received SS/PBCH block (e.g., the first SS/PBCH block or second SS/PBCH block within a slot).

In one embodiment, a UE determines the granularity of actually transmitted SS/PBCH blocks based on an explicit indication from a gNB. For one approach, the granularity of actually transmitted SS/PBCH blocks can be configured as 1 SS/PBCH block or 1 slot (e.g., 2 SS/PBCH blocks). In one example, the indication can be using the field of subCarrierSpacingCommon in MIB. In another example, the indication can be using the MSB of controlResourceSetZero in pdcch-ConfigSIB1. In yet another example, the indication can be using the 2nd LSB of controlResourceSetZero in pdcch-ConfigSIB1. In yet another example, the indication can be using the MSB of searchSpaceZero in pdcch-ConfigSIB1.

In one embodiment, a UE determines the granularity of wrapping around operation to compensate LBT loss based on the Type0-PDCCH CSS configuration, wherein the wrapping around operation refers to transmitting the untransmitted SS/PBCH blocks due to LBT at the end of the transmission burst.

For one approach, if a UE is configured with only one Type0-PDCCH CSS within a slot (e.g., starting from symbol

0), then the granularity of wrapping around operation is 2 SS/PBCH bocks (e.g., the granularity is a slot); if a UE is configured with two Type0-PDCCH CSSs within a slot, the granularity of wrapping around operation is 1 SS/PBCH block.

In one embodiment, a UE determines the granularity of the granularity of wrapping around operation based on an explicit indication from a gNB. For one approach, the granularity of wrapping around operation can be configured as 1 SS/PBCH block or 1 slot (e.g., 2 SS/PBCH blocks). In one example, the indication can be using the field of subCarrierSpacingCommon in MIB. In another example, the indication can be using the MSB of controlResourceSetZero in pdcch-ConfigSIB1. In yet another example, the indication can be using the 2nd LSB of controlResourceSetZero in pdcch-ConfigSIB1. In yet another example, the indication can be using the MSB of searchSpaceZero in pdcch-ConfigSIB1.

In one embodiment, the first SS/PBCH block can be not cell-defining (e.g., a CORESET for Type0-PDCCH CSS set is not present), wherein the determination of not presence of a CORESET for Type0-PDCCH CSS set can be indicated by PBCH payload.

In one approach, the indication of whether a CORESET for Type0-PDCCH CSS set is present or not can be combined with the indication of sub-RB-level frequency offset between CORESET boundary and SS/PBCH block boundary (e.g., floating sync or denoted as k_SSB), e.g., K codepoints using k bits in PBCH payload are utilized for indicating the sub-RB-level frequency offset, wherein $K<2^k$, and the remaining codepoints or part of the remaining codepoints can be utilized for indicating there is no CORESET for Type0-PDCCH CSS set present.

In one example, for a NR-U band (e.g., 5 GHz and/or 6 GHz unlicensed band), if the SCS of SS/PBCH block and the SCS of CORESET for Type0-PDCCH CSS set are both 30 kHz, and k_SSB is defined by the unit of 15 kHz, then the candidate value of k_SSB can be always assumed to be even within the set {0, 2, . . . , 22}, wherein taking k_SSB as a value within the set indicates a CORESET for Type0-PDCCH CSS set is present, and some or all of the remaining codepoints can be used for indicating there is no CORESET for Type0-PDCCH CSS set present. In this example, 4 bits in total are sufficient for the indication, and a particular instance is in TABLE 18.

TABLE 18

| Codepoint value of a field of 4 bits in PBCH payload | Codepoint value Indication |
|---|---|
| 0 | k_SSB = 0 and a CORESET for Type0-PDCCH CSS set is present |
| 1 | k_SSB = 2 and a CORESET for Type0-PDCCH CSS set is present |
| . . . | . . . |
| 10 | k_SSB = 20 and a CORESET for Type0-PDCCH CSS set is present |
| 11 | k_SSB = 22 and a CORESET for Type0-PDCCH CSS set is present |
| 12 | k_SSB = 24 and reserved |
| 13 | k_SSB = 26 and reserved |
| 14 | k_SSB = 28 and reserved |
| 15 | k_SSB = 30 and no CORESET for Type0-PDCCH CSS set present |

In another example, for a NR-U band (e.g., 5 GHz and/or 6 GHz unlicensed band), if the SCS of SS/PBCH block and the SCS of CORESET for Type0-PDCCH CSS set are both 30 kHz, and k_SSB is defined by the unit of 15 kHz, then the candidate value of k_SSB can be always assumed to be even within the set {0, 2, . . . , 22}, wherein taking k_SSB as a value within the set indicates a CORESET for Type0-PDCCH CSS set is present, and some or all of the remaining codepoints can be used for indicating there is no CORESET for Type0-PDCCH CSS set present. In this example, 5 bits in total are sufficient for the indication, and a particular instance is in TABLE 19.

TABLE 19

| Codepoint value of a field of 5 bits in PBCH payload | Codepoint value Indication |
|---|---|
| 0 | k_SSB = 0 and a CORESET for Type0-PDCCH CSS set is present |
| 1 | k_SSB = 1 and reserved |
| 2 | k_SSB = 2 and a CORESET for Type0-PDCCH CSS set is present |
| 3 | k_SSB = 3 and reserved |
| . . . | . . . |
| 22 | k_SSB = 22 and a CORESET for Type0-PDCCH CSS set is present |
| 23 | k_SSB = 23 and reserved |
| . . . | . . . |
| 30 | k_SSB = 30 and reserved |
| 31 | k_SSB = 31 and no CORESET for Type0-PDCCH CSS set present |

For yet another example, for a NR-U band (e.g., 5 GHz and/or 6 GHz unlicensed band), if the SCS of SS/PBCH block and the SCS of CORESET for Type0-PDCCH CSS set are both 30 kHz, and k_SSB is defined by the unit of 30 kHz, then the candidate value of k_SSB can be always assumed to be within the set {0, 1, . . . , 11}, wherein taking k_SSB as a value within the set indicates a CORESET for Type0-PDCCH CSS set is present, and some or all of the remaining codepoints can be used for indicating there is no CORESET for Type0-PDCCH CSS set present. In this example, 4 bits in total are sufficient for the indication, and a particular instance is in TABLE 20.

TABLE 20

| Codepoint value of a field of 4 bits in PBCH payload | Codepoint value Indication |
|---|---|
| 0 | k_SSB = 0 and a CORESET for Type0-PDCCH CSS set is present |
| 1 | k_SSB = 1 and a CORESET for Type0-PDCCH CSS set is present |
| 2 | k_SSB = 2 and a CORESET for Type0-PDCCH CSS set is present |
| 3 | k_SSB = 3 and a CORESET for Type0-PDCCH CSS set is present |
| . . . | . . . |
| 11 | k_SSB = 11 and a CORESET for Type0-PDCCH CSS set is present |
| 12 | k_SSB = 12 and reserved |
| . . . | . . . |
| 14 | k_SSB = 14 and reserved |
| 15 | k_SSB = 15 and no CORESET for Type0-PDCCH CSS set present |

In yet another example, for a NR-U band (e.g., 5 GHz and/or 6 GHz unlicensed band), if the SCS of SS/PBCH block and the SCS of CORESET for Type0-PDCCH CSS set are both 30 kHz, and k_SSB is defined by the unit of 100 kHz, then the candidate value of k_SSB can be always assumed to be within the set {−2, −1, 0, 1, 2} or {0, 1, 2, 3, 4}, wherein taking k_SSB as a value within the set indicates a CORESET for Type0-PDCCH CSS set is present, and some or all of the remaining codepoints can be used for indicating there is no CORESET for Type0-PDCCH CSS set present. In this example, 3 bits in total are sufficient for the indication, and a particular instance is in TABLE 21 and TABLE 22.

TABLE 21

Codepoint value

| Codepoint value of a field of 3 bits in PBCH payload | Indication |
| --- | --- |
| 0 | k_SSB = 0 and a CORESET for Type0-PDCCH CSS set is present |
| 1 | k_SSB = 1 and a CORESET for Type0-PDCCH CSS set is present |
| 2 | k_SSB = 2 and a CORESET for Type0-PDCCH CSS set is present |
| 3 | k_SSB = 3 and a CORESET for Type0-PDCCH CSS set is present |
| 4 | k_SSB = 4 and a CORESET for Type0-PDCCH CSS set is present |
| 5 | k_SSB = 5 and reserved |
| 6 | k_SSB = 6 and reserved |
| 7 | k_SSB = 7 and no CORESET for Type0-PDCCH CSS set present |

TABLE 22

Codepoint value

| Codepoint value of a field of 3 bits in PBCH payload | Indication |
| --- | --- |
| 0 | k_SSB = −2 and a CORESET for Type0-PDCCH CSS set is present |
| 1 | k_SSB = −1 and a CORESET for Type0-PDCCH CSS set is present |
| 2 | k_SSB = 0 and a CORESET for Type0-PDCCH CSS set is present |
| 3 | k_SSB = 1 and a CORESET for Type0-PDCCH CSS set is present |
| 4 | k_SSB = 2 and a CORESET for Type0-PDCCH CSS set is present |
| 5 | reserved |
| 6 | reserved |
| 7 | no CORESET for Type0-PDCCH CSS set present |

In one approach, the indication of whether a CORESET for Type0-PDCCH CSS set is present or not can be using a separate bit in PBCH payload.

In one embodiment, the first SS/PBCH block can be located on a SS rater, and the second SS/PBCH block can be cell-defining (e.g., a CORESET for Type0-PDCCH CSS set is present), and the indication of the frequency location where a second SS/PBCH block is located and/or the frequency location range where a second SS/PBCH block does not exit is by PBCH payload. When the first SS/PBCH block is not cell-defining (e.g., a CORESET for Type0-PDCCH CSS set is not present), the fields related to CORESET configuration and/or associated CSS set configuration in PBCH payload can be utilized for indicating whether/where the second SS/PBCH block is located.

In such approach, at least one of the following approaches can be supported, and if multiple approaches are supported, they can be configurable using different codepoints in PBCH payload.

In one approach, for a given NR-U band, denote the set of all SS raster entries as S_raster, wherein for example a raster entry can be expressed in term of GSCN value, then the indication of the location of the second SS/PBCH block can be expressed as one value within set S_raster (e.g., indicating an absolute frequency location). In one example, the second SS/PBCH block indicated is the nearest cell-defining SS/PBCH block in frequency domain comparing to the first SS/PBCH block. An illustration of this approach is shown in FIG. 20.

Figure 20:
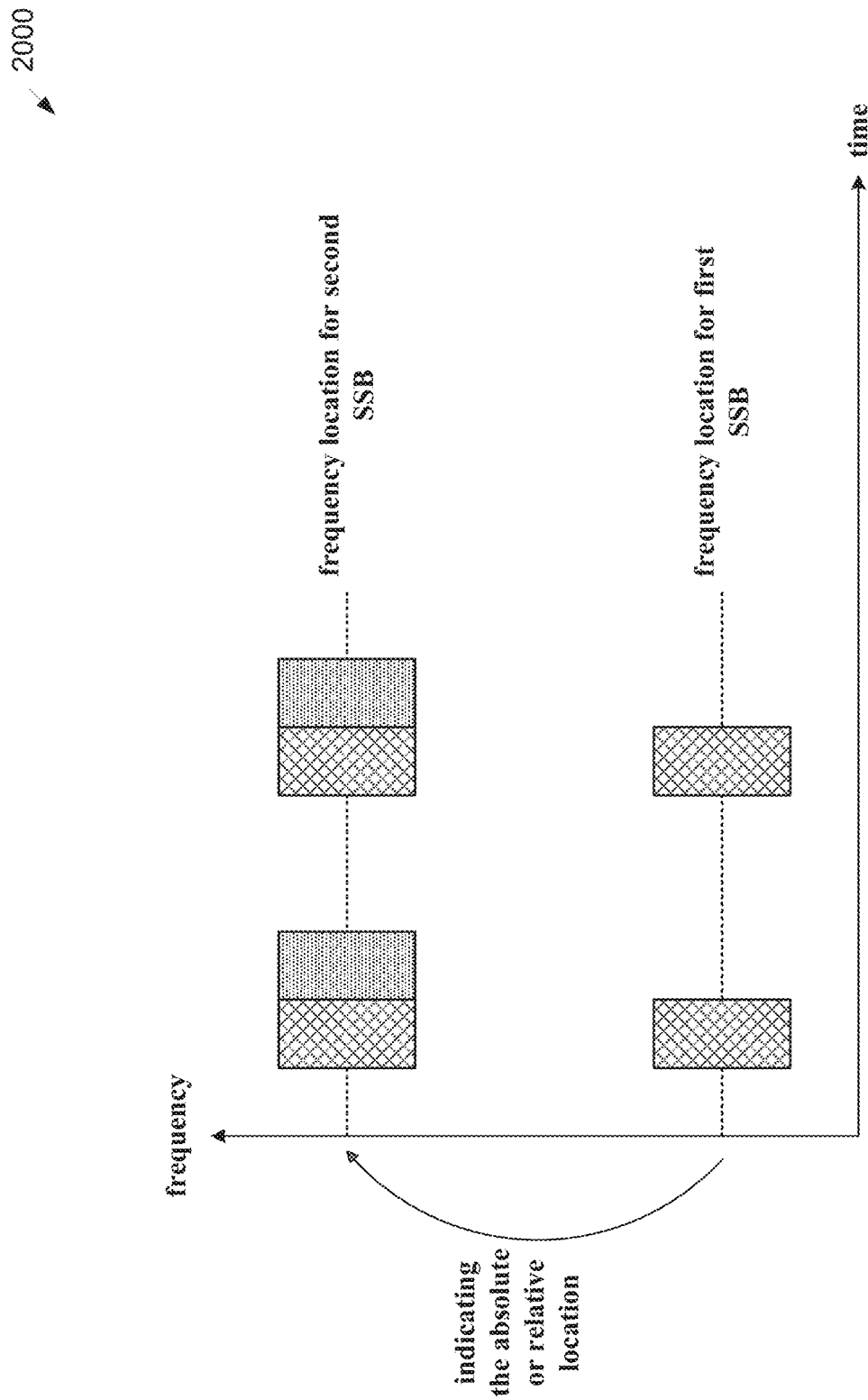
FIG. 20 illustrates an example indication of the location of SS/PBCH block according to embodiments of the present disclosure.

FIG. 20 illustrates an example indication of the location of SS/PBCH block 2000 according to embodiments of the present disclosure, An embodiment of the indication of the location of SS/PBCH block 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

In another approach, for a given NR-U band, denote the set of all possible GSCN values contained in the NR-U band as S_GSCN, then the indication of the location of the second SS/PBCH block can be expressed as one value within set S_GSCN (e.g., indicating an absolute frequency location). In one example, the second SS/PBCH block indicated is the nearest cell-defining SS/PBCH block in frequency domain comparing to the first SS/PBCH block. An illustration of this approach is shown in FIG. 20.

In yet another approach, for a given NR-U band, the indication of the location of the second SS/PBCH block can be expressed as the index of carrier (e.g., indicating an absolute frequency location). In one example, the second SS/PBCH block indicated is the nearest cell-defining SS/PBCH block in frequency domain comparing to the first SS/PBCH block. In another example, every carrier with minimum carrier bandwidth has only single SS raster entry, then the indication of the index of a carrier is the same as indication of the single SS raster entry of that carrier. An illustration of this approach is shown in FIG. 20.

In yet another approach, for a given NR-U band, the indication of the location of the second SS/PBCH block can be expressed as an offset to the frequency location of the first SS/PBCH block (e.g., indicating a relative frequency location), wherein the offset can be either positive or negative, and expressed in term of GSCN value. An illustration of this approach is shown in FIG. 20.

In yet another approach, for a given NR-U band, the indication of the location of the second SS/PBCH block can be expressed as an offset to the frequency location of the first SS/PBCH block (e.g., indicating a relative frequency location), wherein the offset can be either positive or negative, and expressed in term of SS raster entries (SS raster entries are expressed in GSCN values). The difference of this example from above example is, SS raster entries can be down-selected from GSCN values (e.g., by using a step size in down selection), and the granularity in the indication can be larger (e.g., the step size is larger than 1). An illustration of this approach is shown in FIG. 20.

In yet another approach, for a given NR-U band, the indication of the location of the second SS/PBCH block can be expressed as an offset to the frequency location of the first SS/PBCH block (e.g., indicating a relative frequency location), wherein the offset can be either positive or negative, and expressed in term of number of carriers with minimum carrier bandwidth. An illustration of this approach is shown in FIG. 20.

In yet another approach, for a given NR-U band, denote the set of all SS raster entries as S_raster, wherein for example a raster entry can be expressed in term of GSCN value, then the indication of the location of the second SS/PBCH block can be expressed as a bitmap with bitwidth same as the size of S_raster, wherein a bit taking value of 1 corresponds to indicating a cell-defining SS/PBCH block at the corresponding SS raster. An illustration of this approach is shown in FIG. 21.

Figure 21:
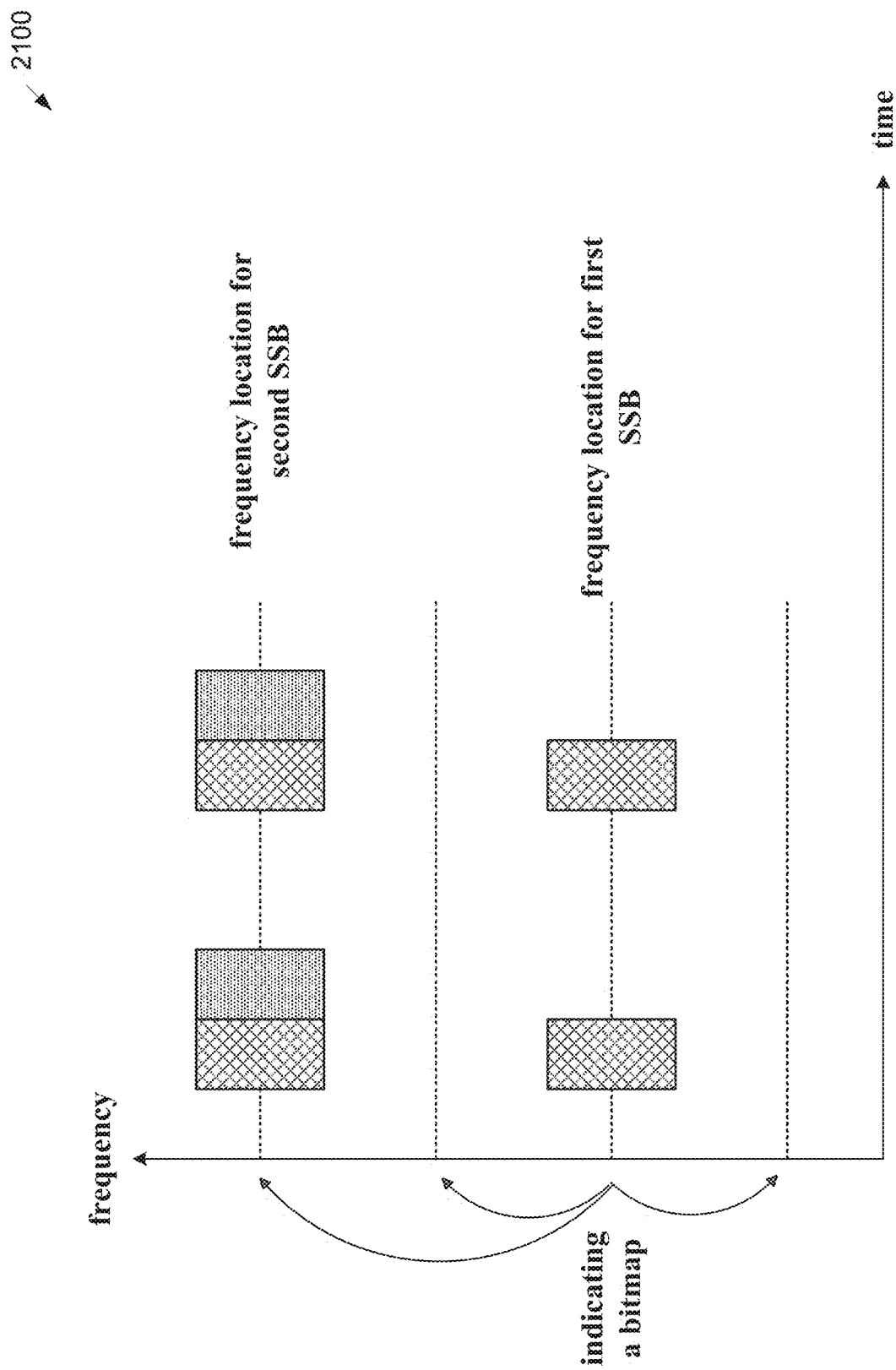
FIG. 21 illustrates another example indication of the location of SS/PBCH block according to embodiments of the present disclosure.

FIG. 21 illustrates another example indication of the location of SS/PBCH block 2100 according to embodiments of the present disclosure. An embodiment of the indication of the location of SS/PBCH block 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

In yet another approach, for a given NR-U band, the indication of the location of the second SS/PBCH block can be expressed as a bitmap with bitwidth same as the size same as the number of carrier with minimum carrier bandwidth, wherein a bit taking value of 1 corresponds to indicating a cell-defining SS/PBCH block in the corresponding carrier. An illustration of this approach is shown in FIG. 21.

In yet another approach, for a given NR-U band, the indication of a frequency location range where the second SS/PBCH block does not exist, wherein the frequency range can be expressed in GSCN values. In one example, the range is defined using the GSCN of the first SS/PBCH block as the reference frequency location, and one codepoint in PBCH payload indicates both the lower bound and upper bound of the frequency location range comparing to the reference frequency location, wherein the lower bound and upper bound are both expressed in GSCN values. An illustration of this approach is shown in FIG. 22.

Figure 22:
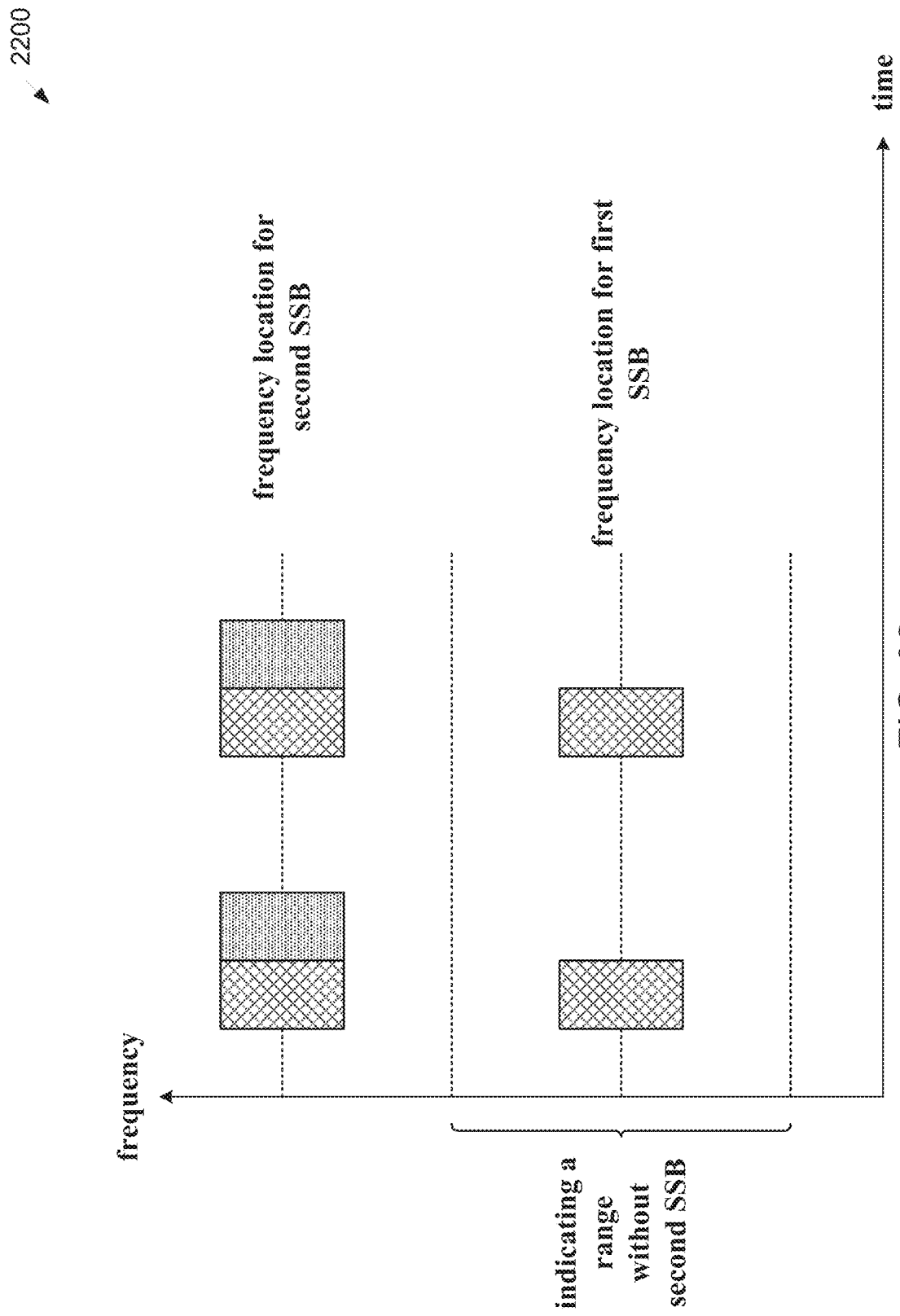
FIG. 22 illustrates yet another example indication of the location of SS/PBCH block according to embodiments of the present disclosure.

FIG. 22 illustrates yet another example indication of the location of SS/PBCH 2200 block according to embodiments of the present disclosure. An embodiment of the indication of the location of SS/PBCH 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

In yet another approach, for a given NR-U band, the indication of a frequency location range where the second SS/PBCH block does not exist, wherein the frequency range can be expressed in SS raster entries. In one example, the range is defined using the GSCN of the first SS/PBCH block as the reference frequency location, and one codepoint in PBCH payload indicates both the lower bound and upper bound of the frequency location range comparing to the reference frequency location, wherein the lower bound and upper bound are both expressed in a multiple of SS rater step size (e.g., the step size is defined by a number of GSCN values). An illustration of this approach is shown in FIG. 22.

In one embodiment, the first SS/PBCH block can be not located on a SS rater, and the second SS/PBCH block can be cell-defining (e.g., a CORESET for Type0-PDCCH CSS set is present), and the indication of the frequency location where a second SS/PBCH block is located and/or the frequency location range where a second SS/PBCH block does not exit is by PBCH payload. When the first SS/PBCH block is not cell-defining (e.g., a CORESET for Type0-PDCCH CSS set is not present), the fields related to CORESET configuration and/or associated CSS set configuration in PBCH payload can be utilized for indicating whether/where the second SS/PBCH block is located.

In such embodiment, at least one of the following approaches can be supported, and if multiple approaches are supported, they can be configurable using different codepoints in PBCH payload.

In one approach, for a given NR-U band, denote the set of all SS raster entries as S_raster, wherein for example a raster entry can be expressed in term of GSCN value, then the indication of the location of the second SS/PBCH block can be expressed as one value within set S_raster (e.g., indicating an absolute frequency location). In one example, the second SS/PBCH block indicated is the nearest cell-defining SS/PBCH block in frequency domain comparing to the first SS/PBCH block. An illustration of this approach is shown in FIG. 20. Note that the frequency location of the first SS/PBCH block may not be a SS raster entry.

In another approach, for a given NR-U band, denote the set of all possible GSCN values contained in the NR-U band as S_GSCN, then the indication of the location of the second SS/PBCH block can be expressed as one value within set S_GSCN (e.g., indicating an absolute frequency location). In one example, the second SS/PBCH block indicated is the nearest cell-defining SS/PBCH block in frequency domain comparing to the first SS/PBCH block. An illustration of this approach is shown in FIG. 20. Note that the frequency location of the first SS/PBCH block may not be a SS raster entry.

In yet another approach, for a given NR-U band, the indication of the location of the second SS/PBCH block can be expressed as the index of carrier (e.g., indicating an absolute frequency location). In one example, the second SS/PBCH block indicated is the nearest cell-defining SS/PBCH block in frequency domain comparing to the first SS/PBCH block. In another example, every carrier with minimum carrier bandwidth has only single SS raster entry, then the indication of the index of a carrier is the same as indication of the single SS raster entry of that carrier. An illustration of this approach is shown in FIG. 20. Note that the frequency location of the first SS/PBCH block may not be a SS raster entry.

In yet another approach, for a given NR-U band, the indication of the location of the second SS/PBCH block can be expressed as an offset to the frequency location of the first SS/PBCH block (e.g., indicating a relative frequency location), wherein the offset can be either positive or negative, and expressed in term of GSCN value. An illustration of this approach is shown in FIG. 20. Note that the frequency location of the first SS/PBCH block may not be a SS raster entry. Note that the frequency location of the first SS/PBCH block may not be a SS raster entry.

In yet another approach, for a given NR-U band, the indication of the location of the second SS/PBCH block can be expressed as an offset to the frequency location of the first SS/PBCH block (e.g., indicating a relative frequency location), wherein the offset can be either positive or negative, and expressed in term of SS raster entries (SS raster entries are expressed in GSCN values). The difference of this example from above example is, SS raster entries can be down-selected from GSCN values (e.g., by using a step size in down selection), and the granularity in the indication can be larger (e.g., the step size is larger than 1). An illustration of this approach is shown in FIG. 20. Note that the frequency location of the first SS/PBCH block may not be a SS raster entry.

In yet another approach, for a given NR-U band, the indication of the location of the second SS/PBCH block can be expressed as an offset to the frequency location of the first SS/PBCH block (e.g., indicating a relative frequency location), wherein the offset can be either positive or negative, and expressed in term of number of carriers with minimum carrier bandwidth. An illustration of this approach is shown in FIG. 20. Note that the frequency location of the first SS/PBCH block may not be a SS raster entry.

In yet another approach, for a given NR-U band, denote the set of all SS raster entries as S_raster, wherein for example a raster entry can be expressed in term of GSCN value, then the indication of the location of the second SS/PBCH block can be expressed as a bitmap with bitwidth same as the size of S_raster, wherein a bit taking value of 1 corresponds to indicating a cell-defining SS/PBCH block at the corresponding SS raster. An illustration of this approach is shown in FIG. 21. Note that the frequency location of the first SS/PBCH block may not be a SS raster entry.

In yet another approach, for a given NR-U band, the indication of the location of the second SS/PBCH block can be expressed as a bitmap with bitwidth same as the size same as the number of carrier with minimum carrier bandwidth, wherein a bit taking value of 1 corresponds to indicating a cell-defining SS/PBCH block in the corresponding carrier. An illustration of this approach is shown in FIG. 21. Note that the frequency location of the first SS/PBCH block may not be a SS raster entry.

In yet another approach, for a given NR-U band, the indication of a frequency location range where the second SS/PBCH block does not exist, wherein the frequency range can be expressed in GSCN values. In one example, the range is defined using the location of the first SS/PBCH block as the reference frequency location, and one codepoint in PBCH payload indicates both the lower bound and upper bound of the frequency location range comparing to the reference frequency location, wherein the lower bound and upper bound are both expressed in GSCN values. An illustration of this approach is shown in FIG. 22. Note that the frequency location of the first SS/PBCH block may not be a SS raster entry.

In yet another approach, for a given NR-U band, the indication of a frequency location range where the second SS/PBCH block does not exist, wherein the frequency range can be expressed in SS raster entries. In one example, the range is defined using the location of the first SS/PBCH block as the reference frequency location, and one codepoint in PBCH payload indicates both the lower bound and upper bound of the frequency location range comparing to the reference frequency location, wherein the lower bound and upper bound are both expressed in a multiple of SS rater step size (e.g., the step size is defined by a number of GSCN values). An illustration of this approach is shown in FIG. 22. Note that the frequency location of the first SS/PBCH block may not be a SS raster entry.

Figure 23:
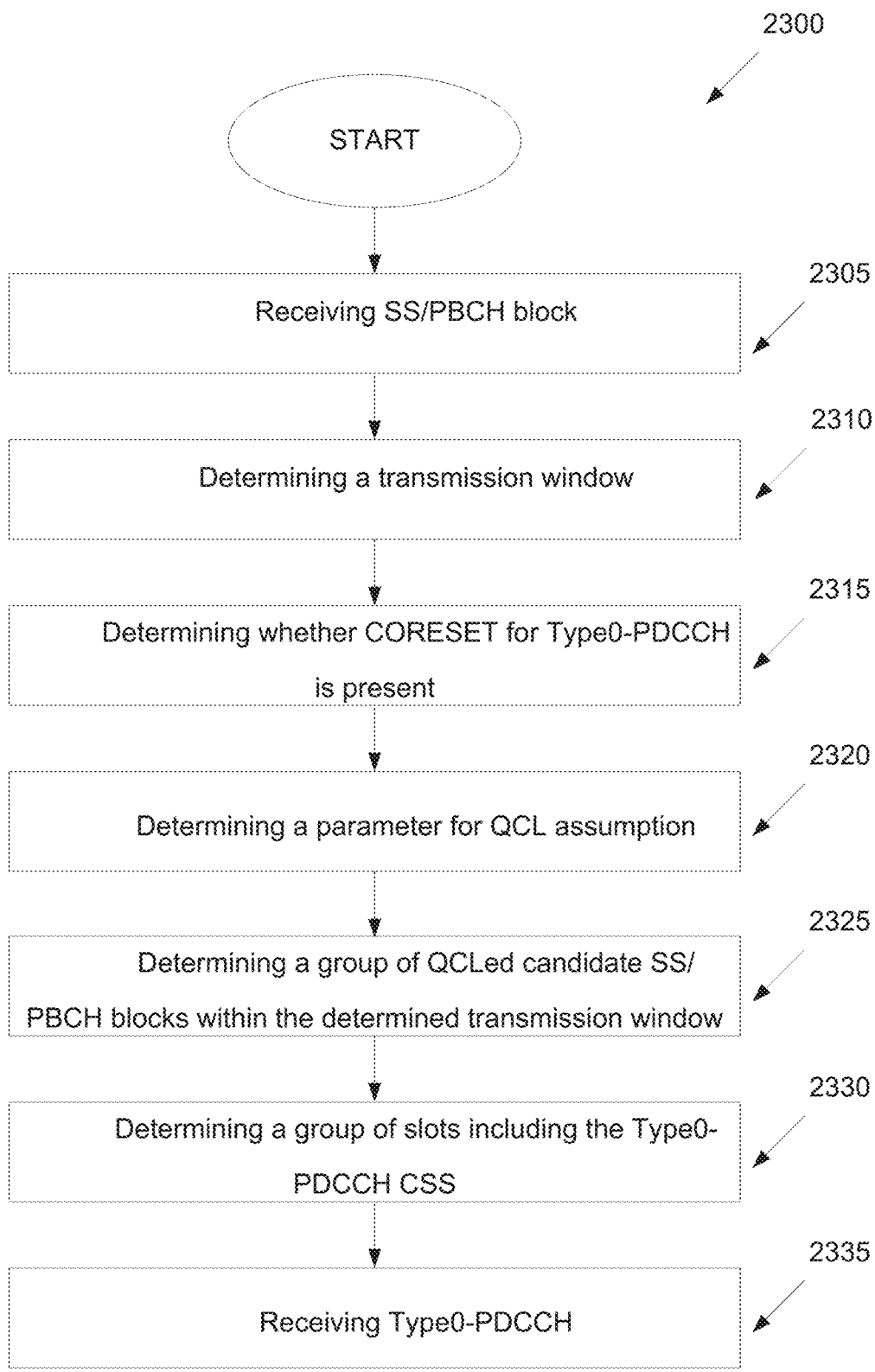
FIG. 23 illustrates an example common search space for discovery signal and channel according to embodiments of the present disclosure.

FIG. 23 illustrates an example of a method 2300 for common search space for discovery signal and channel according to embodiments of the present disclosure, as may be performed by a user equipment (UE) (e.g., 111-116 as illustrated in FIG. 1). An embodiment of the method 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 23, the method 2300 begins at step 2305.

In step 2305, a UE receives, from a base station (BS) over a first downlink channel, a synchronization signals and physical broadcast channel (SS/PBCH) block.

Subsequently, the UE, in step 2310, determines a transmission window in which the received SS/PBCH block is located.

Subsequently, the UE, in step 2315, determines whether a control resource set (CORESET) for Type0 physical downlink control channels (Type0-PDCCH) common search space (CSS) is present based on the received SS/PBCH block.

In one embodiment, a slot of the group of slots including the Type0-PDCCH CSS is located either within the transmission window or outside the transmission window.

Subsequently, the UE, in step 2320, determines a parameter for a quasi-co-location (QCL) assumption of candidate SS/PBCH blocks within the transmission window.

In one embodiment, the parameter for the QCL assumption is configured by the SS/PBCH block received from the BS, and wherein a value of the parameter is determined from $\{1, 2, 4, 8\}$.

Subsequently, the UE, in step 2325, determines a group of QCLed candidate SS/PBCH blocks within the transmission window based on the determined parameter for the QCL assumption.

Next, the UE, in step 2330, determines a group of slots including the Type0-PDCCH CSS, wherein each slot of the group of slots corresponds to a candidate SS/PBCH block within the group of QCLed candidate SS/PBCH blocks.

Finally, the UE, in step 2335, receives, from the BS over a second downlink channel, at least one Type0-PDCCH based on the determined groups of slots including the Type0-PDCCH CSS.

In one embodiment, the UE identifies two slots of the group of slots including the Type0-PDCCH CSS, two slots being consecutive in a time domain, and wherein each of the two slots corresponds to a same candidate SS/PBCH block, respectively.

In one embodiment, an index of the same candidate SS/PBCH block within the transmission window is determined from $\{0, 1, \ldots, 9\}$ for a sub-carrier spacing (SCS) of the candidate SS/PBCH block as 15 kHz; and the index of the same candidate SS/PBCH block within the transmission window is determined from $\{0, 1, \ldots, 19\}$ for the SCS of the candidate SS/PBCH block as 30 kHz.

In one embodiment, an index of a first slot of the two slot is determined based on a parameter M that is configured by the SS/PBCH block received from the BS, and wherein a value of the parameter M is determined from $\{\frac{1}{2}, 1, 2\}$, and a restriction to the value of the parameter M is determined based on the value of the configured parameter for the QCL assumption.

In such embodiment, the restriction to the value of the parameter M is not expected to be configured as 2, when the value of the parameter for the QCL assumption is configured as 1.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system supporting a shared spectrum channel access, the UE comprising:
    at least one transceiver configured to receive, from a base station (BS) over a first downlink channel, a synchronization signals and physical broadcast channel (SS/PBCH) block; and
    at least one processor operably connected to the at least one transceiver, the at least one processor configured to:
        determine a transmission window in which the received SS/PBCH block is located;
        determine whether a control resource set (CORESET) for Type0 physical downlink control channels (Type0-PDCCH) common search space (CSS) is present based on the received SS/PBCH block;
        determine a parameter for a quasi-co-location (QCL) assumption of candidate SS/PBCH blocks within the transmission window;
        determine a group of QCLed candidate SS/PBCH blocks within the transmission window based on the determined parameter for the QCL assumption; and
        determine a group of slots including the Type0-PDCCH CSS, wherein each slot of the group of slots corresponds to a candidate SS/PBCH block within the group of QCLed candidate SS/PBCH blocks,
    wherein the at least one transceiver is further configured to receive, from the BS over a second downlink channel, at least one Type0-PDCCH based on the determined groups of slots including the Type0-PDCCH CSS.

2. The UE of claim 1, wherein the parameter for the QCL assumption is configured by the SS/PBCH block received from the BS, and wherein a value of the parameter is determined from {1, 2, 4, 8}.

3. The UE of claim 1, wherein a slot of the group of slots including the Type0-PDCCH CSS is located either within the transmission window or outside the transmission window.

4. The UE of claim 1, wherein the at least one processor is further configured to identify two slots of the group of slots including the Type0-PDCCH CSS, two slots being consecutive in a time domain, and wherein each of the two slots corresponds to a same candidate SS/PBCH block, respectively.

5. The UE of claim 4, wherein:
    an index of the same candidate SS/PBCH block within the transmission window is determined from {0, 1, ..., 9} for a sub-carrier spacing (SCS) of the candidate SS/PBCH block as 15 kHz; and
    the index of the same candidate SS/PBCH block within the transmission window is determined from {0, 1, ..., 19} for the SCS of the candidate SS/PBCH block as 30 kHz.

6. The UE of claim 4, wherein:
    an index of a first slot of the two slot is determined based on a parameter M that is configured by the SS/PBCH block received from the BS;
    a value of the parameter M is determined from {½, 1, 2}; and
    a restriction to the value of the parameter M is determined based on the value of the configured parameter for the QCL assumption.

7. The UE of claim 6, wherein the restriction to the value of the parameter M is not expected to be configured as 2, when the value of the parameter for the QCL assumption is configured as 1.

8. A base station (BS) in a wireless communication system supporting a shared spectrum channel access, the BS comprising:
    at least one processor configured to:
        determine a transmission window in which a synchronization signal/physical broadcasting channel (SS/PBCH) block is located;
        determine whether a control resource set (CORESET) for Type0 physical downlink control channels (Type0-PDCCH) common search space (CSS) is present based on the SS/PBCH block;
        determine a parameter for a quasi-co-location (QCL) assumption of candidate SS/PBCH blocks within the transmission window;
        determine a group of QCLed candidate SS/PBCH blocks within the transmission window based on the determined parameter for the QCL assumption; and
        determine a group of slots including the Type0-PDCCH CSS, wherein each slot of the group of slots corresponds to a candidate SS/PBCH block within the group of QCLed candidate SS/PBCH blocks; and
    at least one transceiver operably connected to the at least one processor, the at least one transceiver configured to:
        transmit, to a user equipment (UE) over a first downlink channel, the SS/PBCH block; and
        transmit, to the UE over a second downlink channel, at least one Type0-PDCCH based on the determined groups of slots including the Type0-PDCCH CSS.

9. The BS of claim 8, wherein the parameter for the QCL assumption is configured by the SS/PBCH block transmitted to the UE, and wherein a value of the parameter is determined from {1, 2, 4, 8}.

10. The BS of claim 8, wherein a slot of the group of slots including the Type0-PDCCH CSS is located either within the transmission window or outside the transmission window.

11. The BS of claim 8, wherein the at least one processor is further configured to identify two slots of the group of slots including the Type0-PDCCH CSS, two slots being consecutive in a time domain, and wherein each of the two slots corresponds to a same candidate SS/PBCH block, respectively.

12. The BS of claim 11, wherein:
    an index of the same candidate SS/PBCH block within the transmission window is determined from {0, 1, ..., 9} for a sub-carrier spacing (SCS) of the candidate SS/PBCH block as 15 kHz; and
    the index of the same candidate SS/PBCH block within the transmission window is determined from {0, 1, ..., 19} for the SCS of the candidate SS/PBCH block as 30 kHz.

13. The BS of claim 11, wherein:
an index of a first slot of the two slot is determined based on a parameter M that is configured by the SS/PBCH block received from the BS;
a value of the parameter M is determined from {½, 1, 2}; and
a restriction to the value of the parameter M is determined based on the value of the configured parameter for the QCL assumption.

14. The BS of claim 13, wherein restriction to the value of the parameter M is not to be configured as 2, when the value of the parameter for the QCL assumption is configured as 1.

15. A method of a user equipment (UE) in a wireless communication system supporting a shared spectrum channel access, the UE comprising:
receiving, from a base station (BS) over a first downlink channel, a synchronization signals and physical broadcast channel (SS/PBCH) block;
determining a transmission window in which the received SS/PBCH block is located;
determining whether a control resource set (CORESET) for Type0 physical downlink control channels (Type0-PDCCH) common search space (CSS) is present based on the received SS/PBCH block;
determining a parameter for a quasi-co-location (QCL) assumption of candidate SS/PBCH blocks within the transmission window;
determining a group of QCLed candidate SS/PBCH blocks within the transmission window based on the determined parameter for the QCL assumption;
determining a group of slots including the Type0-PDCCH CSS, wherein each slot of the group of slots corresponds to a candidate SS/PBCH block within the group of QCLed candidate SS/PBCH blocks; and
receiving, from the BS over a second downlink channel, at least one Type0-PDCCH based on the determined groups of slots including the Type0-PDCCH CSS.

16. The method of claim 15, wherein the parameter for the QCL assumption is configured by the SS/PBCH block received from the BS, and wherein a value of the parameter is determined from {1, 2, 4, 8}.

17. The method of claim 15, wherein a slot of the group of slots including the Type0-PDCCH CSS is located either within the transmission window or outside the transmission window.

18. The method of claim 15, further comprising identifying two slots of the group of slots including the Type0-PDCCH CSS, two slots being consecutive in a time domain, and wherein each of the two slots corresponds to a same candidate SS/PBCH block, respectively.

19. The method of claim 18, wherein:
an index of the same candidate SS/PBCH block within the transmission window is determined from {0, 1, . . . , 9} for a sub-carrier spacing (SCS) of the candidate SS/PBCH block as 15 kHz; and
the index of the same candidate SS/PBCH block within the transmission window is determined from {0, 1, . . . , 19} for the SCS of the candidate SS/PBCH block as 30 kHz.

20. The method of claim 18, wherein:
an index of a first slot of the two slot is determined based on a parameter M that is configured by the SS/PBCH block received from the BS;
a value of the parameter M is determined from {½, 1, 2};
a restriction to the value of the parameter M is determined based on the value of the configured parameter for the QCL assumption; and
wherein restriction is, the value of the parameter M is not expected to be configured as 2, when the value of the parameter for the QCL assumption is configured as 1.

* * * * *